US010831987B2

(12) United States Patent
Warila et al.

(10) Patent No.: US 10,831,987 B2
(45) Date of Patent: *Nov. 10, 2020

(54) COMPUTER PROGRAM PRODUCT PROVISIONED TO NON-TRANSITORY COMPUTER STORAGE OF A WIRELESS MOBILE DEVICE

(71) Applicant: SQGO Innovations, LLC, Watertown, MA (US)

(72) Inventors: Bruce Warila, Lancaster, MA (US); Brian D. Markey, Shrewsbury, MA (US); Jeremy Aaron Gilbert, Cambridge, MA (US); James P. Echmalian, Arlington, MA (US); Todd Silverstein, San Francisco, CA (US)

(73) Assignee: SQGO Innovations, LLC, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,765

(22) Filed: Feb. 13, 2020

(65) Prior Publication Data

US 2020/0184141 A1 Jun. 11, 2020

Related U.S. Application Data

(60) Continuation of application No. 16/732,253, filed on Dec. 31, 2019, which is a continuation of application (Continued)

(51) Int. Cl.

*G06F 40/14* (2020.01)
*G06F 40/103* (2020.01)

(Continued)

(52) U.S. Cl.

CPC ............ *G06F 40/14* (2020.01); *G06F 3/0482* (2013.01); *G06F 3/0484* (2013.01); *G06F 8/24* (2013.01);

(Continued)

(58) Field of Classification Search

None

See application file for complete search history.

(56) References Cited

U.S. PATENT DOCUMENTS 5,067,072 A 11/1991 Talati et al.
5,129,084 A 7/1992 Kelly et al.

(Continued)

FOREIGN PATENT DOCUMENTS

EP 0903662 A2 3/1999
EP 0903662 A3 3/2000

(Continued)

OTHER PUBLICATIONS

"Bsquare Delivers First XML Developers Kit to Support All Windows CE Devices." Business Wire Jun. 12, 2000: 0282. printed from General OneFile database. Aug. 1, 2014. Document URL: http://go.galegroup.com/ps/i.do?id=GALE%7CA7CA62664204&v=2.1%&u=wat&it=r&p=I.

(Continued)

*Primary Examiner* — Ariel Mercado

(57) ABSTRACT

A computer program product comprising a non-transitory computer-readable storage medium having computer-readable instructions stored thereon comprising a mobile software application provisioned to one or more remotely-located mobile computing devices, each mobile computing device running a same device-native mobile operating system (OS). The computer program product comprises an application bundle comprising computer program code and computer code libraries that together comprise at least one component used to: adapt an abstraction layer to the same device-native mobile OS, receive data from said device-native OS, generate modification data objects, process modification data objects, generate a change list of modification data objects, translate modification data objects into a list of (Continued)

instructions for execution, and send a list of instructions to said same device-native operating system for execution.

30 Claims, 29 Drawing Sheets

Related U.S. Application Data

No. 16/005,992, filed on Jun. 12, 2018, now Pat. No. 10,552,520, which is a continuation of application No. 15/180,144, filed on Jun. 13, 2016, now Pat. No. 10,372,796, which is a continuation of application No. 14/987,971, filed on Jan. 5, 2016, now Pat. No. 9,390,191, which is a continuation of application No. 14/819,983, filed on Aug. 6, 2015, now Pat. No. 9,311,284, which is a continuation of application No. 14/454,829, filed on Aug. 8, 2014, now Pat. No. 9,135,227, which is a continuation of application No. 13/609,522, filed on Sep. 11, 2012, now abandoned, which is a continuation of application No. 12/691, 721, filed on Jan. 21, 2010, now Pat. No. 8,307,331, which is a division of application No. 10/659,762, filed on Sep. 10, 2003, now abandoned.

(60) Provisional application No. 60/409,483, filed on Sep. 10, 2002, provisional application No. 60/428,163, filed on Nov. 21, 2002.

(51) Int. Cl.

| | |
|---|---|
| ***G06F 40/151*** | (2020.01) |
| ***H04L 29/08*** | (2006.01) |
| ***G06F 3/0482*** | (2013.01) |
| ***G06F 8/30*** | (2018.01) |
| ***H04W 84/12*** | (2009.01) |
| ***G06F 16/951*** | (2019.01) |
| ***G06F 16/958*** | (2019.01) |
| ***G06F 8/20*** | (2018.01) |
| ***G06F 8/65*** | (2018.01) |
| ***H04W 8/22*** | (2009.01) |
| ***G06F 3/0484*** | (2013.01) |
| *H04W 88/02* | (2009.01) |
| *H04W 84/18* | (2009.01) |

(52) U.S. Cl.

CPC .................. *G06F 8/30* (2013.01); *G06F 8/65* (2013.01); *G06F 16/951* (2019.01); *G06F 16/986* (2019.01); *G06F 40/103* (2020.01); *G06F 40/151* (2020.01); *H04L 67/34* (2013.01); *H04W 8/22* (2013.01); *H04W 84/12* (2013.01); *H04W 84/18* (2013.01); *H04W 88/02* (2013.01)

(56) References Cited

U.S. PATENT DOCUMENTS

| | | | |
|---|---|---|---|
| 5,187,790 | A | 2/1993 | East et al. |
| 5,297,283 | A | 3/1994 | Perazzoli et al. |
| 5,384,911 | A | 1/1995 | Bloomfield et al. |
| 5,477,508 | A | 12/1995 | Will |
| 5,499,343 | A | 3/1996 | Pettus |
| 5,515,495 | A | 5/1996 | Ikemoto |
| 5,544,325 | A | 8/1996 | Denny et al. |
| 5,586,312 | A | 12/1996 | Johnson et al. |
| 5,623,656 | A | 4/1997 | Lyons |
| 5,701,484 | A | 12/1997 | Artsy et al. |
| 5,761,662 | A | 6/1998 | Dasan |
| 5,764,915 | A | 6/1998 | Heimsoth et al. |
| 5,802,306 | A | 9/1998 | Hunt |
| 5,838,910 | A | 11/1998 | Domenikos et al. |
| 5,838,916 | A | 11/1998 | Domenikos et al. |
| 5,844,553 | A | 12/1998 | Karp et al. |
| 5,850,531 | A | 12/1998 | Cox et al. |
| 5,858,015 | A | 1/1999 | Fini |
| 5,859,973 | A | 1/1999 | Carpenter et al. |
| 5,884,046 | A | 3/1999 | Antonov |
| 5,892,900 | A | 4/1999 | Ginter et al. |
| 5,900,872 | A | 5/1999 | Ashe |
| 5,910,987 | A | 6/1999 | Ginter et al. |
| 5,920,861 | A | 7/1999 | Hall et al. |
| 5,938,733 | A | 8/1999 | Heimsoth et al. |
| 5,951,694 | A | 9/1999 | Choquier et al. |
| 5,958,015 | A | 9/1999 | Dascalu |
| 5,999,179 | A | 12/1999 | Kekic et al. |
| 6,023,721 | A | 2/2000 | Cummings |
| 6,026,366 | A | 2/2000 | Grube |
| 6,065,043 | A | 5/2000 | Domenikos et al. |
| 6,083,281 | A | 7/2000 | Diec et al. |
| 6,088,515 | A | 7/2000 | Muir et al. |
| 6,108,712 | A | 8/2000 | Hayes et al. |
| 6,115,741 | A | 9/2000 | Domenikos et al. |
| 6,144,377 | A | 11/2000 | Wong et al. |
| 6,144,992 | A | 11/2000 | Turpin et al. |
| 6,161,126 | A | 12/2000 | Wies et al. |
| 6,178,403 | B1 | 1/2001 | Detlef et al. |
| 6,185,683 | B1 | 2/2001 | Ginter et al. |
| 6,230,004 | B1 | 5/2001 | Hall et al. |
| 6,237,628 | B1 | 5/2001 | Miller et al. |
| 6,240,442 | B1 | 5/2001 | Domenikos et al. |
| 6,272,556 | B1 | 8/2001 | Gish et al. |
| 6,282,602 | B1 | 8/2001 | Blumenau et al. |
| 6,292,827 | B1 | 9/2001 | Raz et al. |
| 6,311,221 | B1 | 10/2001 | Raz et al. |
| 6,314,417 | B1 | 11/2001 | Bennett et al. |
| 6,317,143 | B1 | 11/2001 | Wugofski et al. |
| 6,323,846 | B1 | 11/2001 | Westerman et al. |
| 6,327,628 | B1 | 12/2001 | Anuff et al. |
| 6,332,127 | B1 | 12/2001 | Bandera et al. |
| 6,341,316 | B1 | 1/2002 | Kloba et al. |
| 6,342,907 | B1 | 1/2002 | Petty et al. |
| 6,367,012 | B1 | 4/2002 | Atkinson et al. |
| 6,370,687 | B1 | 4/2002 | Shimura |
| 6,374,402 | B1 | 4/2002 | Rostcheck et al. |
| 6,396,482 | B1 | 5/2002 | Griffin et al. |
| 6,404,445 | B1 | 6/2002 | Galea et al. |
| 6,418,446 | B1 | 7/2002 | Lection et al. |
| 6,446,109 | B2 | 9/2002 | Gupta |
| 6,476,833 | B1 | 11/2002 | Moshfeghi |
| 6,484,174 | B1 | 11/2002 | Wall et al. |
| 6,510,466 | B1 | 1/2003 | McGarvey et al. |
| 6,515,988 | B1 | 2/2003 | Eldridge et al. |
| 6,519,643 | B1 | 2/2003 | Foulkes et al. |
| 6,542,908 | B1 | 4/2003 | Ims et al. |
| 6,553,377 | B1 | 4/2003 | Eschelbeck et al. |
| 6,553,412 | B1 | 4/2003 | Kloba et al. |
| 6,557,168 | B1 | 4/2003 | Czajkowski et al. |
| 6,570,557 | B1 | 5/2003 | Westerman et al. |
| 6,574,618 | B2 | 6/2003 | Eylon et al. |
| 6,577,311 | B1 | 6/2003 | Crosby et al. |
| 6,597,366 | B1 | 7/2003 | Bennett |
| 6,598,125 | B2 | 7/2003 | Romm et al. |
| 6,635,089 | B1 | 10/2003 | Burkett |
| 6,640,098 | B1 | 10/2003 | Roundtree |
| 6,651,249 | B2 | 11/2003 | Waldin et al. |
| 6,658,642 | B1 | 12/2003 | Megiddo et al. |
| 6,665,867 | B1 | 12/2003 | Ims et al. |
| 6,691,157 | B2 | 2/2004 | Stergiades et al. |
| 6,694,434 | B1 | 2/2004 | McGee et al. |
| 6,707,475 | B1 | 3/2004 | Snyder et al. |
| 6,721,747 | B2 | 4/2004 | Lipkin |
| 6,725,212 | B2 | 4/2004 | Couch et al. |
| 6,725,323 | B2 | 4/2004 | Katahira |
| 6,732,330 | B1 | 5/2004 | Claussen et al. |
| 6,735,434 | B2 | 5/2004 | Criss et al. |
| 6,735,601 | B1 | 5/2004 | Subrahmanyam |
| 6,741,188 | B1 | 5/2004 | Amin et al. |
| 6,754,676 | B2 | 6/2004 | Dietz et al. |
| 6,757,894 | B2 | 6/2004 | Eylon et al. |

(56) References Cited

U.S. PATENT DOCUMENTS 6,775,536 B1 8/2004 Geiger et al.
6,801,224 B1 10/2004 Lewallen et al.
6,826,624 B1 11/2004 Fell et al.
6,854,123 B1 2/2005 Lewallen
6,868,448 B1 3/2005 Gupta et al.
6,880,002 B2 4/2005 Hirschfeld et al.
6,886,169 B2 4/2005 Wei
6,889,212 B1 5/2005 Wang et al.
6,889,249 B2 5/2005 Miloushev et al.
6,901,428 B1 5/2005 Frazier et al.
6,901,586 B1 5/2005 Czajkowski et al.
6,907,608 B1 6/2005 Susser et al.
6,920,501 B2 7/2005 Chu et al.
6,922,411 B1 7/2005 Taylor et al.
6,925,495 B2 8/2005 Kind et al.
6,928,464 B2 8/2005 Appiah et al.
6,928,469 B1 8/2005 Duursma et al.
6,931,429 B2 8/2005 Gouge et al.
6,934,755 B1 8/2005 Saulpaugh et al.
6,941,135 B2 9/2005 Minear et al.
6,941,520 B1 9/2005 Lewallen et al.
6,941,553 B2 9/2005 Eisler et al.
6,950,502 B1 9/2005 Jenkins
6,952,714 B2 10/2005 Peart et al.
6,963,901 B1 11/2005 Santosuosso et al.
6,966,060 B1 11/2005 Young et al.
6,973,502 B2 12/2005 Patil
6,973,589 B2 12/2005 Wright et al.
6,981,211 B1 12/2005 Claussen et al.
6,981,212 B1 12/2005 Claussen et al.
6,986,148 B2 1/2006 Johnson et al.
6,993,615 B2 1/2006 Falcon
7,024,464 B1 4/2006 Lusher et al.
7,028,305 B2 4/2006 Schaefer et al.
7,043,235 B2 5/2006 Meyer et al.
7,043,525 B2 5/2006 Tuttle et al.
7,047,239 B2 5/2006 French et al.
7,051,335 B2 5/2006 Gehring et al.
7,054,953 B1 5/2006 Nakajima et al.
7,072,934 B2 7/2006 Helgeson et al.
7,080,159 B2 7/2006 Kurakake et al.
7,089,583 B2 8/2006 Mehra et al.
7,092,998 B2 8/2006 Frietas et al.
7,095,456 B2 8/2006 Nakajima
7,099,663 B2 8/2006 Lundblade et al.
7,103,625 B1 9/2006 Hipp et al.
7,103,779 B2 9/2006 Kiehtreiber et al.
7,107,543 B2 9/2006 Berry et al.
7,117,243 B2 10/2006 Peart et al.
7,127,386 B2 10/2006 Mocek et al.
7,146,155 B2 12/2006 Kouznetsov
7,162,724 B2 1/2007 Blaser et al.
7,191,233 B2 3/2007 Miller et al.
7,200,632 B1 4/2007 Greschler et al.
7,200,633 B2 4/2007 Sekiguchi et al.
7,200,809 B1 4/2007 Paul et al.
7,206,647 B2 4/2007 Kumar
7,206,819 B2 4/2007 Schmidt
7,216,351 B1 5/2007 Maes
7,219,347 B1 5/2007 Waddington
7,225,245 B2 5/2007 Gurumoorthy et al.
7,234,111 B2 6/2007 Chu et al.
7,236,799 B2 6/2007 Bhuyan et al.
7,247,909 B2 7/2007 Chen et al.
7,260,535 B2 8/2007 Galanes et al.
7,263,698 B2 8/2007 Wildhagen et al.
7,269,601 B2 9/2007 Kinno et al.
7,269,664 B2 9/2007 Hütsch et al.
7,274,909 B2 9/2007 Perttilä et al.
7,275,243 B2 9/2007 Gibbons et al.
7,287,018 B2 10/2007 Lennon et al.
7,305,671 B2 12/2007 Davidov et al.
7,328,430 B2 2/2008 Fairweather
7,330,872 B2 2/2008 Peart et al.
7,331,034 B2 2/2008 Anderson
7,340,528 B2 3/2008 Noblecourt et al.
7,349,951 B2 3/2008 Clough et al.
7,350,151 B1 3/2008 Nakajima et al.
7,363,035 B2 4/2008 Reilly
7,370,095 B2 5/2008 Sauvage et al.
7,392,483 B2 6/2008 Wong et al.
7,398,055 B2 7/2008 Tajima et al.
7,398,305 B2 7/2008 Bodin et al.
7,409,349 B2 8/2008 Wang et al.
7,426,549 B2 9/2008 Simpson et al.
7,437,432 B2 10/2008 Bodin et al.
7,454,458 B2 11/2008 Islam et al.
7,461,144 B1 12/2008 Beloussov et al.
7,464,134 B2 12/2008 Simpson et al.
7,464,185 B2 12/2008 Sambandam
7,499,282 B1 3/2009 Loucks et al.
7,500,188 B1 3/2009 Trapani
7,506,022 B2 3/2009 Wang et al.
7,512,932 B2 3/2009 Davidov et al.
7,526,762 B1 4/2009 Astala et al.
7,526,774 B1 4/2009 Beck et al.
7,546,298 B2 6/2009 Hulaj et al.
7,552,265 B2 6/2009 Newman et al.
7,565,647 B2 7/2009 Davidov et al.
7,580,678 B2 8/2009 Byman-Kivivuori et al.
7,593,720 B2 9/2009 Moon et al.
7,596,373 B2 9/2009 McGregor et al.
7,600,222 B2 10/2009 Wilt et al.
7,610,547 B2 10/2009 Wang et al.
7,627,658 B2 12/2009 Levett et al.
7,627,865 B2 12/2009 Muhlestein et al.
7,647,373 B2 1/2010 Hornbaker et al.
7,711,570 B2 5/2010 Galanes et al.
7,730,498 B2 6/2010 Resnick et al.
7,752,258 B2 7/2010 Parikh et al.
7,761,541 B1 7/2010 Morley et al.
7,813,741 B2 10/2010 Hendrey et al.
7,840,814 B2 11/2010 Benoit et al.
7,865,528 B2 1/2011 Neil et al.
7,877,682 B2 1/2011 Aegerter
7,895,336 B2 2/2011 Cameron et al.
7,895,522 B2 2/2011 Wong et al.
7,899,915 B2 3/2011 Reisman
7,912,935 B2 3/2011 Merissert-Coffinieres et al.
7,917,610 B2 3/2011 Klein et al.
7,917,888 B2 3/2011 Chong et al.
7,920,827 B2 4/2011 Huomo et al.
7,934,162 B2 4/2011 Wong et al.
8,006,177 B1 8/2011 Fuchs et al.
8,020,174 B2 9/2011 Sedogbo et al.
8,204,911 B2 6/2012 Neil et al.
8,205,094 B2 6/2012 Dive-Reclus
8,307,331 B2 11/2012 Warila et al.
8,311,835 B2 11/2012 Lecoeuche et al.
8,542,908 B2 9/2013 Simakov et al.
8,549,143 B2 10/2013 Mandato et al.
8,832,181 B2 9/2014 Merissert-Coffinieres et al.
9,135,227 B2 9/2015 Warila et al.
9,311,284 B2 4/2016 Warila et al.
9,342,492 B1 5/2016 Warila et al.
9,390,191 B2 7/2016 Warila et al.
9,473,925 B2 10/2016 Hanson et al.
10,372,796 B2 8/2019 Warila et al.
10,552,520 B2 2/2020 Warila et al.
2001/0009016 A1 7/2001 Hofmann et al.
2001/0036835 A1 11/2001 Leedom et al.
2001/0037399 A1 11/2001 Eylon et al.
2001/0047294 A1 11/2001 Rothschild
2001/0047393 A1 11/2001 Arner et al.
2001/0047394 A1 11/2001 Kloba et al.
2001/0047406 A1 11/2001 Araujo et al.
2001/0051979 A1 12/2001 Aufricht et al.
2001/0054114 A1 12/2001 Duval et al.
2002/0002599 A1 1/2002 Arner et al.
2002/0007418 A1 1/2002 Hegde et al.
2002/0010808 A1 1/2002 Wiggins et al.
2002/0016801 A1 2/2002 Reiley et al.
2002/0023113 A1* 2/2002 Hsing .................. G06F 16/273
715/234

(56) References Cited

U.S. PATENT DOCUMENTS

| | | | |
|---|---|---|---|
| 2002/0033843 | A1 | 3/2002 | Loos et al. |
| 2002/0035451 | A1 | 3/2002 | Rothermel et al. |
| 2002/0042833 | A1 | 4/2002 | Hendler et al. |
| 2002/0046304 | A1 | 4/2002 | Fabri et al. |
| 2002/0049608 | A1 | 4/2002 | Hartsell et al. |
| 2002/0049788 | A1 | 4/2002 | Lipkin et al. |
| 2002/0049841 | A1 | 4/2002 | Johnson et al. |
| 2002/0057803 | A1 | 5/2002 | Loos et al. |
| 2002/0059144 | A1 | 5/2002 | Meffert et al. |
| 2002/0059274 | A1 | 5/2002 | Hartsell et al. |
| 2002/0059405 | A1 | 5/2002 | Angwin et al. |
| 2002/0059425 | A1 | 5/2002 | Belfiore et al. |
| 2002/0059565 | A1 | 5/2002 | Reyna et al. |
| 2002/0065064 | A1 | 5/2002 | Griffith et al. |
| 2002/0065864 | A1 | 5/2002 | Hartsell et al. |
| 2002/0069259 | A1 | 6/2002 | Kushwaha et al. |
| 2002/0073399 | A1 | 6/2002 | Golden |
| 2002/0078143 | A1 | 6/2002 | De Boor et al. |
| 2002/0078168 | A1 | 6/2002 | Christfort et al. |
| 2002/0078203 | A1 | 6/2002 | Greschler et al. |
| 2002/0078255 | A1 | 6/2002 | Narayan |
| 2002/0083145 | A1 | 6/2002 | Perinpanathan |
| 2002/0083183 | A1 | 6/2002 | Pujare et al. |
| 2002/0085020 | A1 | 7/2002 | Carroll |
| 2002/0087556 | A1 | 7/2002 | Hansmann et al. |
| 2002/0087596 | A1 | 7/2002 | Lewontin et al. |
| 2002/0087655 | A1 | 7/2002 | Bridgman et al. |
| 2002/0087717 | A1 | 7/2002 | Artzi et al. |
| 2002/0087883 | A1 | 7/2002 | Wohlgemuth et al. |
| 2002/0091763 | A1 | 7/2002 | Shah et al. |
| 2002/0095400 | A1 | 7/2002 | Johnson et al. |
| 2002/0095479 | A1 | 7/2002 | Schmidt et al. |
| 2002/0105972 | A1 | 8/2002 | Richter et al. |
| 2002/0107962 | A1 | 8/2002 | Richter et al. |
| 2002/0107989 | A1 | 8/2002 | Johnson et al. |
| 2002/0107990 | A1 | 8/2002 | Johnson et al. |
| 2002/0108121 | A1 | 8/2002 | Alao et al. |
| 2002/0108122 | A1 | 8/2002 | Alao et al. |
| 2002/0109718 | A1 | 8/2002 | Mansour et al. |
| 2002/0111965 | A1 | 8/2002 | Kutter |
| 2002/0111972 | A1 | 8/2002 | Lynch et al. |
| 2002/0112078 | A1 | 8/2002 | Yach |
| 2002/0112247 | A1 | 8/2002 | Horner et al. |
| 2002/0116505 | A1 | 8/2002 | Higgins et al. |
| 2002/0122054 | A1 | 9/2002 | Hind et al. |
| 2002/0129027 | A1 | 9/2002 | Cameron et al. |
| 2002/0133627 | A1 | 9/2002 | Maes et al. |
| 2002/0138431 | A1 | 9/2002 | Antonin et al. |
| 2002/0138446 | A1 | 9/2002 | Antonin et al. |
| 2002/0138640 | A1 | 9/2002 | Raz et al. |
| 2002/0143821 | A1 | 10/2002 | Jakubowski |
| 2002/0143897 | A1 | 10/2002 | Patil et al. |
| 2002/0143971 | A1 | 10/2002 | Govindarajan et al. |
| 2002/0156831 | A1 | 10/2002 | Suorsa et al. |
| 2002/0156911 | A1 | 10/2002 | Croman et al. |
| 2002/0161796 | A1 | 10/2002 | Sylthe |
| 2002/0161801 | A1 | 10/2002 | Hind et al. |
| 2002/0161908 | A1 | 10/2002 | Benitez et al. |
| 2002/0165719 | A1 | 11/2002 | Wang et al. |
| 2002/0167543 | A1 | 11/2002 | Smith et al. |
| 2002/0169806 | A1 | 11/2002 | Wang et al. |
| 2002/0174215 | A1 | 11/2002 | Schaefer et al. |
| 2002/0174227 | A1 | 11/2002 | Hartsell et al. |
| 2002/0178182 | A1 | 11/2002 | Wang et al. |
| 2002/0184354 | A1 | 12/2002 | McKenzie et al. |
| 2002/0184618 | A1 | 12/2002 | Bala et al. |
| 2002/0194010 | A1 | 12/2002 | Bergler et al. |
| 2002/0198719 | A1 | 12/2002 | Gergic et al. |
| 2002/0199180 | A1 | 12/2002 | Donaldson et al. |
| 2003/0004727 | A1 | 1/2003 | Keiller et al. |
| 2003/0004728 | A1 | 1/2003 | Keiller |
| 2003/0004882 | A1 | 1/2003 | Holler et al. |
| 2003/0005019 | A1 | 1/2003 | Pabla et al. |
| 2003/0005057 | A1 | 1/2003 | Lablanc et al. |
| 2003/0005174 | A1 | 1/2003 | Coffman et al. |
| 2003/0007003 | A1 | 1/2003 | Ostrowski et al. |
| 2003/0009517 | A1 | 1/2003 | Wang et al. |
| 2003/0009538 | A1 | 1/2003 | Shah et al. |
| 2003/0018694 | A1 | 1/2003 | Chen et al. |
| 2003/0023679 | A1 | 1/2003 | Johnson et al. |
| 2003/0025732 | A1 | 2/2003 | Prichard |
| 2003/0028563 | A1 | 2/2003 | Stutz et al. |
| 2003/0037181 | A1 | 2/2003 | Freed |
| 2003/0046316 | A1 | 3/2003 | Gergic et al. |
| 2003/0051056 | A1 | 3/2003 | Pascual et al. |
| 2003/0055977 | A1 | 3/2003 | Miller et al. |
| 2003/0056112 | A1 | 3/2003 | Vinson et al. |
| 2003/0060214 | A1 | 3/2003 | Hendrey et al. |
| 2003/0060896 | A9 | 3/2003 | Hulai et al. |
| 2003/0065676 | A1 | 4/2003 | Gbadegesin et al. |
| 2003/0067485 | A1 | 4/2003 | Wong et al. |
| 2003/0069923 | A1 | 4/2003 | Peart et al. |
| 2003/0069924 | A1 | 4/2003 | Peart et al. |
| 2003/0074563 | A1 | 4/2003 | Spacey |
| 2003/0079057 | A1 | 4/2003 | Ruskin et al. |
| 2003/0086122 | A1 | 5/2003 | Parry et al. |
| 2003/0097369 | A1* | 5/2003 | McKnight ................. G06F 8/24 717/105 |
| 2003/0105838 | A1 | 6/2003 | Presley |
| 2003/0110446 | A1 | 6/2003 | Nemer |
| 2003/0117417 | A1 | 6/2003 | Lee |
| 2003/0130854 | A1 | 7/2003 | Galanes et al. |
| 2003/0135842 | A1 | 7/2003 | Frey et al. |
| 2003/0140095 | A1 | 7/2003 | Simpson et al. |
| 2003/0140160 | A1 | 7/2003 | Raz et al. |
| 2003/0145089 | A1 | 7/2003 | Edwards et al. |
| 2003/0145222 | A1 | 7/2003 | Gittler et al. |
| 2003/0149685 | A1 | 8/2003 | Trossman et al. |
| 2003/0154401 | A1 | 8/2003 | Hartman et al. |
| 2003/0172138 | A1 | 9/2003 | McCormack et al. |
| 2003/0177173 | A1 | 9/2003 | Belimpasakis et al. |
| 2003/0177178 | A1 | 9/2003 | Jones et al. |
| 2003/0181196 | A1 | 9/2003 | Davidov et al. |
| 2003/0182099 | A1 | 9/2003 | Mocek et al. |
| 2003/0182195 | A1 | 9/2003 | Kumar |
| 2003/0182625 | A1 | 9/2003 | Davidov et al. |
| 2003/0182626 | A1 | 9/2003 | Davidov et al. |
| 2003/0191867 | A1 | 10/2003 | Czajkowski et al. |
| 2003/0200080 | A1 | 10/2003 | Galanes et al. |
| 2003/0208595 | A1 | 11/2003 | Gouge et al. |
| 2003/0210331 | A1 | 11/2003 | Battles et al. |
| 2003/0217105 | A1 | 11/2003 | Zircher et al. |
| 2003/0221130 | A1 | 11/2003 | Henry et al. |
| 2003/0225726 | A1 | 12/2003 | Simpson et al. |
| 2003/0225774 | A1 | 12/2003 | Davidov et al. |
| 2003/0225829 | A1 | 12/2003 | Pena et al. |
| 2003/0231336 | A1 | 12/2003 | Kim |
| 2003/0232618 | A1 | 12/2003 | Le et al. |
| 2003/0233465 | A1 | 12/2003 | Le et al. |
| 2003/0233476 | A1 | 12/2003 | Henry |
| 2003/0233541 | A1 | 12/2003 | Fowler et al. |
| 2003/0233544 | A1 | 12/2003 | Erlingsson et al. |
| 2003/0233647 | A1 | 12/2003 | Blaser et al. |
| 2003/0236837 | A1 | 12/2003 | Johnson et al. |
| 2003/0236861 | A1 | 12/2003 | Johnson et al. |
| 2003/0236919 | A1 | 12/2003 | Johnson et al. |
| 2003/0237050 | A1 | 12/2003 | Davidov et al. |
| 2004/0001476 | A1 | 1/2004 | Islam et al. |
| 2004/0002305 | A1 | 1/2004 | Byman-Kivivuori et al. |
| 2004/0002943 | A1 | 1/2004 | Merrill et al. |
| 2004/0015811 | A1 | 1/2004 | Freitas et al. |
| 2004/0015832 | A1 | 1/2004 | Stapp et al. |
| 2004/0031058 | A1 | 2/2004 | Reisman et al. |
| 2004/0034831 | A1 | 2/2004 | Grober et al. |
| 2004/0034853 | A1 | 2/2004 | Gibbons et al. |
| 2004/0039887 | A1 | 2/2004 | Gautney |
| 2004/0044643 | A1 | 3/2004 | Devries et al. |
| 2004/0066770 | A1 | 4/2004 | Pabla et al. |
| 2004/0073431 | A1 | 4/2004 | Galanes et al. |
| 2004/0075675 | A1 | 4/2004 | Raivisto et al. |
| 2004/0087273 | A1 | 5/2004 | Perttila et al. |
| 2004/0098715 | A1 | 5/2004 | Aghera et al. |
| 2004/0098724 | A1 | 5/2004 | Demsey et al. |
| 2004/0103373 | A1 | 5/2004 | Wei |

(56) References Cited

U.S. PATENT DOCUMENTS

| | | | |
|---|---|---|---|
| 2004/0110490 | A1 | 6/2004 | Steele et al. |
| 2004/0113908 | A1 | 6/2004 | Galanes et al. |
| 2004/0117462 | A1 | 6/2004 | Bodin et al. |
| 2004/0117465 | A1 | 6/2004 | Bodin et al. |
| 2004/0117466 | A1 | 6/2004 | Bodin et al. |
| 2004/0122915 | A1 | 6/2004 | Saare et al. |
| 2004/0128250 | A1 | 7/2004 | Fox et al. |
| 2004/0131042 | A1 | 7/2004 | Lillie et al. |
| 2004/0137891 | A1 | 7/2004 | Clark et al. |
| 2004/0138961 | A1 | 7/2004 | Clark et al. |
| 2004/0139119 | A1 | 7/2004 | Clark et al. |
| 2004/0139120 | A1 | 7/2004 | Clark et al. |
| 2004/0139147 | A1 | 7/2004 | Duquenne et al. |
| 2004/0142683 | A1 | 7/2004 | Clark et al. |
| 2004/0143823 | A1 | 7/2004 | Wei |
| 2004/0148338 | A1 | 7/2004 | Saare et al. |
| 2004/0148354 | A1 | 7/2004 | Saare et al. |
| 2004/0148608 | A1 | 7/2004 | Gendreau et al. |
| 2004/0158624 | A1 | 8/2004 | Bodin et al. |
| 2004/0160463 | A1 | 8/2004 | Battles et al. |
| 2004/0186860 | A1 | 9/2004 | Lee et al. |
| 2004/0186918 | A1 | 9/2004 | Lonnfors et al. |
| 2004/0192299 | A1 | 9/2004 | Wilson et al. |
| 2004/0192339 | A1 | 9/2004 | Wilson et al. |
| 2004/0198322 | A1 | 10/2004 | Mercer |
| 2004/0198434 | A1 | 10/2004 | Clarey et al. |
| 2004/0203901 | A1 | 10/2004 | Wilson et al. |
| 2004/0203902 | A1 | 10/2004 | Wilson et al. |
| 2004/0203903 | A1 | 10/2004 | Wilson et al. |
| 2004/0203944 | A1 | 10/2004 | Huomo et al. |
| 2004/0205731 | A1 | 10/2004 | Junkermann |
| 2004/0225747 | A1 | 11/2004 | Kadi |
| 2004/0227971 | A1 | 11/2004 | Clough et al. |
| 2004/0230434 | A1 | 11/2004 | Galanes et al. |
| 2004/0230637 | A1 | 11/2004 | Lecoueche et al. |
| 2004/0230646 | A1 | 11/2004 | Clough et al. |
| 2004/0230971 | A1 | 11/2004 | Rachman et al. |
| 2004/0236715 | A1 | 11/2004 | Krebs et al. |
| 2004/0236777 | A1 | 11/2004 | Pardikar et al. |
| 2004/0243393 | A1 | 12/2004 | Wang et al. |
| 2004/0243419 | A1 | 12/2004 | Wang et al. |
| 2004/0246514 | A1 | 12/2004 | Clough et al. |
| 2004/0249733 | A1 | 12/2004 | Clough et al. |
| 2004/0255048 | A1 | 12/2004 | Lev Ran et al. |
| 2004/0261017 | A1 | 12/2004 | Perry et al. |
| 2004/0267900 | A1 | 12/2004 | Hoekstra et al. |
| 2004/0268361 | A1 | 12/2004 | Schaefer et al. |
| 2005/0004942 | A1 | 1/2005 | Madsen et al. |
| 2005/0010924 | A1 | 1/2005 | Hipp et al. |
| 2005/0010927 | A1 | 1/2005 | Stern et al. |
| 2005/0015500 | A1 | 1/2005 | Batchu et al. |
| 2005/0015775 | A1 | 1/2005 | Russell et al. |
| 2005/0021613 | A1 | 1/2005 | Schmeidler et al. |
| 2005/0021703 | A1 | 1/2005 | Cherry et al. |
| 2005/0044089 | A1 | 2/2005 | Wu et al. |
| 2005/0044108 | A1 | 2/2005 | Shah et al. |
| 2005/0055698 | A1 | 3/2005 | Sasaki et al. |
| 2005/0063083 | A1 | 3/2005 | Dart et al. |
| 2005/0066037 | A1 | 3/2005 | Song et al. |
| 2005/0076064 | A1 | 4/2005 | Thomas et al. |
| 2005/0080906 | A1 | 4/2005 | Pedersen et al. |
| 2005/0091059 | A1 | 4/2005 | Lecoeuche et al. |
| 2005/0091511 | A1 | 4/2005 | Nave et al. |
| 2005/0144555 | A1 | 6/2005 | Morris |
| 2005/0257266 | A1 | 11/2005 | Cook et al. |
| 2005/0262520 | A1 | 11/2005 | Burnett et al. |
| 2006/0031282 | A1 | 2/2006 | Tuttle et al. |
| 2006/0075070 | A1 | 4/2006 | Merissert-Coffinieres et al. |
| 2006/0161839 | A1 | 7/2006 | Pedersen |
| 2008/0313282 | A1 | 12/2008 | Warila et al. |
| 2009/0007160 | A1 | 1/2009 | Wei |
| 2009/0164604 | A1 | 6/2009 | Merissert-Coffinteres et al. |
| 2009/0177663 | A1 | 7/2009 | Hulaj et al. |
| 2009/0300063 | A1 | 12/2009 | Neil et al. |
| 2011/0087710 | A1 | 4/2011 | Neil et al. |
| 2011/0131273 | A1 | 6/2011 | Merissert-Coffinier et al. |
| 2013/0007698 | A1 | 1/2013 | Warila et al. |
| 2018/0300298 | A1 | 10/2018 | Warila et al. |
| 2020/0151384 | A1 | 5/2020 | Warila et al. |
| 2020/0184140 | A1 | 6/2020 | Warila et al. |

FOREIGN PATENT DOCUMENTS

| | | | |
|---|---|---|---|
| EP | 1047239 | A2 | 10/2000 |
| EP | 1215575 | A2 | 6/2002 |
| EP | 1318461 | A1 | 6/2003 |
| EP | 1338980 | A1 | 8/2003 |
| EP | 1420337 | A1 | 5/2004 |
| EP | 1626324 | A2 | 2/2006 |
| EP | 1257890 BI | | 10/2007 |
| EP | 1131934 BI | | 12/2016 |
| GB | 2362540 | A | 11/2001 |
| GB | 2373599 | A | 9/2002 |
| GB | 2350990 | A | 12/2002 |
| GB | 2399707 | A | 9/2004 |
| WO | 9806033 | A1 | 2/1998 |
| WO | 9850874 | A2 | 11/1998 |
| WO | 9917193 | A1 | 4/1999 |
| WO | 0023925 | A2 | 4/2000 |
| WO | 0046685 | A1 | 8/2000 |
| WO | 01/46802 | A3 | 6/2001 |
| WO | 0144932 | A1 | 6/2001 |
| WO | 0152055 | A2 | 7/2001 |
| WO | 0223335 | A2 | 3/2002 |
| WO | 0239592 | A1 | 5/2002 |
| WO | 0246977 | A2 | 6/2002 |
| WO | 02091169 | A1 | 11/2002 |
| WO | 02091170 | A1 | 11/2002 |
| WO | 03001411 | A2 | 1/2003 |
| WO | 2004019613 | A2 | 3/2004 |
| WO | 2004114125 | A1 | 12/2004 |

OTHER PUBLICATIONS

Aether Technologies, Enterprise Data Wireless Center, Feb. 1999, pp. 1-17, Aether-Technologies-Enterprise-Data-Wireless-Center-Feb-1999.PDF.

AppForge Mobile VB™ Manual, Version 3.5.0, Mar. 14, 2003, downloaded Aug. 30, 2014 from URL:http://kiavash599. persiangig.com/mobile/AppForge-Manual.pdf/dl, pp. 1-325.

Chen, Anne, "Souping up wireless—XHTML will ease writing of apps for all types of devices." eWeek Jun. 4, 2001: 47. Printed from General OneFile database, Aug. 1, 2014. Document URL: http://go.galegroup.com/ps/i.do?id=GALE%7CA7CA75261579&v=2.1%&u=wat&it=r.

Document Object Model (DOM) Level 3 Core Specification, Version 1.0, W3C Working Draft Feb. 26, 2003, PDF downloaded Mar. 27, 2014,http://www.w3.org/TR/2003/WD-DOM-Level-3-Core-20030226//DOM3-Core.pdf, pp. 1-184.

Document Object Model (DOM) Level 3 Events Specification, Version 1.0, W3C Working Draft Mar. 31, 2003, PDF downloaded Mar. 27, 2014,http://www.w3.org/TR/2003/WD-DOM-Level-3-Events-20030331//DOM3-Events.pdf, pp. 1-109.

Document Object Model (DOM) Level 3 Load and Save Specification, Version 1.0, W3C Working Draft Feb. 26, 2003, downloaded Mar. 27, 2014,http://www.w3.org/TR/2003/WD-DOM-Level-3-LS-20030226/DOM3-LS.pdf, pp. 1-70.

Document Object Model (DOM) Level 3 Validation Specification, Version 1.0, W3C Working Draft Feb. 5, 2003, downloaded Mar. 27, 2014,http://www.w3.org/TR/2003/WD-DOM-Level-3-Val-20030205/DOM3-Val.pdf, pp. 1-38.

Document Object Model (DOM) Level 3 X Path Specification, Version 1.0, W3C Candidate Recommendation Mar. 31, 2003, downloaded Mar. 27, 2014,http://www.w3.org/TR/2003/CR-DOM-Level-3-XPath-20030331/DOM3-XPath.pdf, pp. 1-42.

EDC Wireless Developer Survey, vol. 2, 2002, pp. 1-231, EDC-Wireless-Developer-Survey-2002-2.PDF.

Eisler, Craig, "Action Engine Mobile Web Services Platform Overview," Sep. 1, 2002 (file metadata), downloaded Aug. 30, 2014 from

(56) References Cited

OTHER PUBLICATIONS

URL:https://web.archive.org/web/20030415213012/http://www.actionengine/com/docs/MWSPlatformOverview.pdf, pp. 1-14.
Final Office Action received for U.S. Appl. No. 15/180,144, dated Mar. 9, 2018, 14 pages.
Final Office Action received for U.S. Appl. No. 15/180,144 dated Nov. 16, 2018, 21 pages.
Final Office Action Received for U.S. Appl. No. 16/005,992 dated May 9, 2019, 35 pages.
Herschel Shosteck Associates, Ltd., "Putting Internet Content on Mobile Device," Jul. 1999, pp. 1-19, Shosteck-Putting-Internet-Content-On-Mobile-Devices-1999.
Hitesh, Seth, "Jax Pack! Bridging the gap between Java and XML technologies." XML Journal Jan. 2002: 36+. Downloaded from General OneFile database, Jul. 31, 2014, Document URL: http://go.galegroup.com/ps/i.do?id=GALE%7CA82260962&v=2.1%&u=wat&it=r&p=ITOF&sw.
Juric, Matjaz B, "J2EE as the platform for EAI: supporting open-standard technologies Part 1 of2. (Integrated Systems)." Java Developer's Journal Mar. 2002: 26+. downloaded from General OneFile database. Aug. 1, 2014. Document URL: http://go.galegroup.com/p.
Knudsen, Jonathan, "XML going wireless: parsing XML with Java 2, Micro edition." XML Journal Nov. 2001: 10 +. Printed from General OneFile database. Jul. 31, 2014. Document URL: http://go.galegroup.com/ps/i.do?id=GALE%7CA80192630&v=2.1%&u=wat&it=r&p=ITOF.
Lundberg, et al., "Bear Sterns Wireless Data Primer," Feb. 2000, Lundberg-Bear-Stearns-Wireless-Data-Primer-Feb-2000.PDF, pp. 1-22.
Mishima, Shun, "NTT Do Co Mo Presentation for Shosteck Group," Mar. 21, 2002, pp. 1-14, Mishima-NTTDoCoMo- Presentation-2002.pdf.
Morgan, Bryan, "Nokia Mobile Internet Toolkit 3.1," May 9, 2003, http://www.informit.com/articles/article.aspx? p=31695, Printed Dec. 22, 2018, pp. 1-2.
Muir, Angus, "Quck Quips From JavaOne," Mar. 27, 2002, downloaded from https://web.archive.org/web/20030803145256/http://www.microjava.com:80/articles/perspective/javaone2002, pp. 1-9.
"Nokia-Browsing-On-Mobile-Devices-White-Paper-2002," downloaded from Internet Archive, https://web.archive.org/web/20030704115346if_/http://nokia.com:80/downloads/solutions/mobile_software/XHTML_A4_0810.pdf, pp. 1-12.
"Nokia-Mobile-Terminals-White-Paper-2002," Downloaded from Internet Archive, https://web.archive.org/web/20030703150906if_/http://nokia.com:80/downloads/solutions/mobile_software/mobileterminals.pdf, pp. 1-16.
"Nokia-Web-Services-white-paper-2002," downloaded from Internet Archive, https://web.archive.org/web/20030703164658if_/http://nokia.com:80/downloads/solutions/mobile_software/Web_Services_white_paper.pdf, pp. 1-12.
Non-Final Office Action received for U.S. Appl. No. 15/180,144, dated Jul. 6, 2018, 21 pages.
Non-Final Office Action received for U.S. Appl. No. 14/454,829 dated Dec. 8, 2014, 41 pages.
Non-Final Rejection Received for U.S. Appl. No. 15/180,144 dated Sep. 20, 2017, 10 pages.
Non-Final Rejection Received for U.S. Appl. No. 16/005,992 dated Nov. 13, 2018, 36 pages.
Notice of Allowance received for U.S. Appl. No. 14/819,983 dated Jan. 13, 2016, 21 pages.
Notice of Allowance Received for U.S. Appl. No. 16/005,992 dated Oct. 31, 2019, 28 pages.
Notice of Allowance received for U.S. Appl. No. 14/454,829 dated May 8, 2015, 22 pages.
Notice of Allowance Received for U.S. Appl. No. 15/180,144 dated Mar. 21, 2019, 19 pages.
O'Neill, Mark, "XML without wires Part 1 of 2: yes, size matters. (compression techniques)."XML Journal Mar. 2002: 36+. Printed from General OneFile database, Jul. 31, 2014. Document URL: http://go.galegroup.com/ps/i.do?id=GALE%7CA84211692&v=2.1%&u=wat&it=.
O'Neill, Mark, "XML without wires Part 2 of 2: XML—relevant to both the wireless and the wired worlds. (wireless xml)." XML Journal Apr. 2002: 48+. Printed from General OneFile database, Jul. 31, 2014. Document URL: http://go.galegroup.com/ps/i.do?id=GALE.
Raybould, Neil, "Creating a mobile solution: using XML Web services with ASP.NET mobile controls." XML Journal Feb. 2002: 20+. printed from General OneFile database, Jul. 31, 2014. Document URL: http://go.galegroup.com/ps/i.do?id=GALE%7CA83077071&v=2.1%&u=.
Siegel, Jon, "Part 1 working with dynamic XML documents using COREA'S XML/value mapping." XML Journal Oct. 2001: 26+. Printed from General OneFile database, Mar. 18, 2014. Document URL: http://go.galegroup.com/ps/i.do?id=GALE%7CA83245229&v=2.1%&u=wat&it=r, pp. 1-7.
Srinivas, Pandrangi, "XML enabled applications: need for speed: here's help when your applications run into bottlenecks. (XML & performance)." XML Journal Jan. 2002: 56+. Printed from General OneFile database, Mar. 18, 2014. Document URL: http://go.galegro.
The Shosteck Group, "Image Sharing and MMS: What's Missing From This Picture?", The Shosteck Group Pulse, Apr. 2002, pp. 1-6, Shostek-Image-Sharing-and-MMS-What's-Missing-From-This-Picture-2002.PDF.
The Shosteck Group, "Lessons From Metricom and MobileStar: Success Factors for the Portable Internet Access Market," Jan. 2002, pp. 1-20, Shosteck-Lessons-From-Metricom-and-MobileStar.pdf.
The Shosteck Group, "The Adoption of High-End Phones, Part I: A Forecast for Multimedia Phones Through 2005," Jun. 2002, pp. 1-66, Shosteck-High-End-Phones-Part I-Platforms-final.pdf.
The Shosteck Group, "The Adoption of High-End Phones, Part II: Platforms and Industry Politics," Sep. 2002, pp. 1-58, Shosteck-High-End-Phones-Part II-Platforms-final.pdf.
W3C, "Modularization of XHTML", Apr. 10, 2001.
W3C, "XHTML 1.0 The Extensible HyperText Markup Language", Jan. 26, 2000.
Ward, et al, "Curl: A Language for Web Content," Sep. 25, 2002, Ward-et-al-Curl-A-Language-for-Web-Content-Sep. 25, 2002.pdf, downloaded from https://people.csail.mit.edu/ward/curl-ijwet.pdf, pp. 1-18, Ward-et-al-Curl-A-Language-for-Web-Content-Sep. 25, 2002.PDF.
Non Final Office Action received for U.S. Appl. No. 16/732,253 dated Mar. 3, 2020, pp. 38.
Non-Final Office Action received for U.S. Appl. No. 16/732,253 dated Apr. 7, 2020, 52 pages.
Non-Final Office Action received for U.S. Appl. No. 16/789,712 dated Apr. 1, 2020, 45 pages.

* cited by examiner

Basic Diagram of the Superstructure

Organization of an Object

An Overview of a Typical SQUI Screen

1200

Screenshot of an Example Static Application

Screenshot: Expression Interpolation

Screenshot: Variable Incrementing

Screenshot: Pizza Ordering Version 1.0

Screenshot: Pizza Ordering Revisited

Metaphors in Client Computing

COMPUTER PROGRAM PRODUCT PROVISIONED TO NON-TRANSITORY COMPUTER STORAGE OF A WIRELESS MOBILE DEVICE

CROSS-REFERENCE TO RELATED APPLICATIONS

This application is a continuation of U.S. patent application Ser. No. 16/732,253, filed Dec. 31, 2019, entitled "System and Method for Provisioning a Mobile Software Application to a Mobile Device", which is a continuation of U.S. patent application Ser. No. 16/005,992, filed Jun. 12, 2018, entitled "System and Method for Provisioning a Mobile Software Application to a Mobile Device", now U.S. Pat. No. 10,552,520, issued Feb. 4, 2020, which is a continuation of U.S. patent application Ser. No. 15/180,144, filed Jun. 13, 2016, entitled "Methods and Systems for the Provisioning and Execution of a Mobile Software Application", now U.S. Pat. No. 10,372,796, issued Aug. 6, 2019, which is a continuation of U.S. patent application Ser. No. 14/987,971, filed Jan. 5, 2016, entitled "Methods and Systems for the Provisioning and Execution of a Mobile Software Application", now U.S. Pat. No. 9,390,191, issued Jul. 12, 2016, which is a continuation of U.S. patent application Ser. No. 14/819,983, filed Aug. 6, 2015, entitled "Methods and Systems for Enabling the Provisioning and Execution of a Platform-Independent Application", now U.S. Pat. No. 9,311,284, issued Apr. 12, 2016, which is a continuation of U.S. patent application Ser. No. 14/454,829, filed Aug. 8, 2014, entitled "Methods and Systems for Enabling the Provisioning and Execution of a Platform-Independent Application", now U.S. Pat. No. 9,135,227, issued Sep. 15, 2015, which is a continuation of U.S. patent application Ser. No. 13/609,522, filed Sep. 11, 2012, entitled "Methods and Systems for Enabling the Creation and Management of a Platform-Independent Application", now abandoned, which is a continuation of U.S. patent application Ser. No. 12/691,721, filed Jan. 21, 2010, entitled "User Interface, Operating System and Architecture", now U.S. Pat. No. 8,307,331, issued Nov. 6, 2012, which is a division of U.S. patent application Ser. No. 10/659,762, filed Sep. 10, 2003, entitled "User Interface, Operating System and Architecture", now abandoned, which claims priority from, and is a nonprovisional of, both U.S. Provisional Patent Application Ser. No. 60/409,483, filed on Sep. 10, 2002, and entitled "User Interface, Operating System and Architecture" and U.S. Provisional Patent Application Ser. No. 60/428,163, filed Nov. 21, 2002, and entitled "User Interface, Operating System and Architecture", all of which are hereby incorporated by reference.

BACKGROUND

In recent years, the mobile computing marketplace has been flooded with smaller and faster personal devices. These next generation handhelds, cell phones, automotive telematics and personal information devices sport high resolution screens in excess of 320 by 240 pixels, processors faster than 300 MHz, and more than 16 Mbyte of dynamic RAM. New cell phones already in the marketplace combine traditional cellular technology with the power of a small personal computer. Future devices will create brand new breeds of handheld personal computers with unparalleled power, mobility, and battery life.

Despite these impending revolutions in device capability, the market has failed to produce common, underlying standards for mobile interfaces. Even in this nascent stage of device adoption, it is clear to industry observers that the wireless application market has become fragmented. JAVA-based technologies such as J2ME have been stymied with high hurdles to application qualification and numerous manufacturer-specific additions. MICROSOFT.NET technology, while promising, has been slow to grow on non-Intel platforms. Binary-based solutions like SYMBIANOS and BREW have failed to develop traction in a cautious market. Competing standards and interests in the industry among carriers, device manufactures, technology vendors, operating system vendors and application developer continue to plague the industry.

Several significant hurdles obstruct easy development of rich, widely deployable applications that run (at least partially) natively on a device:

Multiple platforms require porting code to a variety of different API standards. Even within a single architecture specification, different platforms have slight variations that require extensive testing and modification.

Competing languages (primarily C and JAVA) have no easy porting relationship.

Service operators have created qualification hurdles that require expensive certification tests for applications before they can be deployed on a given platform.

The industry has yet to agree on a common distribution mechanism for applications. Consequently, getting the application onto multiple devices becomes extremely difficult.

Various sets of interests must be satisfied before these devices will realize their widespread potential as business and consumer platforms: For example, end users seek a rich, easy-to-use interface and a cost effective and easy way to acquire and run mobile applications. Furthermore, they seek a user interface that is common across applications. Users want some reasonable assurances about the quality and integrity of the applications they receive. They are also interested in making greater use of the power and flexibility of the new devices.

Carriers, mobile operators, media companies and other entities seeking to provide and distribute applications must choose a means to encourage application developers while maintaining their own revenue streams. Also carriers maintain a high concern about the security of code running on the devices connected to their networks Developers (whether independent or employed by software companies) need platforms that are economically viable to develop upon, non-complicated and connected to distribution points or mechanisms capable of disseminating applications widely. Many developers are small software shops that cannot afford to develop on multiple platforms and seek multiple certifications from operators.

It would therefore be desirable to provide methods and structures that would address these concerns.

In this regard, it is worth noting that most computers in common use are based around the general computing model established by John Von Neumann in 1945. In this model, programs are written in the form of ordered lists of instructions and stored within the main memory of a computing system. Variations on this design since 1945 have led to the architecture of modem INTEL, POWERPC and other microprocessor-based systems. Even the JAVA platform by SUN MICROSYSTEMS, which uses a virtual machine that runs on host platforms, uses a variation on the Von Neumann architecture.

One implication of the Van Neumann machine is an opcode-based program execution model, in which instructions are written for the native processing language of the platform (or a virtual processing language in the case of JAVA). These instructions consist of programming opcodes that have varying degree of granularity. In some cases they can be as simple as very basic mathematics and memory loading and saving. In other cases, they are more advanced, where individual opcodes for object manipulation, memory allocation and I/O systems.

In this traditional execution model, a processor reads instructions from a memory location, decodes the instructions found there and performs some work, which may involve additional reading and writing of memory data. When the instruction is complete, and succeeding instruction is read, either the next instruction in sequence or an instruction at the beginning of a new sequence. In this way, complicated program behavior can be established through creation of algorithms, loops, conditional statements, etc. Those familiar with the arts of computer design are aware that modem implementations use extremely complex optimizations and heuristics to achieve greater performance in this basic model, including Intel's Superscalar architecture.

To ease the development of programming instructions for a computer application, programs called compilers translate a program from a high-level representation available in structured text, XML or some other human-significant format to the lower level machine language of the underlying hardware (or emulation of hardware.) In this case, a programming language with certain grammatical rules is established, and programs are written to conform to this specification. Examples of compiled languages include C, C++, JAVA, Fortran, and Cobol.

In the traditional execution model, programs wishing to access resources outside of their memory space must use a set of conventions supported by an operating system. These conventions allow each program that runs on a computer to access resources in a consistent and protectable manner. Such a convention may be regarded as an Application Programmer Interface (or API.) Typically, the API calls are triggered either by joining a program with libraries from the operating system at link-time or at run-time, or through the low-level triggering of interrupts, processor exceptions, or special memory regions that contain significance to the host operating system. Over time, these conventions have become quite extensive, where the typical operating system (such as WINDOWS 2000) contains tens of thousands of application programmer interface hooks, accessible either by shared library or through compile-time insertion of code. These APIs are typically an arbitrary organization of computer and operating system functionality and contain special rules. For instance, setWindowTitle( ) in WINDOWS cannot be called before a newWindowQ call has been made. The programmer is responsible for being consistent both to the rules of the language as well as the rules of the API.

In some cases, programs written at a high level are not compiled down into their machine-language equivalent. Instead, a native computer program written in machine-language acts as a emulating processor, reading an internal representation of a current instruction, executing it and then following its own rules for the selection of a subsequent instruction. These interpreted programming languages offer the benefit of greater flexibility for the language designer, easier implementation of a new programming language, usually at the expense of some efficiency since the a level of translation is always in place between the hardware processor and the internal instruction processor. Examples include PERL, versions of Basic, UNIX shell languages, PYTHON, etc.

Typical computer applications organize their information within their memory space using arbitrary data structures, which divide that space into meaningful chunks of data that can be referenced implicitly by the loading and saving operations of the processor. To the computer and to the operating system, these data structures are entirely private, and only the continuing flow of instructions through the processor gives these organizations any meaning. If a program wishes to save its context and state to resume execution later, it must conform to one of two constraints.

It must marshal up all of its relevant data and innermost state pertinent to the resumption of the program in a meaningful way, into a private or publicly structured serial bundle of data and save that data to a persistent location. When the program must resume, it must obtain information to resurrect its internal data structures in their previous state by decomposing the bundle of data it previously wrote. Variations on this model include placing data into a database, serial memory ring or other external structure. This strategy has the advantage that the state of the program could be resumed on a different platform or computer system than the original, however the application must take excessive care to ensure that every piece of data has been saved in an identifiable format.

It must save its existing buffer of memory, exactly as it was left, into a single large snapshot, disentangle any memory references maintained by the operating system and write the complete state of the processor to disk. A variation on this method is used by MICROSOFT's operating system in its hibernation mode, and by the old BSD tool "undump." This method requires very little work to decompose and marshal private data structure into a secondary form, however it contains a very stringent limitation: The application "image" can only be restored on a system that implements the same hardware and operating system state that the original program had run on. Any differences could cause unpredictable problems with the executable.

These complexities express themselves in the equally complex strategies computer programmers have used to construct computer programs that run on multiple systems simultaneously. For example, when a small, embedded device needs to perform some complex processing operation on a more powerful server, it must build a complete description of the work required, and then transmit it to the remote server. This involves yet another API between the small device and the remote device (e.g., SOAP, and the like).

Thus, the Von Neumann model and the program execution models that result from it, while useful and ubiquitous, present limitations that computer scientists and engineers have recognized but failed to address. Some of these limitations include:

Instruction Based Programming: Applications written for instantiations of the Von Neumann architecture must write their applications in the native (or emulated) code set of the given platform. Consequently, the ability for optimization after the code has been compiled lies within local heuristics usually available only to the instruction processor. Furthermore, the instructions must be processed linearly, which encourages a procedural style of programming where program code is largely instructive instead of descriptive.

Seeding Complex Data Structures: Applications that work with and manipulate complex nested data structures must populate those structures with either long lists of instructions (such as the list of instructions used to populate a user interface,) or the loading of those data structures from some other source. Vast medications to data structures after they have been initialized requires algorithms to be created within the program to manage the manipulations of the data. These algorithms can be complex and rely on an instructive model whereby the changes are made linearly step-by-step.

Remote Execution: Remote execution involves either migrating images of a running program to a second location, or through the explicit marshalling and unmarshalling of relevant computing data State Saving: Programs that are halted and wish to save their state for resumption at a later time must use one of the two difficult strategies listed above, each with potential drawbacks.

Private Application Structures: Applications store all of their data using implicit data structures within their memory core. Consequently, applications that wish to share data with each other or with the host operating system must perform a translation into some common format (such as published data structures, or XML, or whatever.)

API Issues: Each operating system and software component must provide an application programmer interface to bridge data and activities between the program and resources available to the computer, including the user interface. Thus, it would be desirable to provide methods and structures that overcome these limitations as well.

BRIEF SUMMARY

The present invention addresses these limitations of the prior art, by providing methods and structures, aspects of which will be referred to variously hereinafter as "the Simple Quick Go system," "SQGO," "SimpleOperatingSystem," "SimpleOS" and the like, that enable simple, cost-effective design, construction, deployment and distribution of rich applications for computing devices, particularly suited for wireless devices and other mobile computing devices and platforms.

One aspect of the invention provides a method for creating and managing platform-independent applications. In one practice of the invention, this method includes: generating a platform-independent data superstructure defining the appearance and behavior of an application, independent of the characteristics of a digital processing device on which the application is to be instantiated; instantiating the superstructure in the device, thereby installing the application for execution in accordance with the superstructure; updating, in response to events (which may include events generated by the application (indicative of application state), or by user or network input), information in a segment of the superstructure; and updating, in accordance with the superstructure segment update, the application state in the device.

In one aspect of the invention, the superstructure is an XML information structure. Application appearance and behavior are encapsulated within the superstructure, and application events are expressed to the superstructure via a pathway including a device-native operating system (OS) and a superstructure-dedicated OS acting as an intermediary between the device-native OS and the superstructure. In this way, a defined portion of the application can be addressed and updated in response to application events without necessitating update of the entire application, and the appearance and behavior of the application can be propagated with consistency across heterogeneous device types, to enable cross-device interoperability, replicability, and compatibility of applications and data with a consistency of user experience.

Among other aspects that will be discussed in detail below, the invention also includes a programming language adapted for effectively constructing, interacting with and manipulating the superstructure and the SimpleOS.

In another aspect, the application instantiated in the device includes an associated user interface whose behavior and state are defined by the superstructure. In a wireless or other handheld device, the interface can be advantageously adapted to be manipulated by a simple four-way controller actuated by a user's thumbs.

In a further aspect, methods are provided for device-to-device or cross-network communications and application deployment using the superstructure described in detail below.

It should be noted that SimpleOS is but one implementation of the broader concepts of the invention. An operating system with a different design could also be used to implement the broad concepts described herein, particularly that of a Superstructure-Based Application Environment ("SBAE"). In other words, the structures and methods described and illustrated by way of example herein are but selected implementations of the broad concepts of the invention. Many variations are possible and within the spirit and scope of the invention. Further aspects and implementation examples of the invention will next be set forth, in connection with the various drawing figures.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

BRIEF DESCRIPTION OF TABLES

Figure 1A:
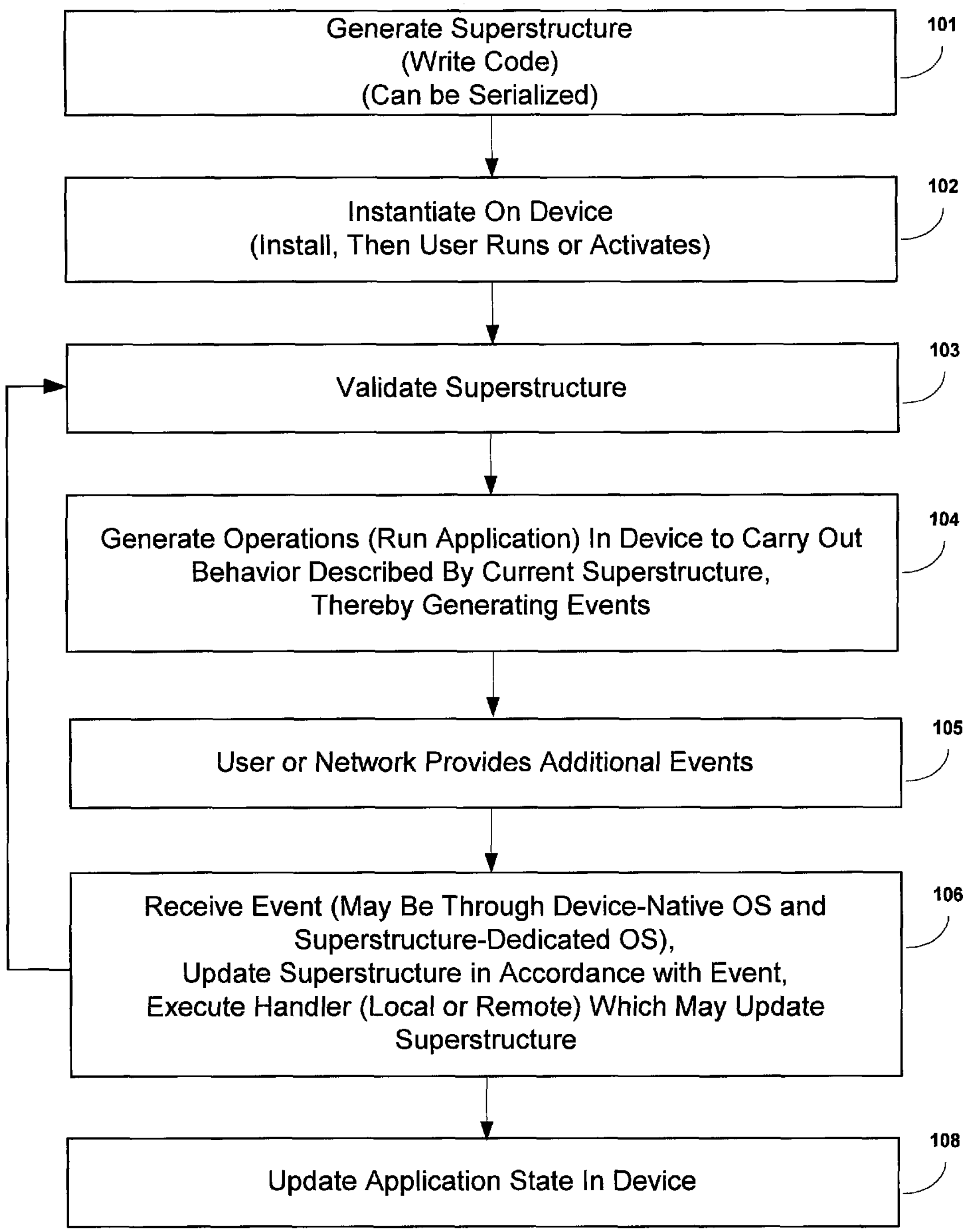
FIGS. 1A-3 are flowcharts depicting methods in accordance with the invention.

Table 1 depicts a stylesheet example;

Table 2 depicts a simple object with a data tree;

Table 3 shows examples of identifiers;

Table 4 depicts examples of object data members;
Table 5 depicts defining methods for an object;
Table 6 shows a sample definition of an SQCard;
Table 7 depicts a sample frame definition;
Table 8 shows an example of defining the initial card;
Table 9 presents a static SimpleOS application example in SQML;
Table 10 shows four core programming modes;
Table 11 shows phases of the execution cycle;
Table 12 provides a synopsis of event handler modes;
Table 13 depicts the availability of modes within code contexts;
Table 14 shows an example of in-line event registration with code;
Table 15 shows in-line event registration for a method;
Table 16 shows in-line event registration to a server;
Table 17 depicts fields in a message descriptor;
Table 18 provides an example of a basic message descriptor;
Table 19 provides an example of combining in-line registrations with message descriptors;
Table 20 provides further detail regarding the Hello World example;
Table 21 depicts SQML tag attributes;
Table 22 shows an example of expression interpolation in text elements;
Table 23 gives an example of expression interpolation in attributes;
Table 24 shows an example of an object with a single variable;
Table 25 provides an example of an object with a string variable;
Table 26 provides an example relating to an object with a numeric variable;
Table 27 relates to an example of variable incrementing;
Table 28 provides a summary of examples of globally available variable attributes;
Table 29 relates to scalar attributes;
Table 30 relates to list methods;
Table 31 provides an example relating to the use of "This";
Table 32 shows declaring list variables;
Table 33 depicts a pizza ordering example;
Table 34 shows building a list of objects;
Table 35 shows text field extraction;
Table 36 provides examples of mathematical expressions;
Table 37 provides an example of instance variables;
Table 38 shows method definition;
Table 39 provides an example of evaluation tags in a method;
Table 40 shows method invocation;
Table 41 provides method invocation examples;
Table 42 shows variable masking;
Table 43 shows variable masking with element identifiers;
Table 44 provides examples of declaration order;
Table 45 shows blocks and variable scope;
Table 46 provides an example of an IF block;
Table 47 shows further detail of the pizza ordering example;
Table 48 gives an example of the body of a message;
Table 49 provides a summary of intrinsic methods;
Table 50 shows an example of serialized data;
Table 51 shows using fragments to update an application;
Table 52 relates to nodes;
Table 53 provides a summary of security threats and responses;
Table 54 provides a simple stylesheet example;
Table 55 shows a complex stylesheet example; and
Table 56 provides a comparison of remote computing paradigms.

DETAILED DESCRIPTION

The following detailed description of the invention is organized into the following sections:

I: Overview
II: SimpleOS Software Concepts
III: Composition of the Superstructure
IV: Programming SimpleOS Applications
V: SQScript Language
VI: Superstructure Operations
VII: Network Communication and Remote Execution
VIII: Security
IX: Stylesheets
X: Additional Features

I. Overview

In one aspect, the invention provides a method for enabling the creation and management of platform-independent applications. In one practice of the invention, the method (see FIG. 1A) can include generating a platform-independent data superstructure defining the appearance and behavior of an application independent of characteristics of a digital processing device on which the application is to be instantiated (101), instantiating the application-defining superstructure (and thereby the application) on a device in accordance with the superstructure so that it can then be activated or run (102); validating the superstructure (103); generating operations (i.e., running the application) in the device to carry out the behavior defined or described by the current superstructure, thereby generating events (104); providing (by way of the user or a network) additional events (105); receiving the events, updating the superstructure in accordance with the events, and executing a handler (local or remote) which may update the superstructure (106); repeating the cycle by returning to validation (103); and as appropriate, updating, in accordance with the superstructure update, the application state in the device (108). These aspects are described in greater detail below.

In one practice of the invention, the superstructure is a hierarchical information structure (see FIGS. 9 and 10, discussed in greater detail below). More particularly, the superstructure can be an XML structure. Application appearance and behavior are encapsulated within the superstructure, and application events are expressed to the superstructure via a pathway including a device-native operating system (OS) and a superstructure-dedicated OS acting as an intermediary between the device-native OS and the superstructure (FIG. 1A, 106). In this way, a defined portion of the application can be addressed and updated in response to application events without necessitating update of the entire application, and the appearance and behavior of the application can be propagated with consistency across heterogeneous device types, to enable cross-device interoperability, replicability, and compatibility of applications and data with a consistency of user experience.

In a further aspect of the invention, the superstructure can be serialized in whole or in part at any time (101).

Figure 1B:
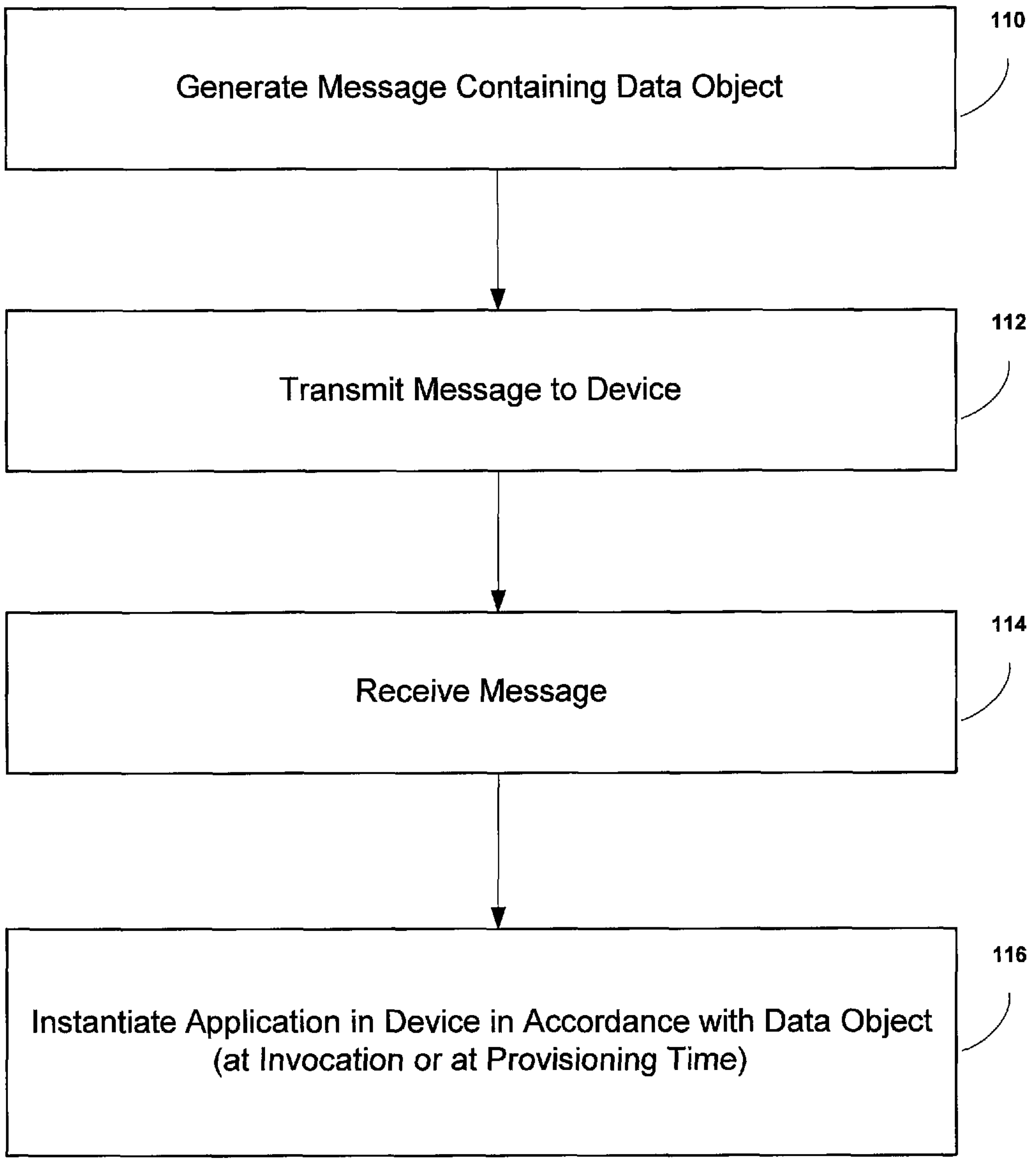

A method according to the invention can also include (see FIG. 1B) generating a message containing a data object of a defined type operable to instantiate the application in a device (110), transmitting the message to a device operable to instantiate the application in accordance with the data object (112), receiving the message at the device (114), and instantiating the application in the device in accordance with the data object in the received message (116). The instantiating of the superstructure inside the target device can occur substantially when the application is invoked, or at an application provisioning time prior to application run-time (116).

Figure 1C:
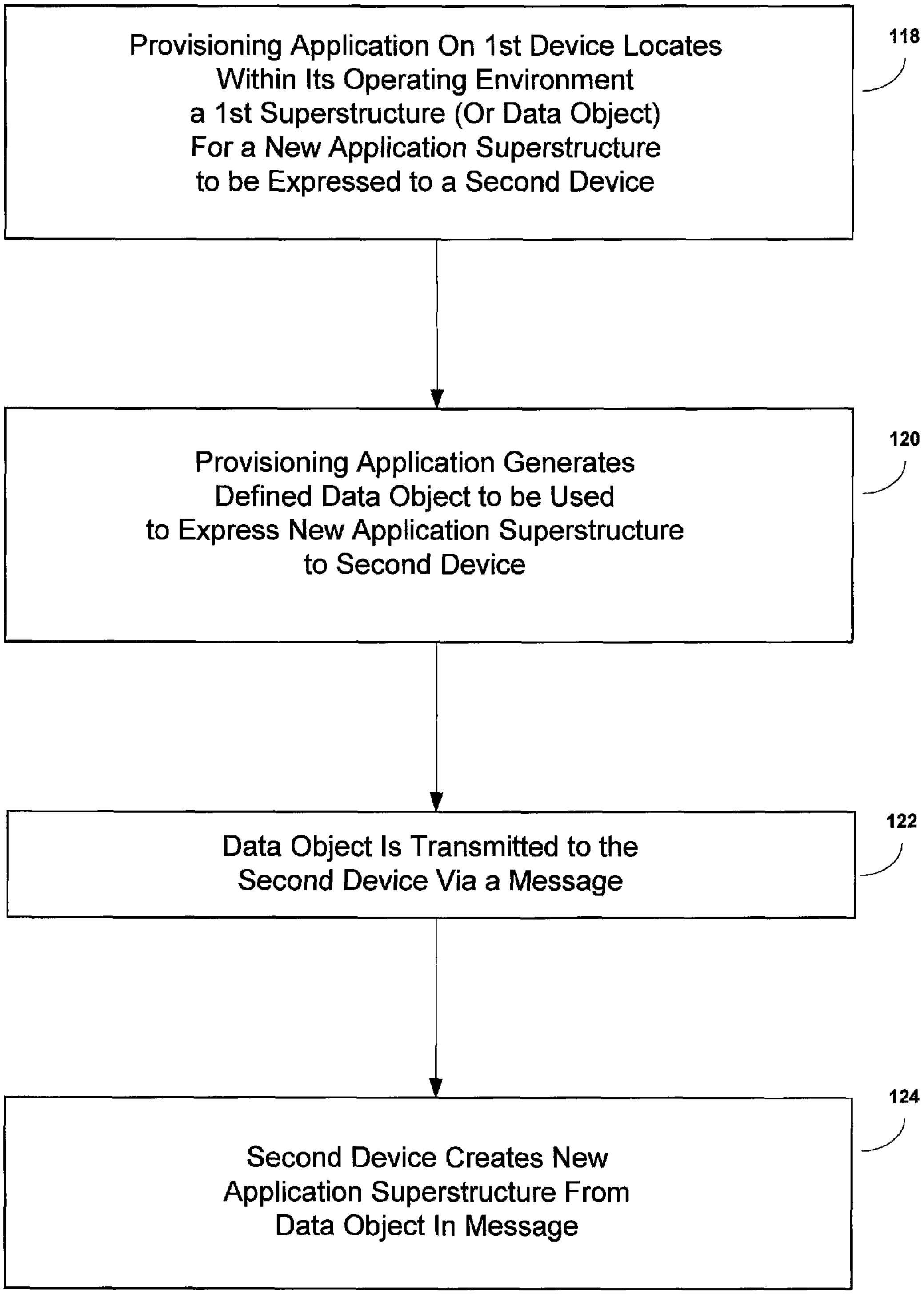

In a further aspect of the invention (FIG. 1C), a provisioning application on a first device can locate within its operating environment a first superstructure for a new application superstructure to be expressed to a second device (118). The provisioning application can then generate a defined data object to be used to express the new application superstructure to the second device (120). The data object is transmitted to the second device via a message (122), and the second device creates a new application superstructure from the data object in the message (124). (In accordance with the invention it is contemplated that the latter can be accomplished by any operating system, or by SimpleOS.)

Alternatively, the provisioning application on a first device can locate within its operating environment a predefined data object that expresses a new application superstructure for a second device (118). The predefined data object can then be transmitted to the second device via a message (120), and the second device creates its own copy of the new application superstructure from the data object in the message (122, 124). (Here again, in accordance with the invention it is contemplated that this latter can be accomplished by any operating system, or by SimpleOS.)

Figure 1D:
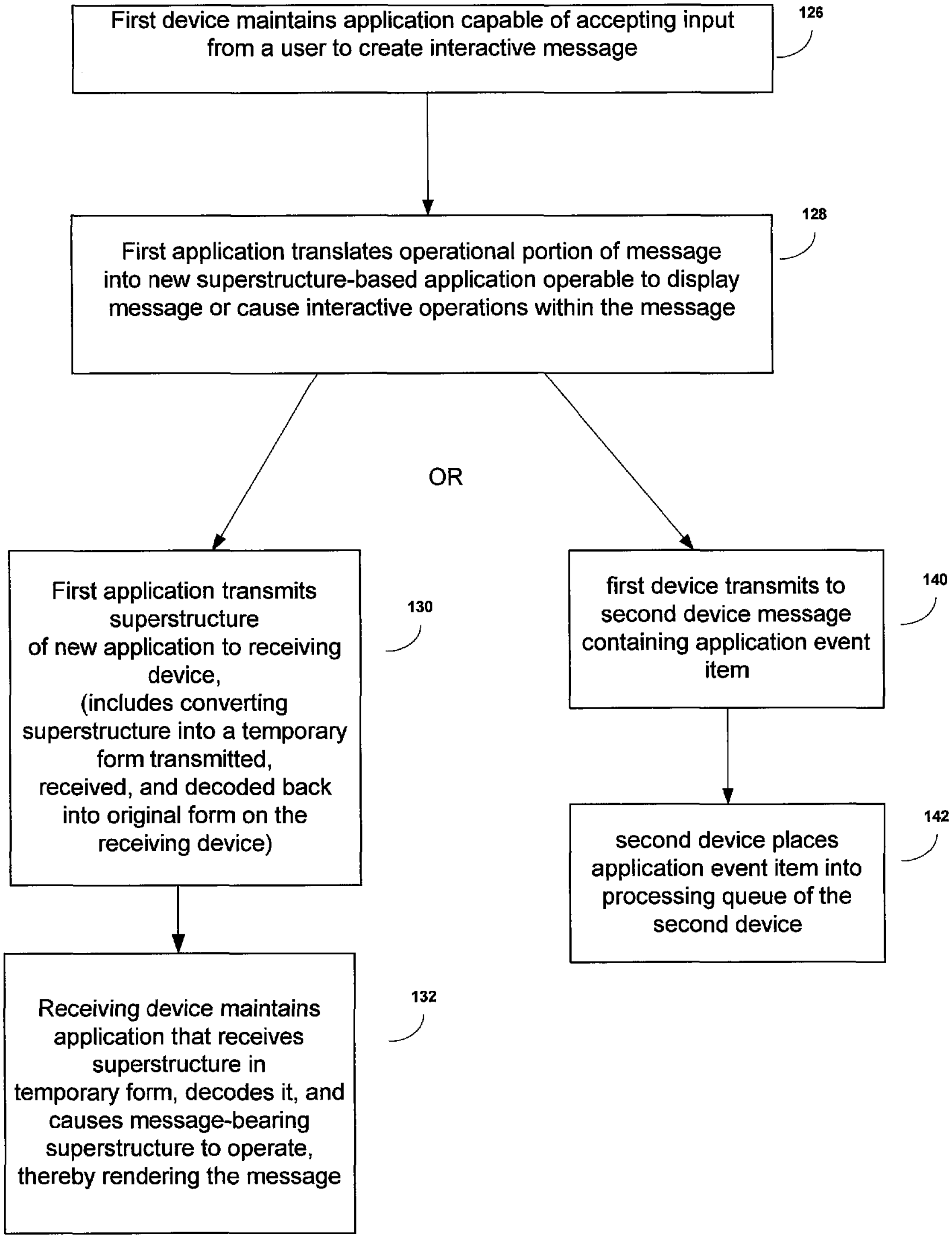

In a further practice of the invention (FIG. 1D), a first device can maintain an application capable of accepting input from a user to create an interactive message (126). The first application can then translate an operational portion of the message into a new superstructure-based application operable to display the message, or cause interactive operations within the message (128); and the first application then initiates the transmission of the superstructure of the new application to a receiving device (130). The transmission of the superstructure can include converting the superstructure into a temporary form that is transmitted, received, and decoded back into an original form on the receiving device (130); and the receiving device can maintain an application that receives the superstructure in its temporary form, decodes it, and causes the message-bearing superstructure to operate, thereby rendering the message (132).

In addition, a first device can transmit to a second device a message containing an application event item (140), and thereby cause the second device to place the application event item into a processing queue of the second device (142). This can be, for example, the SimpleOS processing queue.

In describing the operation, function, and interpretation of the superstructure, it is useful to note a distinction between the superstructure itself (a hierarchical information structure with various properties) and the "grammar" of the superstructure (which, by convention, describes a mapping between the data in the superstructure, and the behavior of an application). That mapping between data and behavior can remain the same across implementations of SimpleOS to ensure that the superstructure, and applications operating in accordance with the superstructure, retain a consistent look and feel.

In accordance with the invention, for a given state of a selected application, the organization of the superstructure can be substantially invariant, regardless of the device, platform or device-native operating system environment in which the associated application is instantiated, so as to maintain a consistent application appearance and behavior across heterogeneous devices, platforms or device-native operating system environments, without substantial changes in the code or data structures of the application. The design of the superstructure can define rules of appearance and behavior of the application that are substantially invariant across heterogeneous devices, platforms or device-native operating system environments; and substantially identical application source code can be used across heterogeneous devices, platforms or device-native operating system environments. Using the superstructure concept, a user interface (or GUI) provided by the application can have a substantially identical appearance and behavior across heterogeneous devices, platforms, or device-native operating system environments. It is not simply that applications will have a consistent appearance, but that because the superstructure maintains a "clean" abstraction around a common user interface (assisted by stylesheets as described below), this mechanism can ensure that the same superstructure will result in identical appearance and operation on any device.

Figure 1E:
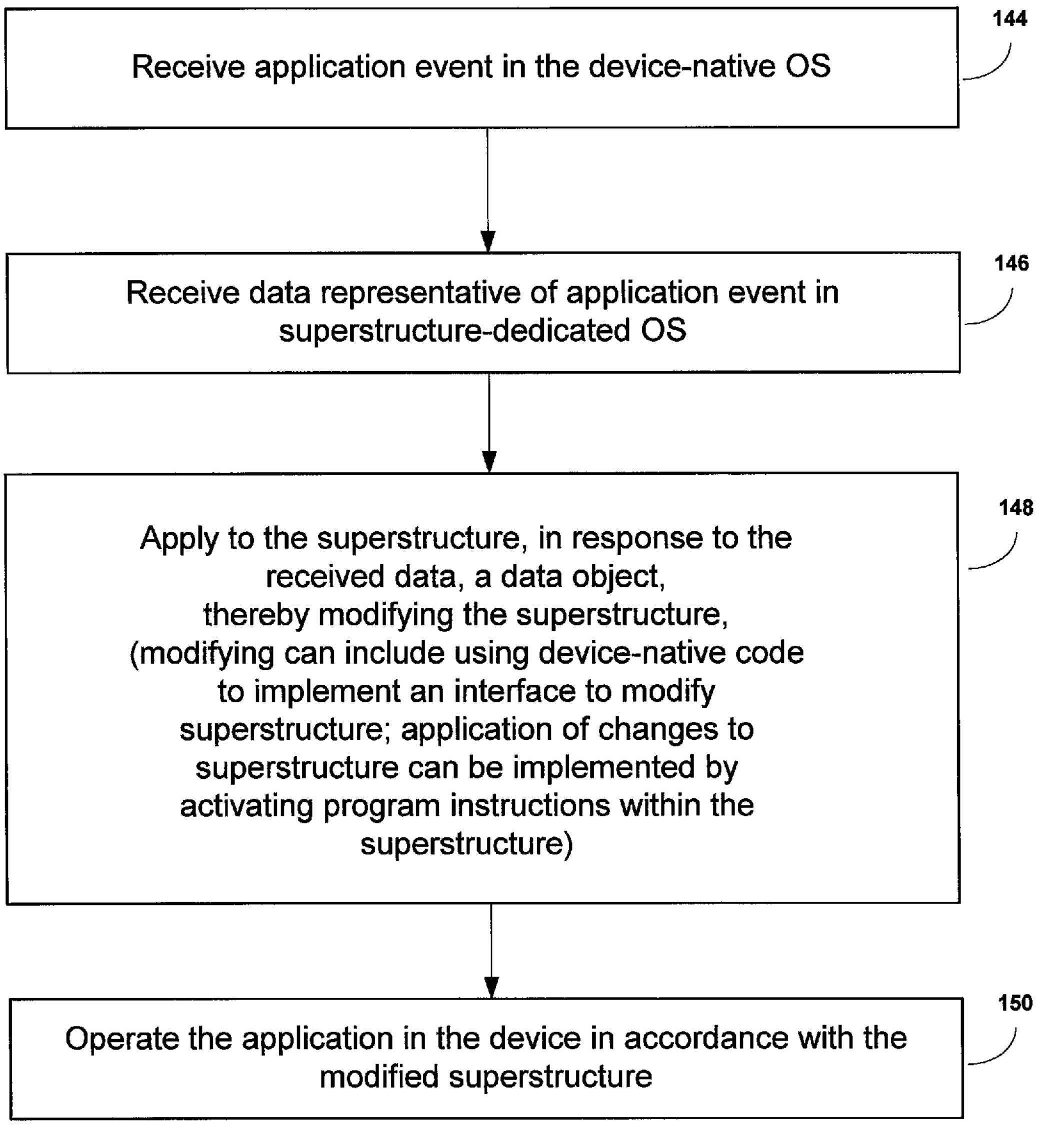
Figure 1F:
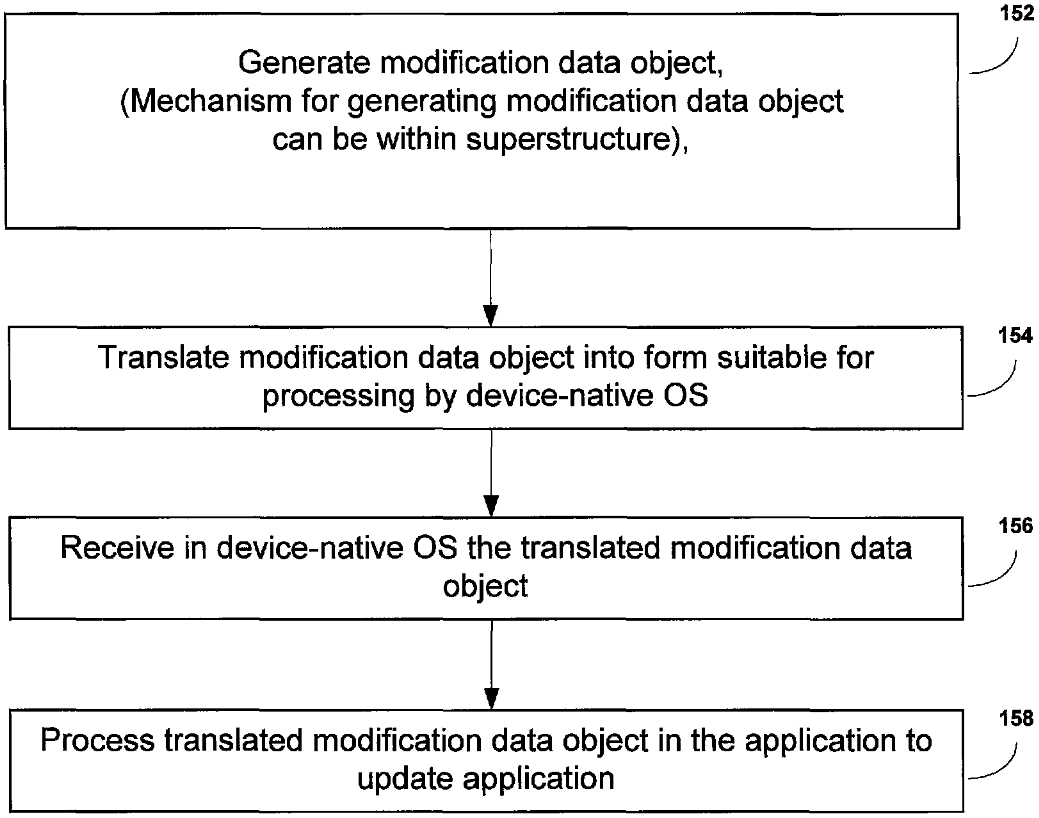

In one practice of the invention, operation of the application is implemented through operations on the superstructure. The operation (FIG. 1E) can include receiving an application event in the device-native OS (144), receiving data representative of the application event in the superstructure-dedicated OS (146), applying to the superstructure, in response to the received data, a data object, thereby modifying the superstructure (148), and operating the application in the device in accordance with the modified superstructure (150). This can further include (FIG. 1F) generating a modification data object representative of the modification to be applied to the superstructure (152), translating the modification data object into a form suitable for processing by the device-native OS (154), receiving in the device-native OS the translated modification data object (156), and processing the translated modification data object in the application to update the application (158). The method can also include expressing within the superstructure a mechanism for generating the modification data object (152).

Figure 1G:
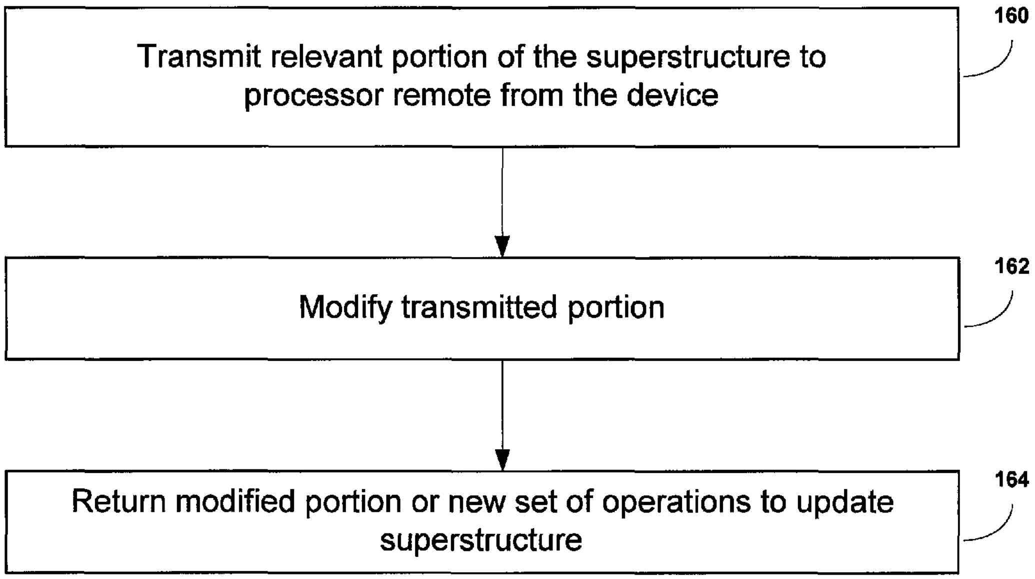

Still further, the step of modifying the superstructure can include (FIG. 1G) transmitting a portion of the superstructure to a processor (such as a server) remote from the device (160), modifying the transmitted portion (162), and then returning the modified portion or a new set of operations to update the superstructure (164).

The modification process can include using device-native code to implement an interface to modify the superstructure (148). The application of changes to the superstructure can be implemented by activating program instructions within the superstructure (148).

Figure 1H:
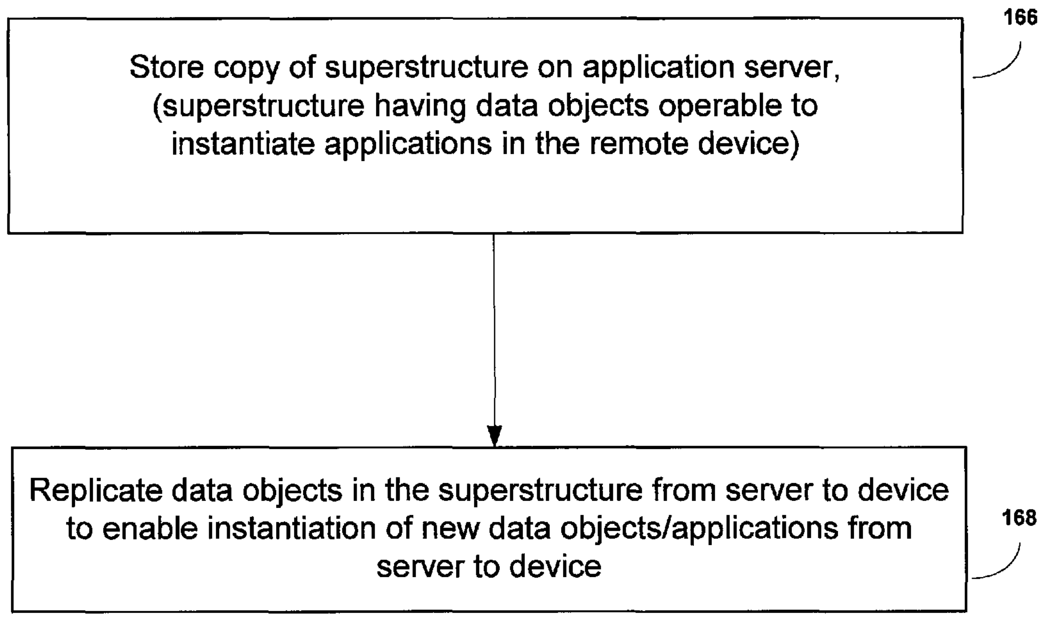

The invention can also be implemented in a network environment. For example (FIG. 1H), a copy of the superstructure can be stored on an application server operable to communicate with a remote device across a network comprising the application server, the remote device, and a communications channel therebetween (166); the superstructure can include data objects operable to instantiate applications in the remote device (166), and the network can be configured to provide communication of applications between the application server and the remote device by replicating data objects in the superstructure to the remote device via the communications channel, so as to enable instantiation of new data objects and applications from the server into the remote device (168).

Figure 1I:
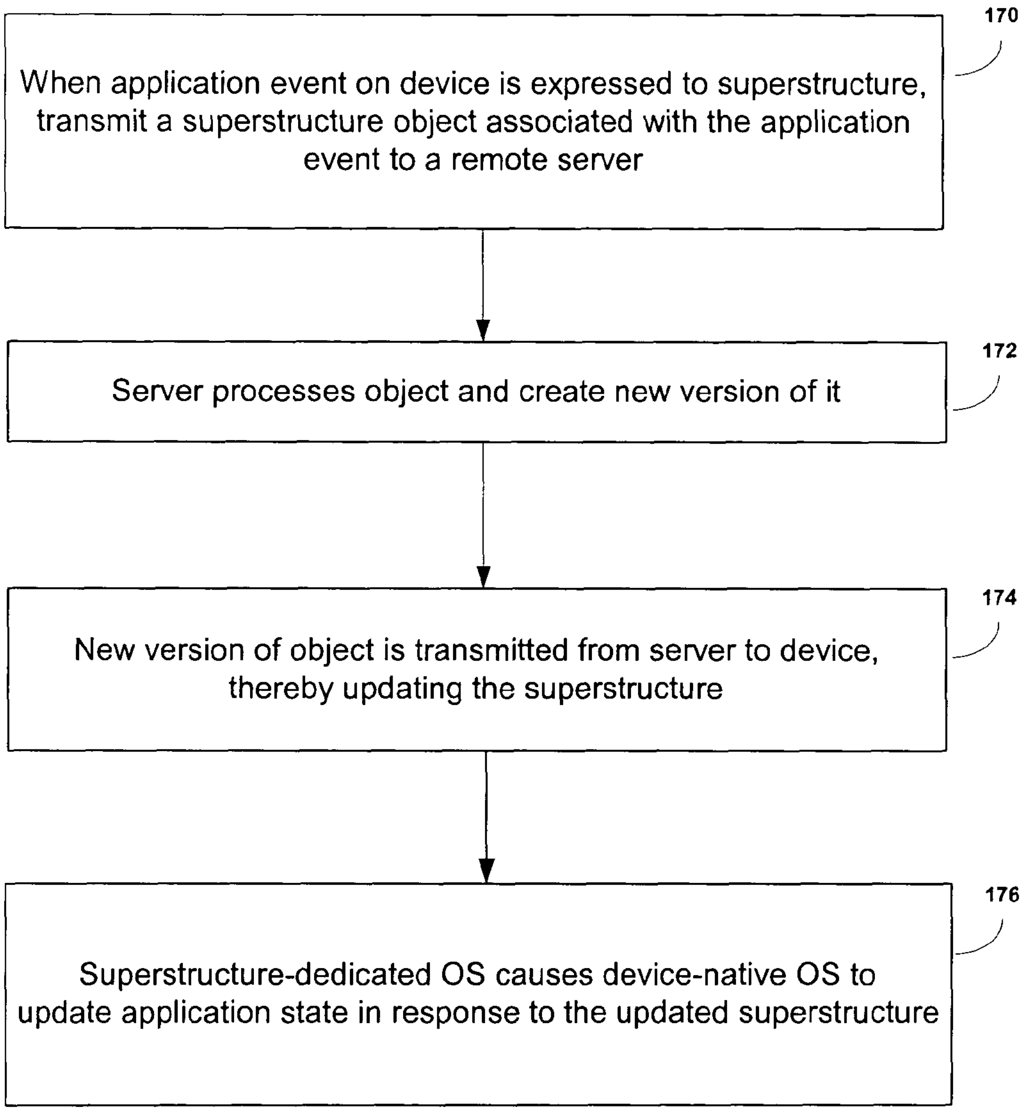

In a network implementation of the invention, when an application event is expressed to the superstructure (FIG. 1I), a superstructure object associated with the application event can be transmitted via a communications pathway from the device to a remote server (170); the server can process the object and create a new version of it, in response to the application event (172); the new version of the object can be transmitted from the server to the device to replace the existing version of the superstructure object, thus updating the superstructure (174); and the superstructure-dedicated OS can cause the device-native OS to update the application state in response to the updated superstructure (176).

The described methods can also include providing updates to an application's state from the server to a remote device, by defining a minimal change set to the application's state and transferring it across the network from the server to the remote device, without the necessity of adapting code therefor.

Similarly, application logic can be distributed across the network by obtaining a portion of the logic from the remote device and transmitting it in a hierarchical form to the server without the necessity of adapting code therefor.

It is contemplated that the network can include a plurality of heterogeneous devices, communications channels and communications providers servicing the communications channels. (See, for example, FIGS. 4, 5, 6, and 7, which depict examples of a network using the invention, a client device, a server, and SimpleOS on a client device, respectively.) In such an instance, the superstructure can define a given application to have an appearance and behavior that can be propagated with consistency across the heterogeneous devices, communications channels and communications providers, to enable cross-device interoperability, replicability, and compatibility of applications and data with a consistency of user experience. In particular, the superstructure can be substantially free of device-specific data, modifications to the superstructure can be made in a substantially device-independent manner, and a real-time image of an application running in a first device can be expressed across the network from the first device to a second device to yield a viable instantiation of the application in the second device, regardless of device environment, wherein the organization of the superstructure and the meaning of objects within it remains substantially constant between instantiations in various device environments. Note that (as discussed in detail below) the superstructure is capable of completely expressing the running state and functionality of an application operating in a first device, and the application can be substantially identically instantiated into a second device, without loss of state or functionality, by expressing the superstructure into the second device. (It will be appreciated by those skilled in the art that the implementer can ensure this property by maintaining the same convention of meaning for interpreting the superstructure in a given device.)

Figure 1J:
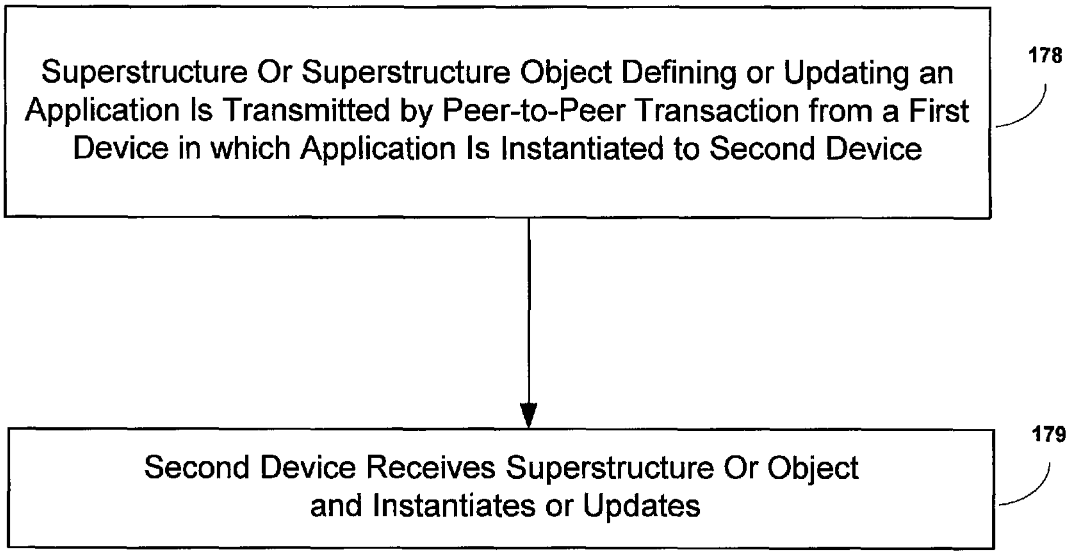

Alternatively, an application defined by the superstructure can be transmitted via a peer-to-peer transaction from a first device in which the application is instantiated, to a second device for instantiation in the second device (FIG. 1J, 178, 179).

Among other possible variations, a method according to the invention can include validating the superstructure upon or after modification (106, FIG. 1A). If done after modifying the superstructure, the validating can include validation of data updated by processing of an event, so that the modified superstructure cannot express a harmful change to the device-native OS. The method can be configured such that an application defined by the superstructure can produce external changes only by invoking operations that operate on the superstructure, thus enhancing security. (This is described in greater detail below.) The methods of the invention thus provide (among other features) an interface between an application and a system service, wherein the interface is defined by interaction between the superstructure and the superstructure-dedicated OS.

Another aspect of the invention is an information processing language adapted to interface with the structures (and superstructures) described above, wherein the language (1) can be expressed entirely within the superstructure, and is capable of (2) expressing a set of transformations within the superstructure, and (3) of utilizing and modifying data only within the superstructure. In this way, applications utilizing the language cannot affect the state of other applications or operate outside a bounded application container to affect an underlying device platform. This organic, structural feature further enhances security.

A superstructure can also contain stylesheets (910, FIG. 9) for defining selected application or presentation characteristics. These stylesheets can be configured on a per-device basis, or on a per-group-of-devices basis. Stylesheets can also be expressed within the superstructure, independent of device-specific limitations. A stylesheet can then be selected at application runtime. This helps resolve the need to present a consistent look and feel for the superstructure across devices with different characteristics, without the need to embed device-specific logic into the design of the superstructure itself.

Figure 1K:
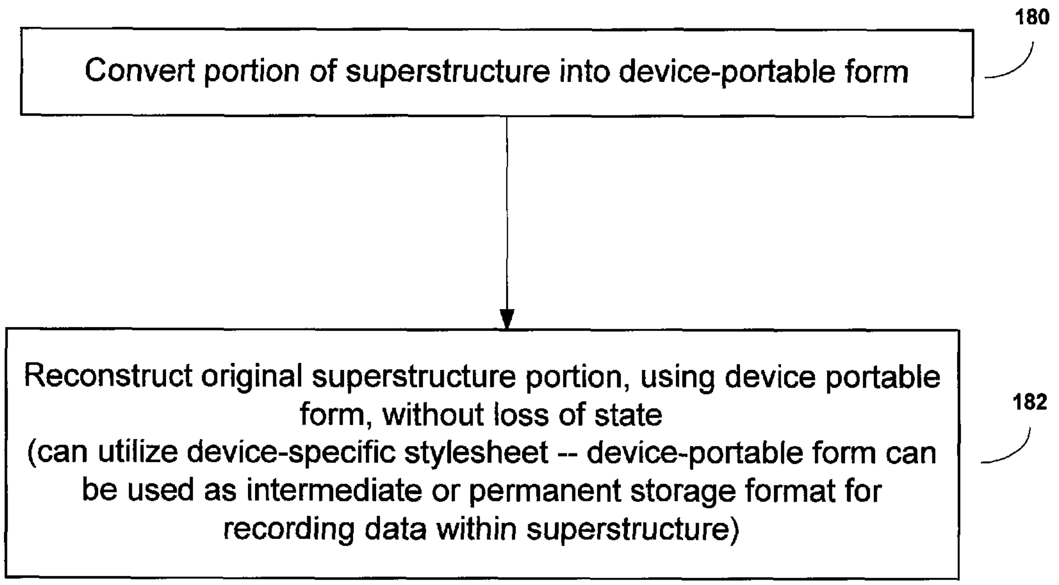

The invention can also include (FIG. 1K) converting at least a portion of the superstructure into a device-portable form, independent of the present state of the application (180), and reconstructing the original superstructure portion, on the same or different device context, using the device portable form, without loss of state (182). This reconstructing can include using a new device-specific stylesheet. The device-portable form can be used as an intermediate or permanent storage format for recording data within the superstructure (182).

Among other variations of the methods and structures described herein, the superstructure can be organized into objects and classes (904, 906, 908, FIG. 9, described in detail below). The superstructure can also contain data structures adapted to be interpolated, and interpolation can occur whenever a device-native operating system requests data from the superstructure. The described methods can also include incorporating media assets into the superstructure, for reference by running applications, and/or incorporating by reference media assets outside the superstructure, for reference by running applications.

In another aspect, the application instantiated in the device includes an associated user interface (GUI 502, FIG. 5) whose behavior and state are defined by the superstructure. In a wireless or other handheld device, the interface can be advantageously adapted to be manipulated by a simple four-way controller, of known design, actuated by a user's thumbs (512, FIG. 5).

As described in greater detail below, the example of an SBAE operating system known as SimpleOS is adapted to run on otherwise conventional apparatus such as handheld processing devices (Personal Digital Assistants (PDAs) or others), laptop computers, desktop computers or other known microprocessor-based systems, such as those shown in FIGS. 4, 5, 6 and 7, which typically include conventional processing components such as RAM, ROM, CPU and bus elements.

Figure 4:
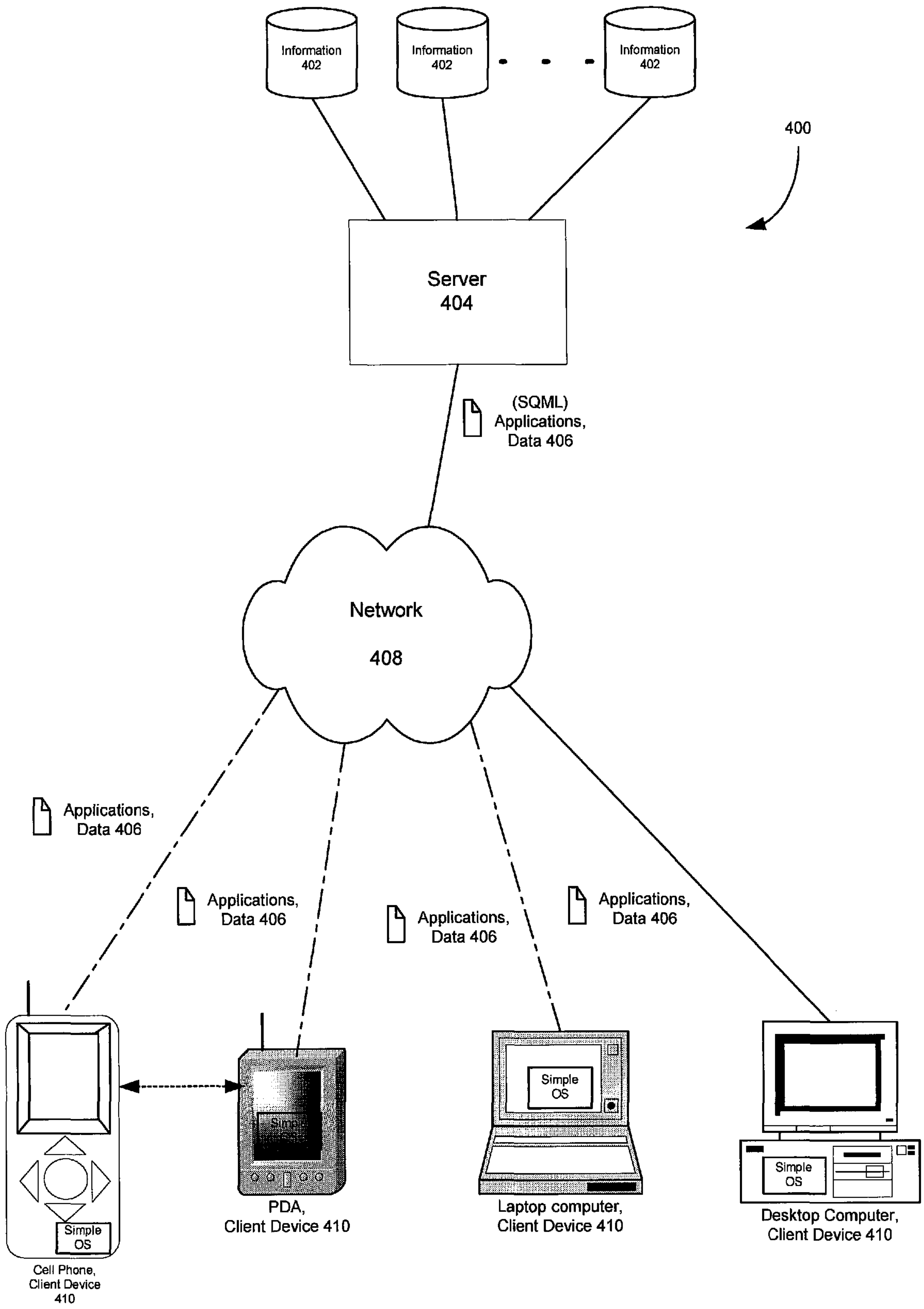
FIG. 4 is a schematic diagram depicting a network utilizing the present invention.

For example, FIG. 4 shows a network in which the invention can operate, including a conventional server 404 of known design and function, operable to communicate with conventional information storage elements 402 and a conventional inter-network or communications channel (such as the Internet, World Wide Web, or other) 408. Inter-network 408 is operable to communicate, in a known fashion, with client devices 410, which as shown in FIG. 4, can include (but are not limited to) a conventional cellphone, PDA, laptop computer, and desktop computer (such as an IBM Personal Computer or equivalent). By way of example, the cellphone can include a conventional 4-way controller of the type having arrow keys and a central "actuate" key, as well as other thumb-actuated keys below. These physical control elements, which are shown in greater detail in FIG. 5, are used, in one practice of the invention, to provide input to a GUI that can be instantiated, maintained, modified and updated by SimpleOS, examples of which are shown and described in connection with FIGS. 11-19 below.

Figure 5:
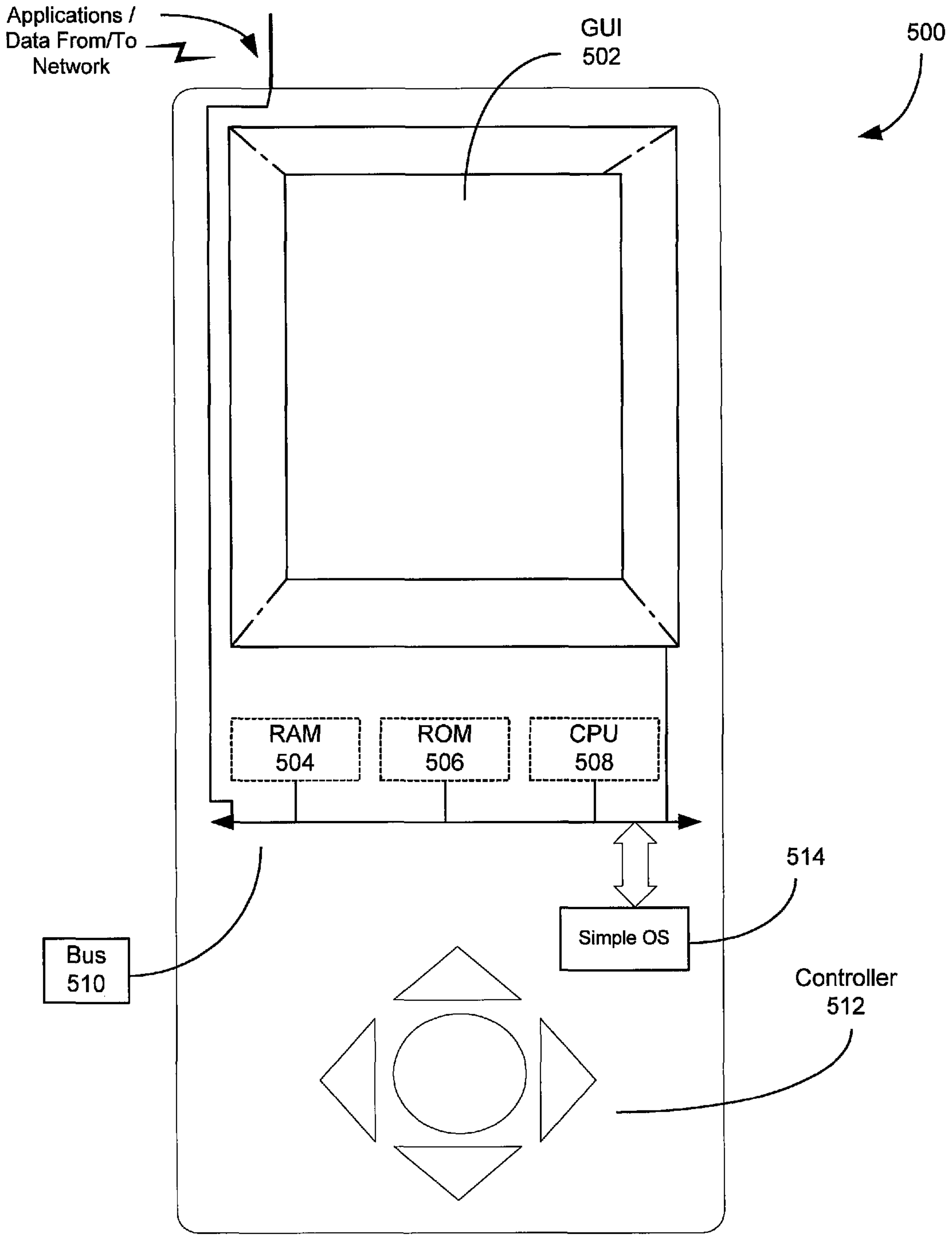
FIG. 5 is a schematic diagram depicting a client device utilizing the invention.
Figure 6:
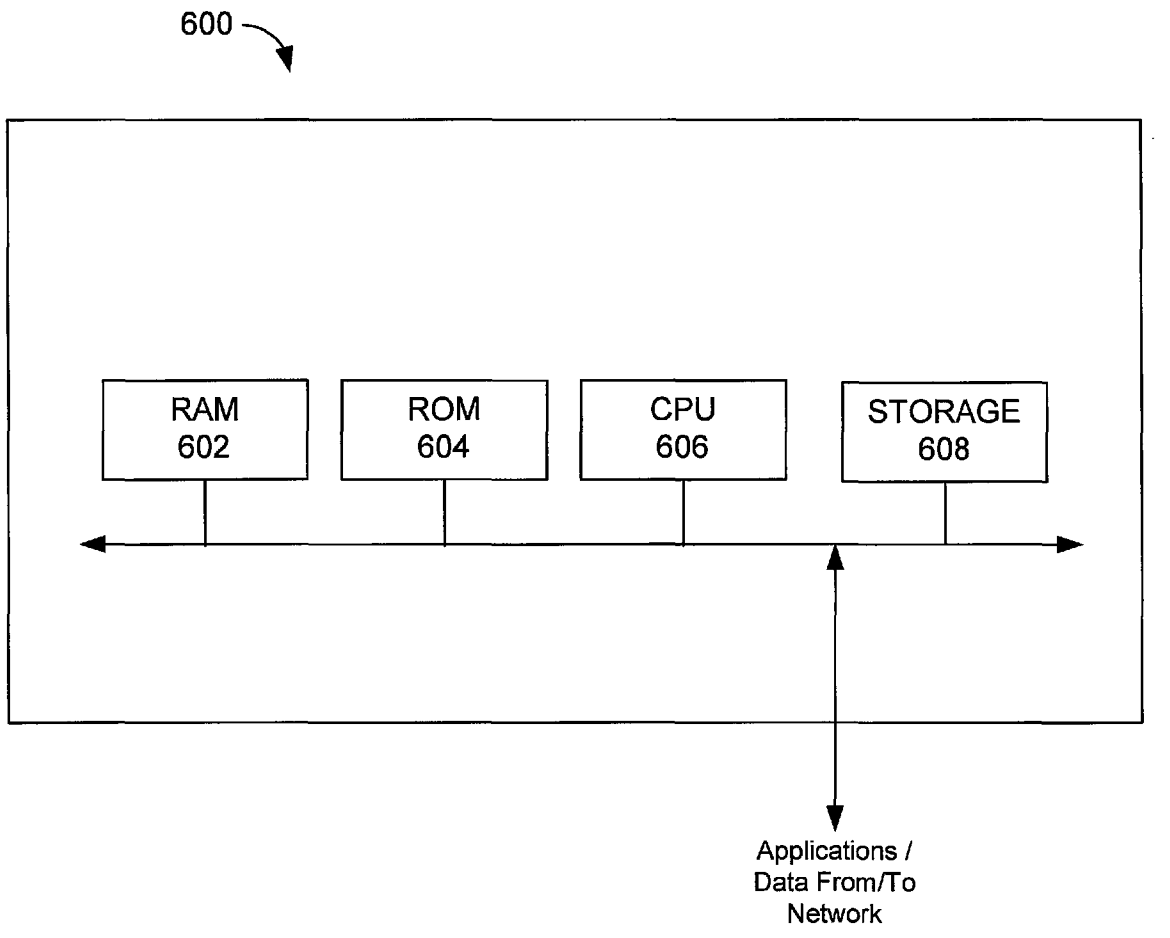
FIG. 6 is a schematic diagram depicting a server that can be used in conjunction with the invention.

Similarly, FIGS. 5 and 6 show examples of a conventional client device 500 (cellphone, PDA or other device of the type represented by element 410 in FIG. 4) and a conventional server 600 (of the type represented by element 404 of FIG. 4), respectively, operable in accordance with the invention. The client device 500 of FIG. 5 is typically conventional in design and construction, including RAM 504, ROM 506, a CPU 508, a bus 510, GUI 502, and 4-way controller keys 512. In accordance with the invention, the instantiation, operation, maintenance, and updating of applications (and the GUI) can be controlled by SimpleOS 514 as described below. The interaction between the 4-way controller, SimpleOS, applications, and the GUI is also described below.

The server 600 of FIG. 6 is also typically conventional in design and construction, including such components as RAM 602, ROM 604, CPU 606, and Storage 608, collectively operable to communicate applications and/or data to and from the network.

Figure 7:
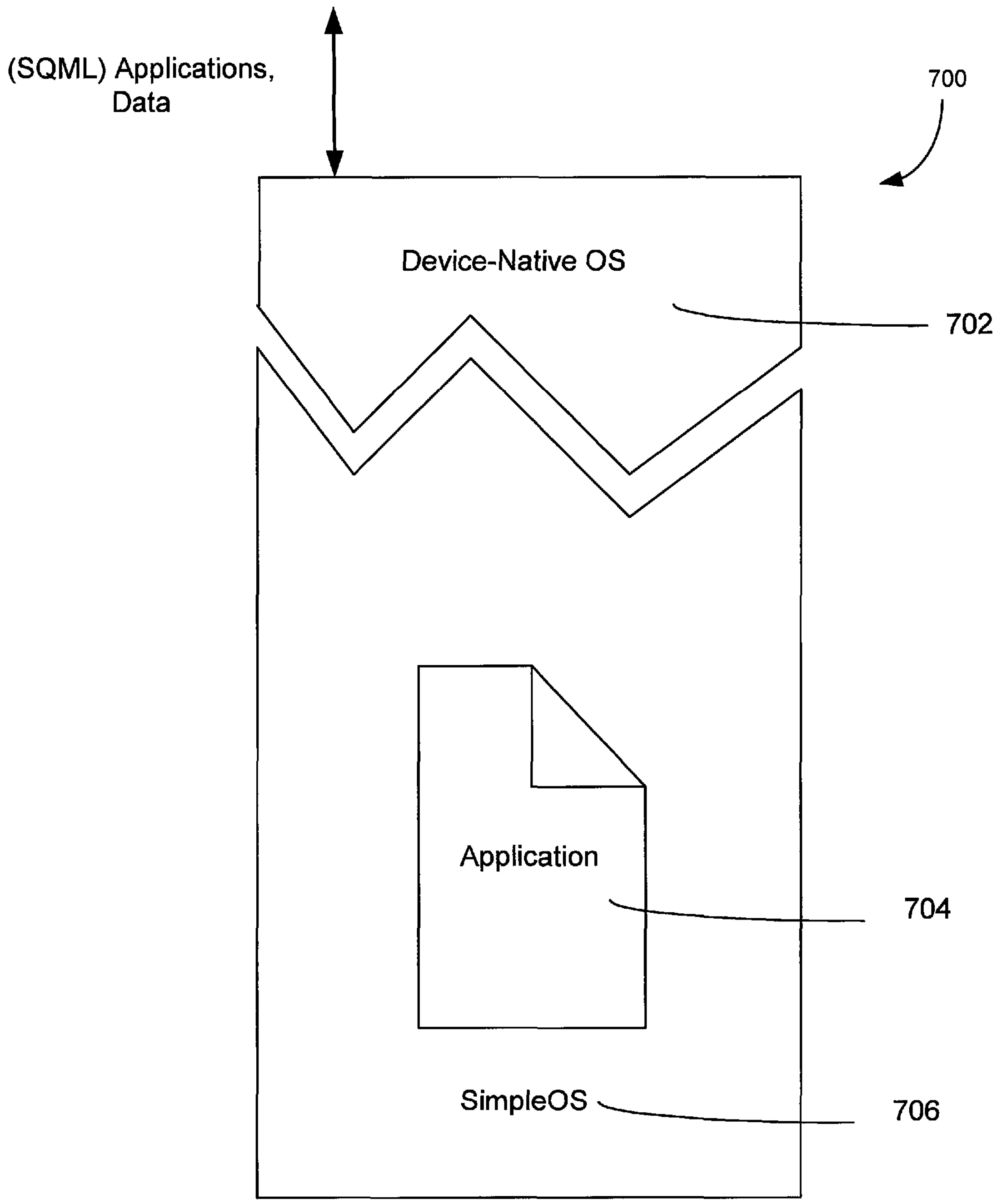
FIG. 7 is a depiction of an example of the SimpleOS on a client device.

FIG. 7 shows the relationship between SimpleOS 706 (in connection with an example of an SBAE in accordance with the invention), a device-native operating system 702, and an application 704 in a client device 700. This relationship is described in greater detail below. Similarly, in the examples of each client device shown in FIG. 4, SimpleOS is operating to receive and process applications and data 406 as described below.

II: SimpleOS Software Concepts

In one embodiment, SimpleOS is optimized for the deployment of task driven (and usually, network-aware) applications with a focus on easy user interactivity, sound, and a four-function user interface. The major goal of the SimpleOS design is to produce a way to create a client-side application optimized for a small mobile device that can be developed and tested on many individual device platforms without a lot of extra work. The operating system includes many features in its design to address the shortcomings of other mobile technologies and allow applications to be secure, easy to develop and easy to distribute among a variety mobile operators.

Although the programming model set forth herein is entirely different from previous industry designs, it does share a common feature with many platform-independent environments in that it achieves its portability through the creation of a well-defined interface. SimpleOS places an abstraction layer on top of a host operating system such as JAVA, BREW, or WINDOWS that allows all operating system resources to be consistently accessed by an application program described in XML. However, SimpleOS does not follow the model of WAP or UIEvolution where programs are either document-based or procedure-based. As will be demonstrated later, SimpleOS is a blend between document and descriptive-based programming and procedural object-oriented programming.

The Superstructure: A central SimpleOS feature is the concept of the superstructure, a unifying data structure that contains the state, program code, and internal logic of each application. All of the aspects of a program that would normally be controlled through private data structures, procedural code, and application programmer interfaces are incorporated into the superstructure.

Note that the superstructure can also contain data in a private form determined by the execution environment, separate from the "public" aspects of the superstructure viewable by the application.

Additionally, while the superstructure may be represented as a Document Object Model (DOM), its properties while running a SimpleOS-based application are significantly different. The operating system actively "watches" the superstructure as it changes in accordance with application state, and is optimized to accommodate small running changes to its hierarchical structure. Further, the operating system takes an active role in updating the superstructure and in triggering application hooks (which can also be stored within the superstructure) as a result of activity outside of the application. When a superstructure-based application is not running, or is paused, its entire state can be transferred into an XML object via a DOM or other means.

It is also significant that the SimpleOS model in part builds on an established concept in the art of XSLT transforms, where documents of one grammar are transformed to documents of a new grammar programmatically. However, SimpleOS's use of this building block is new. SimpleOS uses a transformation language similar to XSLT to manipulate parts of a superstructure entirely within the same grammar, and provides a constant "feedback loop", in which the output of the transformation is applied back into the superstructure causing operating system changes, and then fed back into the transformation again during the next event. To the extent these similarities are maintained in one practice of the invention, it is because they render it convenient for expressing changes to tree structures. The syntax of other languages and/or grammars could be used equivalently.

Product and Implementation: As a product, SimpleOS will appear as software that runs as a native program in a host operating system. It runs along with other provisioned applications on the device, and appears as a single application. However, the SimpleOS software is really a container for a collection of SimpleOS applications that run inside of it (i.e., an application "player" similar to a Flash player or JAVA Runtime Environment). The host operating system can include any C or JAVA based operating system including BREW, J2ME, PALMOS, WINCE, STINGER, WINDOWS, MACINTOSH, and LINUX. To these host operating systems, SimpleOS appears as an application that can be run in the given device—for instance, a .PRC in PALMOS or an .EXE in WINDOWS. In certain situations, SimpleOS can be configured so that applications inside of the container appear as though they are "peers" to other non-SimpleOS applications on the device. However, when the user activates these applications, they will internally run inside a single instance of the SimpleOS native application.

Isolated, Strong Container: SimpleOS provides an isolated container that protects all running SimpleOS programs from the host environment. SimpleOS uses a strong security design that emphasizes a complete interface firewall between an application and the host environment. Within SimpleOS, a developer's code may only access a central, well-protected document structure (the superstructure) as a means to manipulate its environment. All of the functionality that would normally be described using library or API calls is completely hidden from the application. In fact, it would be impossible for the application's code to perform any work other than to modify the application's own data structure. The document structures forming different SimpleOS applications are completely isolated from each other.

Consistent Interface to Multiple Platforms: The attached FIG. 8 summarizes how SimpleOS will provide a consistent interface to multiple platforms by plugging into the various API signatures of its host environment.

Figure 8:
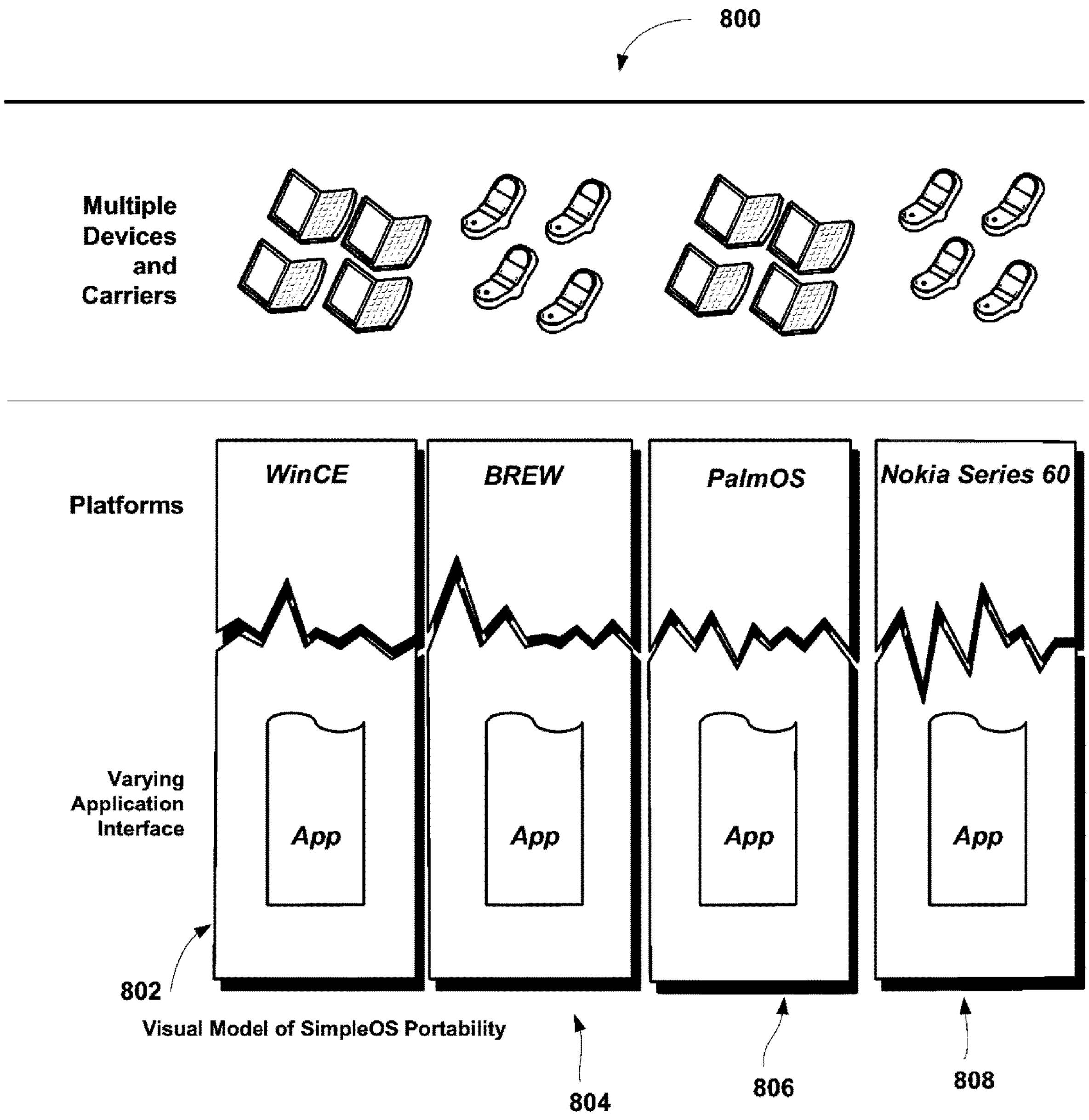
FIG. 8 is a schematic diagram depicting SimpleOS Portability.

As shown in FIG. 8, SimpleOS implementations can be developed on a variety of mobile and desktop platforms 802, 804, 806, 808 using the C or JAVA language. In most implementations, the actual code of the SimpleOS product can be divided into platform-specific and platform-general code. This can enhance the potential for reuse of code within a particular programming language since different environments can swap in their own platform-specific set. For example, early versions of SimpleOS based in the C programming language contained the core functionality written in 100% pure ANSI C that did not contain any operating system calls, I/O functionality, or floating-point code. A set of adapting modules allows this platform-neutral component to run on a variety of real platforms such as WIN32 and BREW.

Durable Abstraction Layer: SimpleOS creates a durable abstraction layer over a host operating system that allows programs to be written in a platform-independent way, since the basic document structure that governs each application is substantially similar, not matter what platform it is running on. One practice of the invention expresses the initial state and application code of the application using an XML grammar called SQML. SQML, like HTML, is a textual document format that allows information to be represented in a platform-independent way. However, unlike HTML, which was designed only to represent documents, SQML is designed to represent an entire SimpleOS program. Like JAVA, SimpleOS simplifies application development by providing a consistent platform across many host operating systems. However, unlike, JAVA which achieves cross-platform consistency by means of a universal machine language, SimpleOS achieves cross-platform consistency by its use of SQML SimpleOS introduces a paradigm shift away from the traditional programming style of programming languages and application programmer interfaces and toward a model in which the entirety of the application—the program code, application data and network communication—is completely described and operated upon using SQML. SimpleOS's brand-new model of computing is based around tree-manipulations and the complete removal of application programmer interfaces. The heart of this model is the superstructure, a data structure that resides at the core of SimpleOS processes.

It will be appreciated that other portable hierarchical and non-hierarchical structures may exist that could convey an application with the properties described herein, other than an XML structure, or a tree structure with the SQML grammar described by way of example herein. However, SQML itself, and in relation to a running SimpleOS program, enables a number of implementation-specific optimizations that allow SimpleOS to be better understood by users and more compatible with other systems or technologies that may need to interact with it. It should be noted, at any rate, that SQML could take a number of different forms, other than those illustrated below by way of example.

Superstructure Operations

The superstructure is more than just a data structure—it is the entire dynamic state of the running program, including all of its program code and data. The superstructure not only organizes the program code and data, but it also governs the execution model of the entire application. As the program runs, the superstructure evolves and changes dynamically as an exchange between the operating system and the application. The operating system translates external events, such as user interaction, into changes to the data values within the superstructure and activates application code also located within the superstructure. When the application code reacts to a change, it responds by updating parts of its own central structure. When the operating system observes theses change to the superstructure, it invokes services and library calls on behalf of the application. This intermediate step provides additional opportunities for verifying the request and optimizing it, and helps create an "interface firewall" between the application and SimpleOS. The operating system is free to choose whatever sequence or action must be taken to implement the change as it is described, freeing the program from any explicit knowledge of the particulars of the current host operating system.

The superstructure is thus the common ground between the operating system and the running application. The operating system is not required to maintain private state or data structures about the application's previous interactions since the two do not maintain any conversational interfaces such as API calls. The data that forms the specific shared assumptions between the application and the operating system exist entirely within the superstructure itself. This approach is entirely different from the traditional API or library interface model of programming that relies on application-private and operating-system private state to provide a barrier and retain the "conversation." Nothing in the present invention, however, prevents the ability to maintain private state if desired or useful.

Tree Structure Manipulations: Because the superstructure is a tree, application code preferably can be restricted only to operations that involve manipulating trees. All outside data is delivered in the form of a tree, and external changes to an application occur exclusively as a result of tree operations. Consequently, application code is based entirely around tree transformations, and the work done by the application is descriptive. There is no explicit application programmer interface (API) needed for SimpleOS programs. However, an API can still be employed if desired, and the nature of the present invention allows the possibility of using an API. For interactions that are based more on "verbs" as opposed to descriptions, such as low-level network or physical events (such as ejecting a disk), the descriptive approach may be less compelling.

Traditional Models vs. SimpleOS

In the traditional programming model, the programmer writes code using a programming language that is compiled into the native instruction set or machine code of the target platform. In the case of byte-code interpreted languages like JAVA or Perl, the machine code that results from compilation is not the machine code of the native hardware, and further translation or interpreting is necessary for execution of the code. The programming language itself typically only supports program decision-making, mathematical operations, control-flow, and other computing fundamentals. In order to perform anything beyond pure computation, the programmer uses a platform-specific library of external Application Programmer Interface (API) calls to perform functions not provided by the programming language. These functions typically include such operating system functions as file input/output, memory management and process control, as well as functions provided by a program library, for example a graphics library. Therefore, within the traditional programming model there is an abstraction barrier between the application and the operating system based on the operating system's API.

Traditionally, the operating system's API acts as an intermediary between the state and assumptions of the operating system itself and the internal state the application. The operating systems own data is hidden from the application, often in a protected area of memory. The API is the only means for the application to change the state of the operating system. The API may be thought of as a set of services that the operating system provides to its applications.

In existing programming environments, the API is needed to enforce the separation of state between the assumptions and data space of the application and its host operating system. Typically, the application manages its own data structures by dividing its binary address space into areas implicitly separated by the weaving of the program code, stack frames, heap allocations, etc. Typically the programmer crafts useful abstractions inside this private memory area to help in the operation of the program and keep track of its conversational state with the operating system. The operating system is completely ignorant of the private data structures of the application. Similarly, the operating system manages its tasks by creating private data structures to represent outside interaction and providing API calls for the application to modify these OS private structures as part of its conversational state.

Note that in referring to "conversational state" herein, the applicants refer to the back-and-forth API calls between a traditional application and a traditional operating system. By way of example, consider opening a file and writing to it. In such a case, the application asks for a file handle from the operating system. The OS then allocates some private structures to account for the transaction on its end, and then passes something back to the application, called a file-pointer or stream handle, or something that the application then private stores. When the application writes to the file, it must pull up that value or number, and use it to reference the file with the OS. The present invention, in contrast, is much more like memory mapped IO, in which the file itself is reflected into the superstructure. The application asks for the file to be opened by setting up a node in its superstructure with a filename. The operating system sees this new node, and maps the contents of the file into the superstructure. The application then reads from it, just as if the entire file were part of the superstructure. The advantage of this is that using well-known techniques such as paging and buffers, the operating system can very efficiently maintain this virtual structure (i.e., that the entire file is part of the superstructure).

Figure 3:
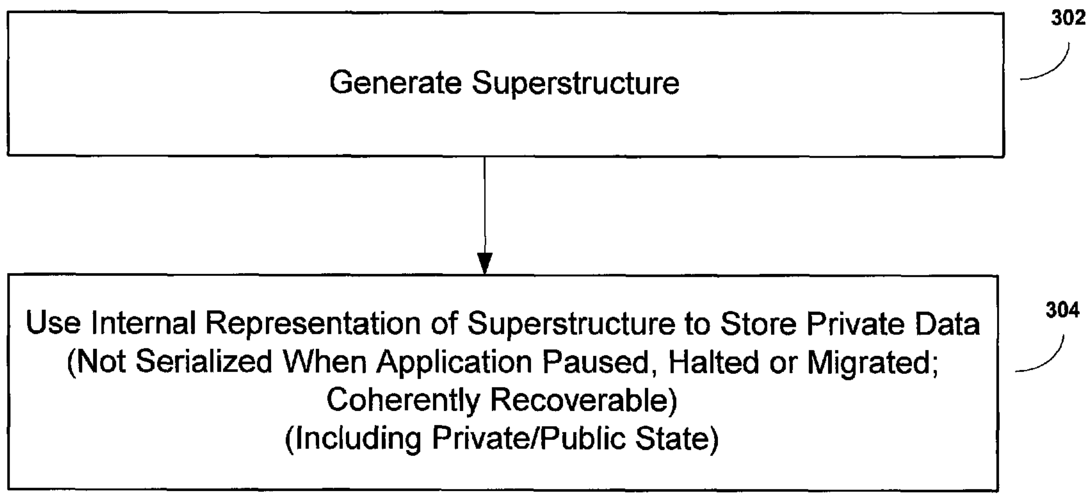

In addition, as schematically shown in FIG. 3, the operating system can use the internal representation of the superstructure (i.e., the portion that the application does not "see") as a hook for placing private data related to the request (304, FIG. 3). The superstructure must internally be represented as a set of objects with references, a set of structures with pointers or the like. Either way, there is a private representation of the superstructure that the SimpleOS implementation uses to store in the host's architecture. The noted structure can be used to store data beyond just the contents of the superstructure. It could also store private information related to the particular state or data type of the node. For example, the file-opening node discussed above could be represented as a data structure that has a "spare field," readable only by the OS, that contains the file pointer provided to SimpleOS from the host operating system. This private data is not serialized when the application is paused, halted or migrated, but it provides a convenient place to store this information that is precisely organized in an efficient manner for the SimpleOS implementation while the implementation is running (304, FIG. 3). The result is an ability to store non-conversational data in a completely recoverable way, so long as the private data can be re-established upon deserialization based on public data that has been maintained in the superstructure. This is primarily for efficiency.

SimpleOS does not require an API because it does not allow the application to explicitly invoke its services. Instead, the SimpleOS operating system acts as a constant observer to the superstructure. When the application changes its superstructure, the operating system automatically invokes the services that are needed to perform the change in the outside world. When outside events occur, the operating system passes them down into the superstructure by manipulating data values inside and providing notification to the application. The superstructure completely replaces the explicit invocation of outside resources in an application.

Another way to view the difference between SimpleOS and traditional models is the structure of the code. In the traditional model, the program is prescriptive. Like a recipe, it provides a list of instructions to the operating system that prescribe a particular activity, such as "draw a dialog box here, then add a button, then render some text." In the SimpleOS model, code is descriptive. The SimpleOS application describes the final state of what it would like to happen ("a dialog box on the screen, with a button and some text"). The operating system takes this description and determines the optimal way to implement the change Using the superstructure concept described herein, the invention in effect provides a way to adapt the paradigm of memory mapped IO to accomplish substantially every task within an operating system, not merely file writing.

Contents of the Superstructure

The superstructure includes the entire nature of an application program. Application program code, private and public data, graphical user interface configuration and virtually every single aspect of a program is kept together in a single, highly organized data structure containing the shape of a tree. An application's permanent and running state is entirely defined by the superstructure, including: Every detail about the user interface, including colors, text, positioning, user elements, screens, backgrounds, sounds and controls; All internal application state, including local data, state variables; All client-side application code, in the form of message registrations and transformations. The composition of the superstructure is described in detail in "Composition of the Superstructure" below. For now, it is important to know that the superstructure is internally defined as a single, very extensive tree that contains objects that describe the state of the application and its interaction with the operating system. Each node inside the superstructure can contain attributes and children nodes.

Programming Paradigm

The XML source of a SimpleOS application is not a program structure that is interpreted or compiled. Instead, it can be the seed image of the initial state of the superstructure. When a program is started, this seed image populates a new superstructure for the application.

The state of the superstructure at any point in the execution of a SimpleOS process may be represented in SQML. An application's state may therefore be captured in SQML form and transmitted or saved to a file. Or, the state of the superstructure may be represented in a more compact, platform-independent binary format. This allows a SimpleOS program to be saved and resumed, or to migrate from one system to another, without loss of continuity. Because of the equivalence of the superstructure to SQML, a running application process can be easily condensed into a serial form that can be communicated across a network or other streaming connection.

Again, SQML, as described herein, is but one grammar that could be used to seed a superstructure. In addition, while the applicants describe herein particular examples of organizing the superstructure in SimpleOS, many different organizations could be used to provide a useful implementation based on the broad concepts of the invention, and are within the scope of the present invention.

Dynamic Sections

The actual organization of the superstructure maintains the abstraction between the operating system and the application. A defined contract between SimpleOS and the application maintains the meaning of each section of the superstructure based on well-defined names, types and locations. In the illustrated embodiments, this contract is expressed as part of the SQML grammar and the specification of SimpleOS itself. This could of course be different in different implementations of the invention. The operating system's work is directly affected by the content of particular sections of the superstructure, and any changes to those sections of the superstructure effect an immediate change within the outside application. No API calls are required by the application to read or write data from the operating system. Instead, all operating system functions are accessed by changing these "dynamic sections" of the tree that share common meaning between the operating system and the application. Again, the overarching principle is that the contract of the dynamic sections relates to a set of shared semantic assumptions between the application and the operating system about the meaning of each section of the tree. The specifics of implementation, however, can vary in accordance with the implementer's design.

In essence, when an application wants to manipulate its external interface, it describes changes to particular parts of its superstructure. The operating system observes these changes to the superstructure, and invokes services on behalf of the application to perform the work described there. The operating system is free to choose whatever sequence or action must be taken to implement the change as it is described, freeing the program from any explicit knowledge of the particulars of the current host operating system.

The term "dynamic sections" is used herein to describe the elements within the superstructure that have shared meaning between the operating system and the application. These elements are constantly observed by the operating system for change. The "dynamic" sections of the tree are defined by a grammar that indicates the node types, locations and attributes. The parts of the application that have "dynamic" state include the nodes the represent the graphical user interface, the event registration, input and output, etc.

To better appreciate the implications of this organization, consider a simple example. For instance, assume a hypothetical mapping wherein a node within the superstructure named "root.gui.screen.mainScreen.myButton" represents a button that an application displays on the screen at startup time. The startup SQML of this application describes a node with this pathname and attributes that describe the properties of this button, including its location, size, and color. For instance, if the application initially wants the button to have a blue color, it will define an attribute on this node with the name "foregroundColor" that contains a value of "blue." The very act of including this node within the superstructure will immediately cause a button to appear on the screen when the application starts—no additional work is needed. Because the node exists in a "dynamic section" of the superstructure, it has meaning to both the operating system and the application, and both of them maintain its meaning through the lifetime of the node.

Continuing the example, assume that the application would like to change the color of the button from blue to red. The application merely has to update the same GUI node and establish a different value for the "foregroundColor" attribute. Immediately after this change has been made, the button's color will change on the screen. The reason is that in the SimpleOS execution model, the operating system efficiently tracks the changes made to the superstructure after every code fragment has run. Upon discovering that the code has changed an attribute on a button, the operating system will verify the change and call the appropriate services on the device to actually change the visible color.

Describing Programs with SQScript In the SimpleOS technology, to manipulate the superstructure, the application program describes modifications to the tree using a rich expression language called SQScript. SQScript is a powerful language that is similar in syntax to XSLT, but much more dynamic. Within SQScript it is possible to change data values within the superstructure, including those in dynamic sections, using tree modifications and updates. As noted herein, SQScript is but one of many languages that could be used to implement the present invention. Other XML or tree-structure-based languages capable of implementing private variables, program control, event handling and tree manipulation could also be used.

Other Programming Approaches

As described later, the application may also write its code using native languages on the device or over the network. See "Programming SimpleOS" below.

Application Lifecycle

As noted above, SimpleOS applications may be provisioned from an XML grammar that describes the initial state of the superstructure. In a SimpleOS implementation of the invention, each application stored within the SimpleOS container has exactly one initial state definition. Each provisioned application also has a unique ID that is used to manage consistent network communication. Applications typically reside in a permanent area of memory until the user activates them. This does not necessarily mean that all of the resources for the application have been loaded. If desirable, the operating system can purge infrequently used application resources from the device and re-load them over the network if they are needed.

At any point in time, a running application has one or more executing processes. Each process has its own copy of the application superstructure, and maintains a message queue of pending operations. If the developer wishes, the application can be started as many times as the user wishes, so that a given application can have more then one running process. SimpleOS provides the user with a mechanism to switch between running processes.

In the reference implementation of SimpleOS (which is but one possible implementation of the invention), each process runs in its own thread, allowing true multitasking between running processes. However, it is not necessary for the host platform to support multi-threading. Since many of the target platforms such as BREW lack any support for threads, the SimpleOS implementation on these platforms must provide an internal form of multitasking sufficient for consistent execution behavior across all platforms.

Developing Applications

In a particularly useful implementation of the invention, applications are provisioned to the operating system by conveying or transmitting a “seed” image of the application in some portable format. Thus, for example, developing a SimpleOS application involves writing the “seed” image of the application superstructure. Outside the device, this seed image is typically expressed in SQML, which is an XML grammar that represents any type of data inside the superstructure. SQML (or whatever appropriate grammar is used to convey the superstructure) is not itself a programming language like C or JAVA. Instead, it should be thought of as a combination of the initial state of an application and the rules that show how the initial state reacts to the actions of the user. Under this paradigm, development is akin to filling in a large tree that organizes different aspects of the application, clustered into objects and classes. The developer specifies screens and controls by grouping them into classes that are stored in the superstructure. In the SimpleOS examples discussed below, the actual code for each handler is written using a template and expression language called SQScript.

Running Applications

SimpleOS (or a similar superstructure application environment constructed in accordance with the invention) comprises a strong container implemented on top of an existing host operating system. In the most basic case, SimpleOS will appear as part of a menu of applications available on a device, for instance as an icon on a Palm’s launcher application or an item in the WINDOW’s Start menu. Once the SimpleOS container is started, it will automatically invoke a special “launcher” application, written in SQML and native platform code. The launcher application will query the internal storage on the device and present a menu of available applications. The user can browse the list of applications that have been already provisioned and choose one to launch. At this point, the seed image of the new application is placed in its own process, populated into a new superstructure, and launched. The application will take over the screen, initialize its functionality, and begin to receive messages from SimpleOS.

The launcher application will also support a network mode, where the launcher can download lists of new applications and trigger the provisioning process. Applications can even be browsed “on-the-fly” by entering a URL. In this case, they are never formally provisioned to the device but reside in temporary memory. This functionality allows SimpleOS (or a similar superstructure-based technology constructed in accordance with the invention) to support a “WAP-style” of connected application browsing.

The launcher is a hybrid application, written partly in SQML and partly in native code. It requires native support in order to perform functions normally disallowed by the operating system such as process and application control.

Provisioning Applications

SimpleOS will store a number of SQML applications in persistent storage to reduce bandwidth and latency for launching applications. The manufacturer or the user can provision the majority of applications, in an effort to contain bandwidth and improve startup time. Mobile Operators or Simple Quick GO will be able to determine a menu of applications available to a particular user that can be downloaded over the network itself.

The technological approach of SimpleOS (or other implementations in accordance with the invention) supports several desirable provisioning models for wireless handsets and other mobile devices. The key to the ease of provisioning is the ability for the application “source,” which is really just the seed image of the superstructure, to be expressed as SQML (or an equivalent transport mechanism). In its streamed form, such a document can easily travel over any stream-based connection protocol including raw TCP/IP, HTTP, WSP, and serial connections. Several of these protocols, including HTTP and WSP, are supported over wireless networks such as cellular, 802.11b (WiFi), and BLUETOOTH. Planned implementations of SimpleOS will contain support for a variety of these protocols. For simplicity, a present implementation of SimpleOS relies on HTTP and HTTPS, which may be layered upon other wireless or wireline protocols.

Typically an application will consist of SQML and some number of media assets such as images, sounds, graphics, animations, videos, and MIDI tunes. Standards such as Internet MIME can be used to lace together these different media files along with the SQML document into a single application image that can be shipped to the device using network protocols.

Server Provisioning

In one embodiment, the present invention can provide a J2EE-based provisioning server to download applications to the device upon request. The provisioning server will maintain a registry of all of the devices that can receive applications from it, including their security keys and their device characteristics. The provisioning server allows for applications and data to be transmitted securely to each terminal and for the application data to be pre-formatted to fit the capabilities of the particular device. By knowing the characteristics of the device, images can be resized, sounds files can be converted, and media stream tags can be changed based on the device capability.

When the launcher application makes a request to the server for a new application, it will include its provisioning key with the request. This provisioning key is a unique identifier for the device that was set either at the factory or during the user’s installation of SimpleOS. The provisioning server will perform an access check to ensure that the provisioning key is valid, and then look up the device characteristics. Now armed with complete knowledge of the device capabilities, the provisioning server can perform a variety of up-front tasks to improve the application on the device. This may include:

Resizing images or adding/removing colors to suit display capabilities;

Changing the compression format of images, sounds and media to match de-compressors found on the device;

Altering the bit-rate of sound and media formats to avoid overwhelming the device; and Pre-applying style-sheets or conditional macros within program code. The resulting SQML and associated media assets are laced together into a single application file and returned to the device. The conversion activity may occur on the fly when the request is issued, but for speed the model also supports the provisioning activities as a one-time operation done in advance for each known device type.

On the device, the SQML and other assets will be filed inside the internal file storage available to the SimpleOS container. The application will be registered internally so that it appears within the launcher with the appropriate icon and label.

As noted above, methods other than SQML can be used for conveying and launching a superstructure-based application in accordance with the invention.

Peer Provisioning

One embodiment of SimpleOS also supports a provisioning model where applications are sent from peers over protocols such as 802.11b, BLUETOOTH, and Infrared. In this case, the launcher application on one device can send a message to the launcher application on another device with the content of the application. This method would also work for provisioning kiosks, where a user simply places his device near or on the provisioning kiosk and software within the kiosk initiates a transfer of an application to the device.

III: Composition of the Superstructure

In accordance with one embodiment of the invention, the superstructure represents the entire nature of a SimpleOS application program. Application program code, private and public data, graphical user interface configuration and virtually every single aspect of a program is kept together in this single, highly organized data structure. When an application is launched, a new superstructure is created based on the SQML definition (seed) of the program.

Conceptually, the superstructure has a tree shape that loosely follows the conventions of an XML Document Object Model (DOM), where each node is like an XML element. Each node/element may have any number of attributes characterized by a name and string value. Nodes can be nested according to the grammar of the SQML DTD, a specialized grammar that governs the permissible shapes of the superstructure. It should be noted that the SQML DTD is not the grammar of the SQScript language—it is actually the grammar of the continually updated data structure of the running application.

However, the superstructure of the present invention differs from an XML DOM. Unlike an XML DOM, the superstructure inherently allows groupings of entities into objects and classes. And also unlike an XML DOM, the superstructure of the invention regards these grouped entity objects to have methods, inheritance and classes that affect their data retrieval and execution properties.

For purposes of simplicity, in the examples discussed herein, the applicants have opted to use a number of XML standards as part of the SimpleOS implementation. However, those skilled in the art will understand that the properties of a superstructure-based application programming environment like that of the invention transcend specific XML grammars or approaches. In particular, a superstructure-based environment utilizes a hierarchical structure with a specific and controlled grammar to provide a consistent structure and a way to express the contract between the operating system and the application. XML-based technologies share some of these properties and can be used to implement the present invention. However, the superstructure-based application programming model of the invention could also be implemented using other approaches.

It should also be noted that in the interest of simplicity and syntactic ease of programming, the SimpleOS implementation of the invention described herein does not use XML as the grammar in all instances of its programming. Again, one seeking to implement the invention could do so in various equivalent ways.

The following sections describe a SimpleOS implementation of the invention, utilizing a series of conventions, names, structures and parameters specific to particular examples of a superstructure-based application environment (SBAE) in accordance with the invention. Those skilled in the art will appreciate, however, that these conventions are a matter of design choice, and were selected to make the illustrated implementation simpler and more robust. Again, many variations are possible and within the scope of the present invention.

Top-Level Branches

Figure 9:
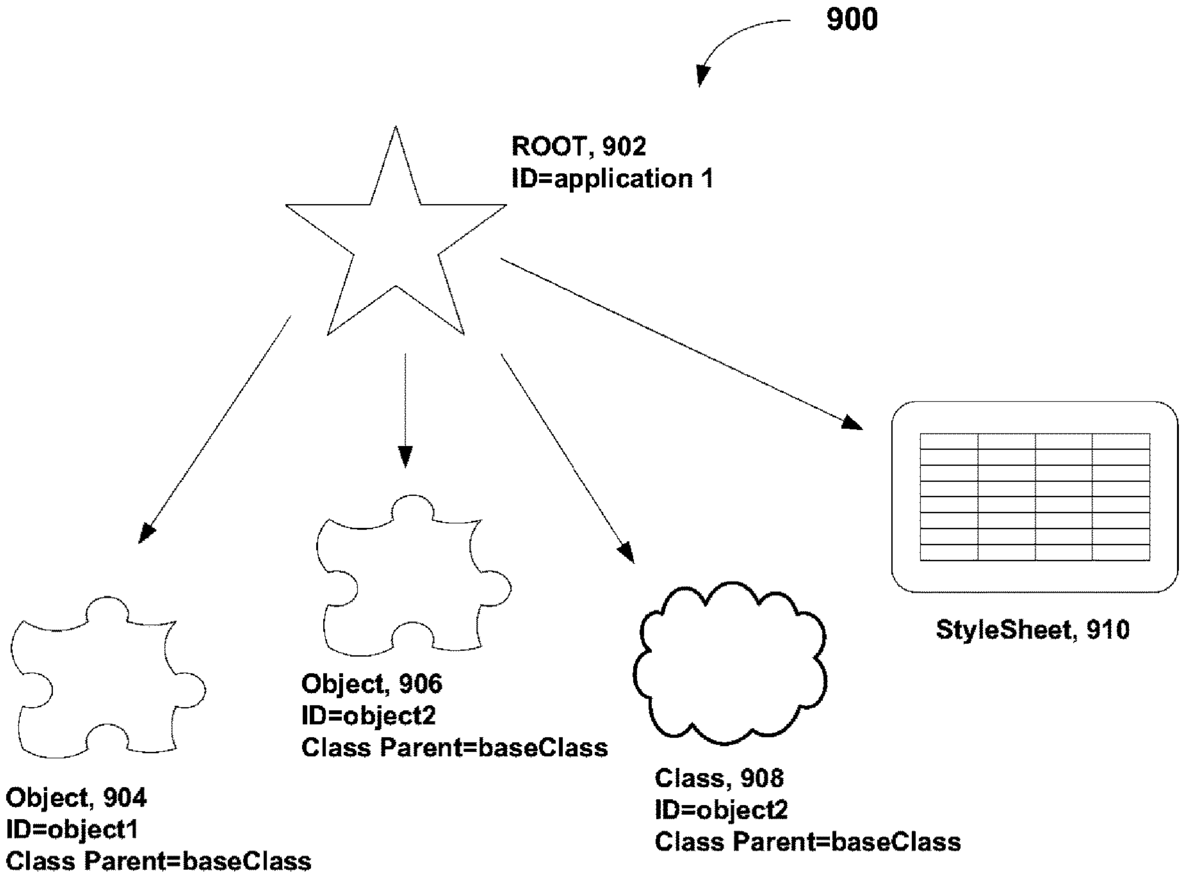
FIG. 9 is a schematic diagram of the superstructure utilized in an embodiment of the invention.
Figure 10:
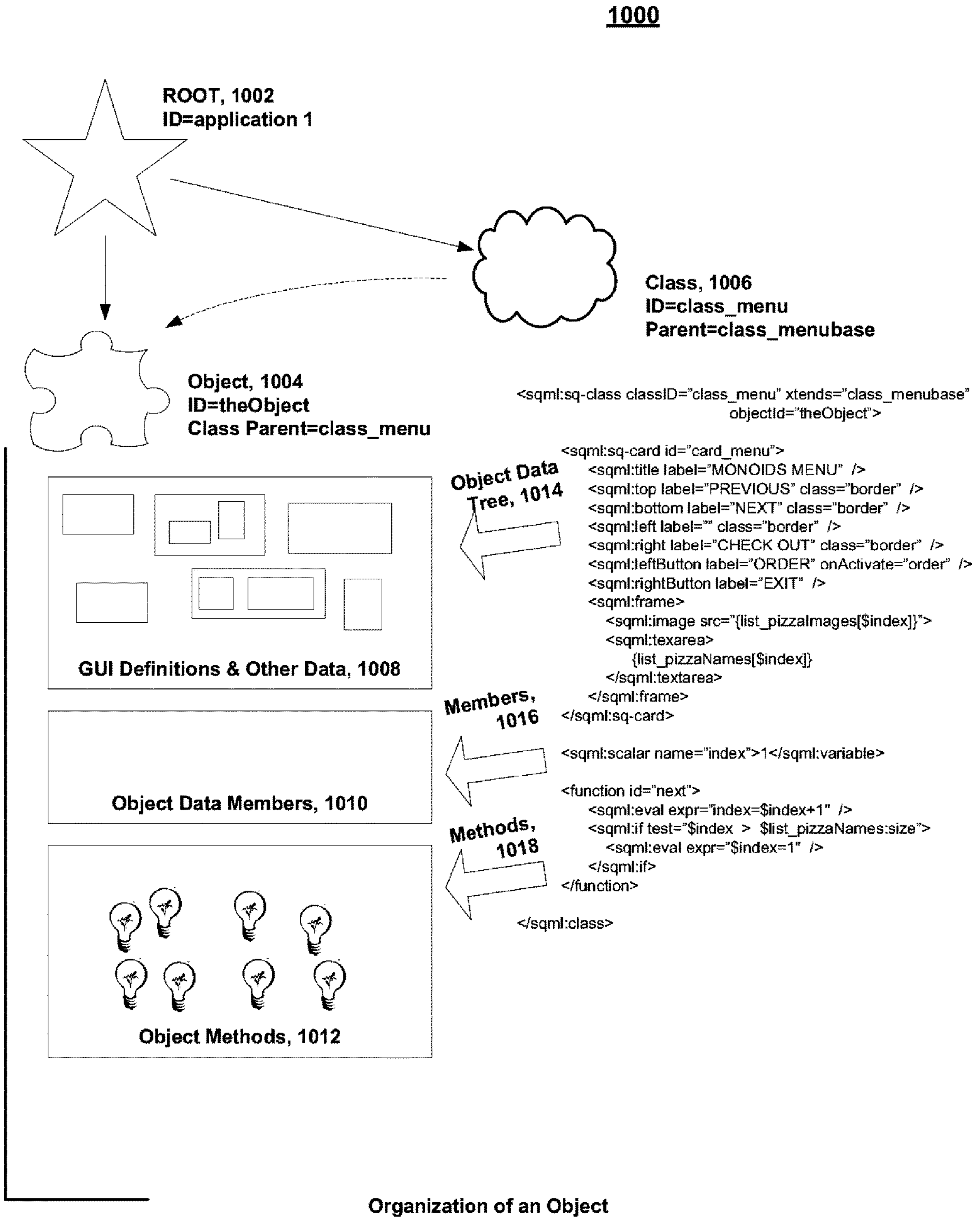
FIG. 10 is a schematic diagram showing the organization of an object.

Conceptually, data within the superstructure is divided into three "branches" as shown in FIG. 9: Stylesheets 910, Classes 908 and Objects 904, 906. Most of the application's data is stored in objects, which can be created from classes. In the illustrated embodiments, stylesheets govern the visual presentation of the SimpleOS user interface. The following sections refer to the 3 major objects types shown in FIG. 9.

Objects and Classes

Directly under the root of the superstructure are a number of object instances. Each object instance has a unique name called an instance name. No two objects in the process's superstructure may possess the same instance name. In the examples shown, each object contains structured data that may include the following types of data defined by the SQML DTD:

Methods: Code definitions that describe a dynamic modification to the object

Data Members: The equivalent of variables, which can be of any of the supported data types.

GUI Definitions: Definitions for cards, frame buttons, and other graphical elements.

Additional types, defined in the future.

Within the programming language, new objects are created by process similar to a data structure clone. This operation either clones a pre-existing object or creates an object based on a special template called a class. A class definition can be identical to an object's definition, except that it can only serve as a template. Any screens, or other data types stored within the class are unavailable unless they are used to create object instances. Each object is basically a copy of the class; the class is purely a template. Every object has as parts of its structure the original class ID, so it remembers the class type. When an object is cloned from another object, it doesn't remember what the object ID of the original object however it retains the original class ID no matter how many times the object is cloned.

In one practice of the invention, within SQML, both objects and classes are defined using the sq-class tag. A class is defined using syntax such as: <sqml:sq-class classid="class_menu" extends="class_menubase"><sqml:variable name="index">1</sqml:variable></sqml:sq-class>. An object instance is defined using an identical syntax except that an objectld attribute is included in the sq-class element. The following represents an object called main: <sqml:sq-class extends="class_main" objectid="main"><sqml:variable name="index">123</sqml:variable></sqml:sq-class>.

The example above actually defines both a class called class_main and an object called main. Both class_main and main could be used as the source of a new object instantiation. In the case of instantiating an object from class_main, you would be creating a new instance of an object of the class class_main. Instantiating the object using main as a template would cause main to be cloned.

Stylesheets

Besides classes and objects, there is a third type branch of data within the superstructure called a stylesheets. A stylesheet defines a set of visual formatting characteristics that are used by the user interface presentation code.

Stylesheets are discussed in great detail below. Table 1, below, shows an example of a stylesheet.

The implementation of stylesheets, per se, is well known in the art. However, their use in a superstructure-based application environment is an advantageous and novel aspect of the present invention, representing a useful and efficient way of making a platform-independent architecture have a meaningful and expressive appearance within each specific implementing architecture.

TABLE 1

A Stylesheet Example

```
<sqml:stylesheet>
<sqml:class id="base">
            <sqml:palette>
                <sqml:colordef name="white" rgb="#ffff00"/>
                <sqml:colordef name="black" rgb="#ffff00"/>
                <sqml:colordef name="red" rgb="#cc0000"/>
                <sqml:colordef name="blue" rgb="#4444ff"/>
                <sqml:colordef name="yellow" rgb="#ffff00"/>
        </sqml:palette>
    </sqml:class>
    <sqml:class super="base" default="true">
        <sqml:bgcolor color="white"/>
        <sqml:font typeface="Helvetica" typesize="12" typecolor="black"/></sqml:class>
    <sqml:class super="base" id="border">
        <sqml:bgcolor color="blue"/>
        <sqml:font typeface="Helvetica" typesize="16" typecolor="white" typestyle="bold"
/>
</sqml:class>
</sqml:stylesheet>
```

Object Overview

Objects group structured data, variables, and methods together in a single named entity. As the highest-level branches within the superstructure, they maintain the basic organization of a running program. There are three types entities generally found within objects:

1. Object Data Trees, containing arbitrary XML structured data
2. Object Data Members, data types available within the SQScript programming language
3. Object Methods, SQScript functions that can be invoked on the object. FIG. 10 summarizes the proceeding sections on each of these three types, showing object data trees 1014, object data members 1016 and methods 1018.

Data Trees

One of the primary functions of an object is to provide a way of grouping SQML elements together into a "miniature DOM" so that it can be referenced and accessed during the operation of a SimpleOS program. In the illustrated embodiments this data is typically used to describe graphical user interface elements, although the data may be any valid type of data expressible with SQML. The object's XML data payload is called the object's data tree.

Table 2 demonstrates an object that contains an XML data type defined in SQML called a sq-card. The sq-card definition is embedded inside the XML that described the object. Inside the superstructure, this sq-card definition will be attached underneath the object "main".

TABLE 2

A Simple Object with a Data Tree

```
    <sqml:sq-class classId="class_main" objectId="main">
    <!-- The main card -->
```

TABLE 2-continued

A Simple Object with a Data Tree

```
    <sqml:sq-card id="card_main">
        <sqml:title label="MONOIDS" />
        <sqml:top label="ABOUT US" class="border" />
        <sqml:left label="INSTRUCTIONS" class="border" />
        <sqml:right label="MENU" class="border" />
```

TABLE 2-continued

A Simple Object with a Data Tree

```
        <sqml:bottom label="MENU" class="border" />
        <sqml:leftButton label="MENU" />
        <sqml:rightButton label="EXIT" />
        <sqml:frame>
            <sqml:image src="splash.gif" />
        </sqml:frame>
    </sqml:sq-card>
    </sqml>
```

Element Identifiers

Each element inside the data tree of an object may contain an id attribute. For instance, the sq-card definition in Table 2 has an id attribute set to card_main. The id tags of the elements in a single object must be completely unique within that object. For instance, while it would be possible for an object called differentObject to also contain an element named card_main, the original main object may not have additional elements with the id card_name.

Because of the uniqueness constraint over the elements within an object's data tree, and the uniqueness constraint over the name of an object, a special namespace exists if these names are combined. This naming convention is called an element identifier. In one practice of the invention, any element inside the data tree of any object may be uniquely addressed by the element identifier syntax objectID # elementId where objectID refers to the ID of an object and elementID refers to the ID of an element within the object. As a special rule, the objectID portion of the identifier may be omitted within the same object.

Table 3 demonstrates several different formats for referring to elements within a hypothetical superstructure.

TABLE 3

| Examples of Identifiers | |
|---|---|
| main#card_main | The element "card_main" within an object called main. |
| myObject#theButton | The element "theButton" within the object my Object. |
| #nextScreen | The element "nextScreen" within the current object. |
| myObject# | Illegal - no element ID is present. |

Dynamic Sections Revisited

Data tree information may be part of a dynamic section, particularly if it describes GUI data. If that is the case, any changes to the model represented by the structured data within an object will automatically be reflected outside the application. For example, referring to Table 3, assume that main # card_main is the currently active screen. If any part of this definition within the object is updated, such as the name of a frame side, the physical display on the device will also be updated. Similarly, if the user updates the contents of a data field on the screen, that change will immediately cause the relevant attribute within the object to change.

Data Members

Data members form a special class of elements that may be found within the data tree of an object or class. A data member is part of the element data within an object, but may be accessed in the SimpleOS programming language SQScript as a local variable. This feature is covered in detail in "Programming SimpleOS Applications" below.

Table 4 demonstrates a set of data members defined on a class called class_menubase.

Data members may be freely mixed with other valid data types, although only the list and scalar syntaxes may be referenced as variables. In one practice of the invention, expressions found within variable definitions are evaluated when the class is instantiated.

TABLE 4

Examples of Object Data Members

```
<sqml:sq-class id="class_menubase">
    <sqml:list name="list_pizzaNames">
        <sqml:list-element>thin crust pizza</sqml:list-element>
        <sqml:list-element>thick crust pizza</sqml:list-element>
        <sqml:list-element>deep dish pizza</sqml:list-element>
    </sqml:list>
    <sqml:variable name="foo">One Two Three</sqml:variable>
    <sqml:variable name="bar">1232</sqml:scalar>
</sqm:sq-class>
```

Methods

An object may also contain methods, which are custom-written programming functions written in SQScript. (See "Programming SimpleOS Applications" below.) A method definition uses the function element tag within an object's data tree. Table 5 shows a simple example of the use of this syntax. It will be understood that while superstructure applications could be implemented without the use of methods, members and the like, they represent highly useful features of a SimpleOS implementation of the invention.

TABLE 5

Defining Methods for an Object

```
<function id="next">
    <sqml:eval expr="index=$index+1" />
```

TABLE 5-continued

Defining Methods for an Object

```
        <sqml:if test="$index > $list_pizzaNames:size">
            <sqml:eval expr="$index=1" />
        </sqml:if>
    </function>
```

Graphical User Interface Data Trees

One frequently used data type stored within the data tree of an object is the definition of GUI elements that are rendered by the Simple Quick Go Graphical User Interface (SQUI). In typical implementations, definitions for GUI elements such as SQCards will be among the most common type of data stored within an object's data tree. A complex data grammar governs GUI definitions, with structures that parallel the visual presentation of the display.

Visual Presentation

To help explain the user interface sections of the SimpleOS superstructure, the following section describes examples of a SimpleOS user interface.

In one embodiment, the user interface is divided into a number of nested elements such as screens, controls, and images. Each of these elements has a style, which is a reference to a stylesheet class that defines the presentation attributes of the element: color, font, and layout. No specifics about the presentation of an element are contained within the GUI description area of the superstructure. (See "Stylesheets" below.)

Because of the limited screen size available on most implementations, the graphical user interface is divided up into a series of screens called "SQCards." Only one SQCard may be displayed at a time. The operating system allows the developer to create a number of different screens at once, and choose which one should be displayed. Typically the developer will organize specific areas of application functionality by screen. In some cases, one screen flows into another naturally by selecting a control or pressing a frame button. In other cases, a screen can indicate an unexpected situation such as an alert.

Each SQCard contains a number of attributes and elements. An SQCard must have a unique element id within its class. An SQCard also contains a title, either as an image or as a text screen. There are other style options available, such as a background image, spacing parameters and scrollbars.

Each SQCard's display includes four labels at the top, left, right and bottom of the screen, forming a central square frame. These are the frame buttons. They correspond visually to the buttons on the device's four-way controller. Within the region bounded by these labels appear the main content of the SQCard. The square frame formed by the four frame buttons is called the action frame.

Figure 11:
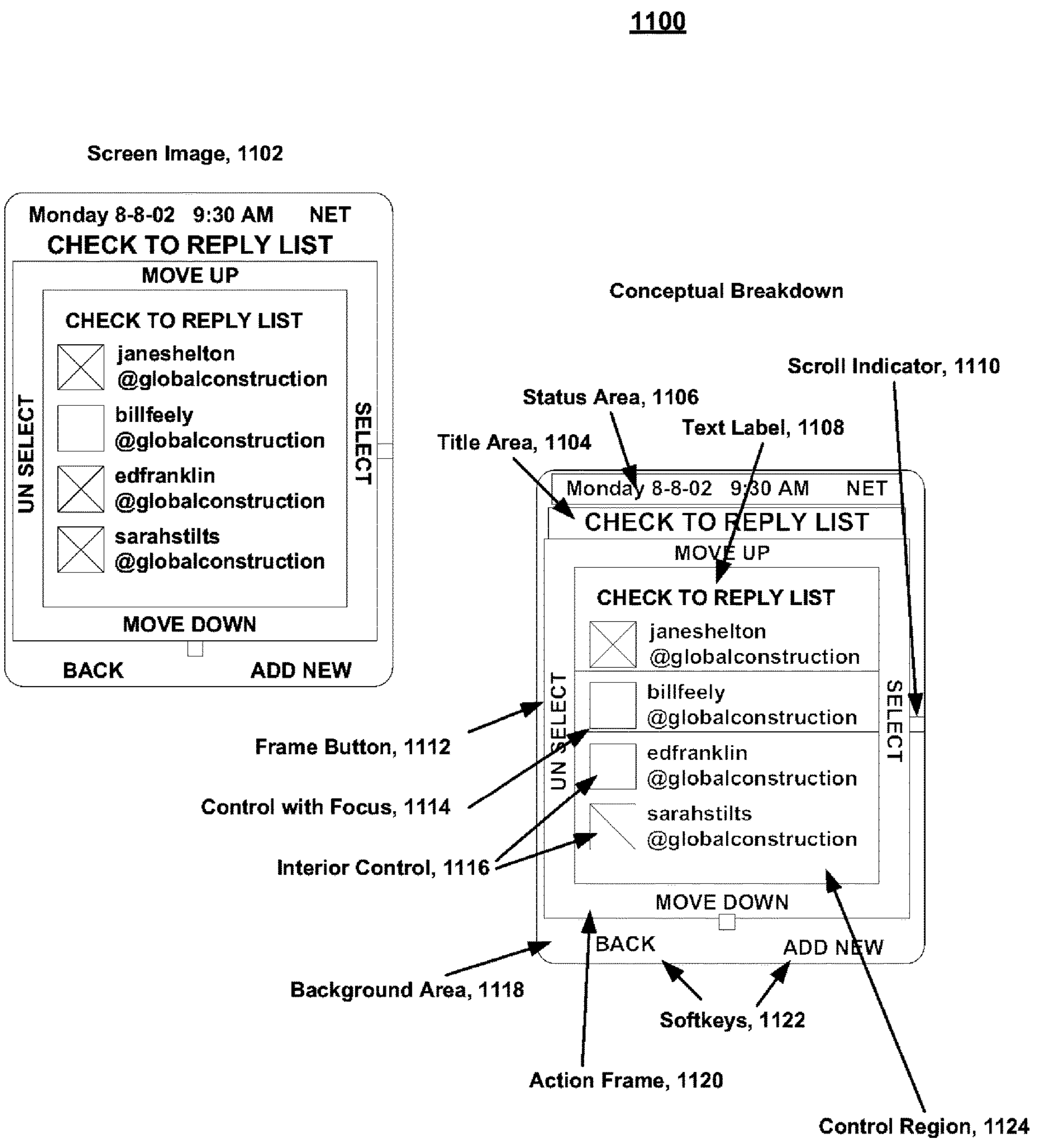
FIG. 11 presents an overview of a typical SQUI screen.

Consider FIG. 11, showing the visual presentation of a GUI 1102. The look is dominated by the action frame 1120. Immediately above the action frame is a title area 1104, which can either be a graphics image or a text label 1108. This label tells the user the current name of the screen. Above the title label is a status area 1106 that contains information about the device, such as the date and time, and the online/offline status of the application. Below the action frame is a soft key area 1122 where labels that correspond to physical buttons on the device are shown.

The area inside the action frame is considered the control region 1124. Additional controls and content are presented inside this area. Controls can include checkboxes, text labels, radio buttons, images, icons, and other typical, known user interface components. If the items inside the control region exceed the size available, scroll bars 1110 will become visible that show the relative area of the virtual control area that is visible on the screen.

GUI Data Examples

By way of example, the following SQML (Table 6) defines a very basic SQCard called "card00." This code can be inserted as part of an object's data tree, where the GUI engine can later find it if the screen becomes active.

TABLE 6

Sample Definition of an SQCard

```
<sq-card id="card00">
    <top label="MOVE UP" id="top" class="blue-on-yellow"/>
    <left label="MOVE LEFT" id="left"/>
    <right label="MOVE RIGHT" id="right" class="blue-on-yellow"/>
    <bottom label="MOVE DOWN" id="bottom"/>
</sq-card>
```

The main control region inside the action frame is defined by a frame tag. This element may include checkboxes, radio buttons, text areas, images and other common graphical widgets.

The following example (Table 7) shows the definition of a frame inside an SQCard. Each editable area of the screen contains a value attribute that is updated automatically when the user operates the interface and changes information inside controls. These value attributes live within the superstructure itself, and can be accessed using the normal means for looking up data values.

TABLE 7

Sample Frame Definition

```
<frame class="plain" id="frame00">
    <image id="comp0" src="icon1.gif"/>
    <checkbox id="comp1" label="this is a checkbox"/>
```

TABLE 7-continued

Sample Frame Definition

```
    <radiobutton id="comp2" label="this is a radiobutton"/>
    <textarea class="blue-on-yellow" id="comp3">
        Some text
    </textarea>
</frame>
```

The "Active" Card

In one practice of the invention, at any given time, there is always one active sq-card definition, found within an instantiated object within the superstructure. This means that the most basic application possible must contain at least one object instance that has at least one sq-card definition within its data tree. A variable within the dynamic section of the superstructure, called ui # card tracks the instance name and element id of the current sq-card. This value is kept as an element identifier string, and stored on an attribute found within the implicitUI object. For more information about the implicit UI object, see "Implicit Objects" below.

As a convenience to the programmer, the initial value of the active screen variable can be set using the "activate" attribute on the sqml tag. See the example shown in Table 8.

TABLE 8

Example: Defining the Initial Card

```
<sqml appid="com.sqgo.simpleos.application.demo"
    activate="main#card00">
```

Example Static Application

The following sample application demonstrates what a simple application might look like when represented as SQML. (Again, many variations are possible, and the invention does not mandate the structure shown by way of example.) This application presents a simple screen to the user that looks like that shown in FIG. 12.

Figure 12:
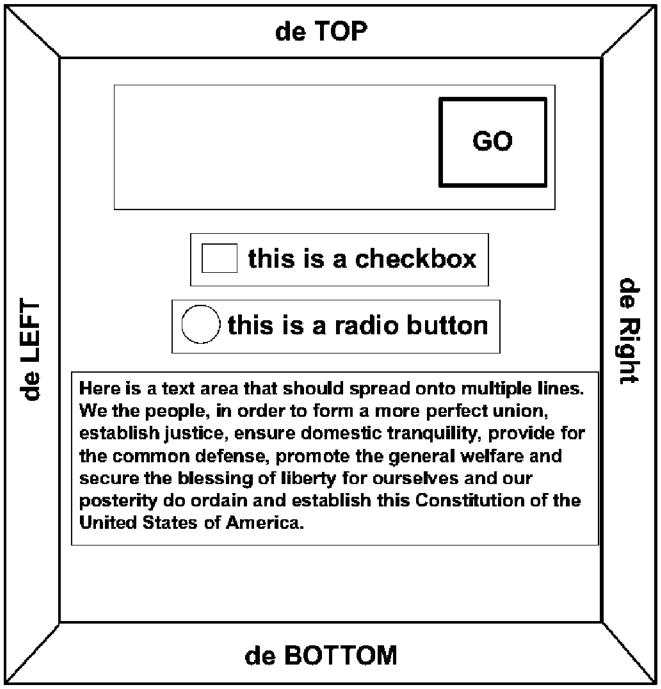
FIG. 12 is a screenshot of an example static application.

The source of the application depicted in FIG. 12 is shown in Table 9. Note that stylesheets are used in this example. Stylesheets are discussed in detail below.

The basic structure of the application starts with an sqml tag, which represents the root of the superstructure. Below it is defined one object called main, which contains a sq-card definition inside its data tree. The activate tag on the sqml tag causes this card to be initially displayed to the user. See Table 9.

TABLE 9

Static SimpleOS Application Example in SQML

```
<?xml version="1.0" encoding="UTF-8"?>
<!DOCTYPE sqml SYSTEM "sqml.dtd">
<!--
    A simple application without any dynamic handlers
        Demonstrating controls and cards.
-->
<sqml appid="com.sqgo.simpleos.application.demo"
        activate="main:card00">
        <sq-style-sheet>
            <class id="base">
                <palette>
                    <colordef name="blue" rgb="#4444ff"/>
                    <colordef name="yellow" rgb="#ffff00"/>
                    <colordef name="white" rgb="#ffff00"/>
                    <colordef name="pink" rgb="#ff8888"/>
                </palette>
            </class>
            <class super="base" default="true">
```

TABLE 9-continued

Static SimpleOS Application Example in SQML

```
                <bgcolor color="blue"/>
                <font typeface="Courier" typesize="14" typecolor="white"
                    typestyle="bold" />
            </class>
            <class super="base" id="blue-on-yellow">
                <bgcolor color="yeller"/>
                <font typesize="10" typecolor="blue" />
            </class>
            <class super="base" id="plain">
                <bgcolor color="pink"/>
            </class>
        </sq-style-sheet>
        <sq-class classid="class_main" objectid="main">
            <sq-card id="card00">
                <top label="MOVE UP" id="top" class="blue-on-yellow"/>
                <left label="MOVE LEFT" id="left"/>
                <right label="MOVE RIGHT" id="right" class="blue-on-yellow"/>
                <bottom label="MOVE DOWN" id="bottom"/>
                <frame class="plain" id="frame00">
                    <image id="comp0" src="icon1.gif"/>
                    <checkbox id="comp1" label="this is a checkbox"/>
                    <radiobutton id="comp2" label="this is a
                        radiobutton"/>
                    <textarea class="blue-on-yellow" id="comp3">
                        Here is a text area that should spread onto multiple lines.
                        We the people, in order to form a more perfect union,
                        establish justice, ensure domestic tranquility, provide for
                        the common defense, promote the general welfare and
                        secure the blessings of liberty for ourselves and our
                        posterity do ordain and establish this Constitution of the
                        United States of America.
                    </textarea>
                </frame>
            </sq-card>
        </sq-class>
</sqml>
```

Implicit Objects

One of the key design principals of SimpleOS is that the application superstructure represents the entire state of the running program at all times. In order to ensure this is always the case, SimpleOS (or similar system in accordance with the invention) may define a number of implicit objects. (Note that while it is possible to configure a superstructure-based application environment without implicit objects, they are of great utility in configuring a useful result.) These objects represent the state of the operating system and are essentially inherent "dynamic sections." For example, the ui object that described above represents the state of the visual display, which belongs to the operating system rather than to the application. These implicit objects may or may not be accessible to the application via SQScript.

An implicit object behaves as a regular object within the superstructure. It contains data attributes, methods, and a structure data tree. However, these objects are always found in the superstructure, whether or not the seed SQML image for the application defines them. They are created and populated when the SimpleOS loader first creates the superstructure for a new process.

If the SQML source code of an application does define an implicit object, the values found within the definition will be used to populate the contents of the implicit object. It is impossible to remove an implicit object from memory at any time Implicit objects are almost always part of the dynamic section of the superstructure, since they typically reflect meaning that varies from process to process and changes over time. Implicit object can be used by SimpleOS to represent the state of the user interface, other applications in memory, the queue of currently playing sounds and external interfaces such as BLUETOOTH and 802.11b.

IV: Programming SimpleOS Applications

In accordance with the principles of the present invention, the SimpleOS embodiments described herein (and similar configurations in accordance with the invention) allow for an implementation in which basic types of applications can be written entirely through the use of a drag-and-drop editor, thus greatly simplifying the creation of applications. More complex applications may be written using both server-based and client-based code. The following section describes examples of various ways to program SimpleOS applications (SimpleOS being but one example of the invention), including network and client-local programming.

Overview

Changes inside of a SimpleOS application are simply updates to a tree—usually, the data tree within a SimpleOS object. This tree update may include changes to a basic attribute on an existing node or may involve widespread changes to the entire organization of the object in question. Programs to modify the current tree may be written using a variety of methods. They may include (but are not limited to): client-native, built into SimpleOS, written using SQScript, a platform independent programming language, or written using any common server-side programming language. It is a significant feature of the invention that while the various programming models are very different, the superstructure modifications performed by the programs are the same. This focus on tree manipulation calls for a programming model that is optimized for tree transformations.

The superstructure-based model of programming shifts almost all of the usual work a program does to maintain its user interface and other external interfaces into modifications of a tree. SimpleOS applications do not need to concern themselves with maintaining communication with an Application Programmer Interface or with the nuances of user interaction. All of the general environmental and user-interaction functionality is handled for the application by SimpleOS. When application code is run, all of the state of the application has already been updated inside the superstructure. The code merely has to change data within the superstructure, and the complex work of making those changes apparent within the host operating system occurs automatically.

There is very little difference between programming on a network server or directly on the device. Data within the superstructure can be efficiently communicated over a network, and a set of tree-updates can easily be communicated back to the device. Consequently, there is almost no friction for a network program that wishes to perform equivalent operations to client-local code.

Core Programming Modes

It is expected that many implementations of the invention will naturally gravitate toward having much of the application logic expressed as some local programming embedded therein. However, other mechanisms, including those described above, can also be supported. SimpleOS, among examples of the invention set forth herein, supports at least four basic mechanisms that illustrate how client-native, superstructure-local, network, or built-in approaches are enabled.

In a SimpleOS practice of the invention, a highly useful model for coding is a special programming language called SQScript. SQScript is optimized for tree transformations and can run on any implementation of SimpleOS. There are also several alternative methods besides SQScript. The application can use native-language code to manipulate the superstructure through the use of a special API. In this case, any code that can be dynamically or statically linked into the SimpleOS container can be used to manipulate the superstructure. Of course, using native code eliminates many of the advantages of portability and security gained by SQScript. Another alternative is to use a set of "default handlers" that provide common pieces of application functionality out of the box. Finally, code can reside on the network, allowing a server to provide all of the application logic.

Each of the four approaches to SimpleOS programming revolve around the superstructure in one way or another, and focus on tree-updates as the primary means of accomplishing work within the applications. These modes may easily be combined within a single application. Table 10 summarizes the various programming mechanisms, and their uses. These programming modes are next discussed.

TABLE 10

The Four Core Programming Modes

| Mode | Description | Benefits/Uses |
|---|---|---|
| SQScript | An XML-based programming language that offers the ability to write structured programs that modify the superstructure directly. SQScript programs may either make small attribute modifications to the superstructure, or may completely transform existing objects into new objects using arbitrary rules. | Completely client-local, this approach allows a SimpleOS application to be completely self-contained. |
| Network Server | In this mode, parts of the superstructure are converted into XML and sent to a remote device where a server-side programming language receives the data. Updates to objects are described on the network server and sent back to the device where they update the superstructure. | Allows for a program or part of a program to be controlled from a remote-server where additional data and other software resources can be found. |
| Client-Native | When supported, allows native code residing on the device to receive messages from the application and perform updates directly to the application's superstructure using a native-language API. | Allows existing programming logic to control a SimpleOS application, possibly with increased speed or access to client resources. This mode may be extended to the point that SimpleOS becomes an exclusive a shell for the application's user interface. |
| Default Handlers | Built-in event handlers that come with SimpleOS and perform common operations without any additional programming . . . | May be used to perform simple actions without the need for any custom programming. |

SQScript

SQScript, a further aspect of the present invention, is a simple and powerful client-local programming language useful in implementing various inventive features described herein. SQScript allows programmers to write methods on objects within the superstructure, or to create interpolated expression blocks simply by enclosing code inside { } blocks. See the "SQScript" discussion below.

Default Handlers

One of the four programming modes available in SimpleOS is the default handler. As a convenience to the SimpleOS developer, the environment provides a set of default handlers that can perform simple operations such as changing the current screen, updating a simple list of attributes, pausing an application, etc. These default handlers are implemented internally using native code and affect the application's superstructure through an API within the code of the SimpleOS implementation itself.

The context argument passed to the default handler will have varying meanings depending on the nature and specification of the handler. Arguments to default handlers may be provided in the message descriptor.

Client-Native Code Handler

Some implementations of SimpleOS will support message handlers written in native code. These handlers comprise one of the four programming modes available from within SimpleOS. In this case, information inside of the message descriptor will indicate runtime dispatch information. The client-local runtime handler will have access to the superstructure from an API provided by SimpleOS.

The client-native API basically allows code to register for callbacks when particular events occur. Once control has been given to a client function, it can read and write values out of the superstructure, instantiate objects and modify data trees by using a set of API calls. The changes that the client-handler makes are verified the same way as any other change made by an application handler. See "Execution Cycle" below. Changes must conform to the basic superstructure rules, and there is no way to perform any operation within the superstructure that would not also be allowed by SQScript.

In the most extreme case of using client-native code, SimpleOS becomes a user-interface shell around purely native application logic. In this sense, SimpleOS can be seen as a user interface library. A 3.sup.rd-party developer can link this user interface library into an executable program to give it the capabilities of SQUI. This product offers a large advantage for developers because it will save them the effort of writing custom GUI code for their own applications.

Remote Execution Model

The target of a message may be remote resource available over the Internet or on a wireless local area network such as a BLUETOOTH-enabled vending machine or kiosk. In this case, the message object is formatted and serialized into SQML (an XML grammar) that is sent to the target using the necessary protocol. In this case, a separate communication mechanism is used for the remote system to update the superstructure on the device. See "Network Communication" below.

Execution Cycle

SimpleOS (or any superstructure-based application environment in accordance with the invention) uses a message-driven model to deliver events and other information to the application. Each running SimpleOS process maintains a message queue with events from the outside world such as user activity, interface manipulations, network messages, and external interfaces. Through data in the superstructure, the application describes which events it is interested in receiving. When the queue has one or more relevant messages, SimpleOS will dequeue each message one-by-one and deliver it to the application's requested handler. At any time, zero or more events may be waiting for a particular application, and they are processed one by one. This message queue can be a first-in first-out queue, with a mechanism to defer the delivery of messages if the application is unavailable or if network connectivity is necessary.

When an application's handler is invoked, it can receive information about the current state of the user interface and other external interfaces by reading data within its superstructure. The handler may then make modifications to the superstructure based on this data. When the handler exits, the operating system examines the changes to the superstructure and performs the relevant activities within the external systems that pertain to the modified sections of the superstructure. The model causes all changes to be atomic with respect to the superstructure, where each change is the result of a completed evaluation pass of the application code. The application never retains execution flow with its own event loop or polling system under any circumstances.

The execution cycle is comprised of the sequence shown in Table 11. Each of the five phases shown is next discussed.

TABLE 11 Phases of the Execution Cycle

1. External Event Occurs: Some event outside the application occurs, such as user activity or a network event. This is commonly the result of interaction with the user interface, such as a button press.

2. Primary Update to Superstructure: The operating system updates the superstructure if necessary with data from the event. For example, the new value of a text field might be written into the value attribute of a text field element.

3. Invoking Application Handlers: A registered application handler is selected and run. This handler may be any of the four types.

4. Modifications to the Superstructure: The handler modifies the superstructure in some way and exits. For instance, the application could change the value of a text label.

5. Verification and Update: SimpleOS verifies that the new state of the superstructure is correct and performs the modification. For instance, the application might see that a text label has changed in the superstructure and draw the change on the screen. SimpleOS re-renders the interface if necessary, potentially running interpolated code within the GUI definitions.

External Events

A process may receive virtually any type of external event. These external events are typically user interface events such as button presses or field updates. However, they may also be network events, messages from other application processes or telephony activity. Bluetooth or 802.11b messages may also be processed inside an application.

In one practice of the invention, the context for an event is kept within an Event Object, which is instantiated into the superstructure with a temporary name and passed as an argument to the handler. Within the event object, there is data that may include the time and date of the event, details about how the event occurred and other event-specific data.

Primary Update to Superstructure

Before an application handler is executed, SimpleOS must synchronize external state with data inside the superstructure. Depending upon the selected implementation, this may either occur all at once, just before the delivery of a message, or it can occur incrementally as the changes take place. Regardless, the application's code is not executed unless all of the data inside the superstructure accurately reflects the state of the application.

Dynamic text fields present a perfect example of why this phase is important. When a user updates a text field, the application is not typically interested in knowing about each and every key press. Instead, the operating system will update the screen with each key press. However, when the user presses a "continue" button, the application probably will register an event handler so that it may verify the data within the text field and perform some other action. In this case, before the application's code is run, SimpleOS must make sure that the superstructure has been updated with the value of the text field. It doesn't matter if this occurs as the field is changing, or just before the application's code is run.

Invoking Application Handlers

In one practice of the invention, the application can register an event handler using any of the four programming modes. A synopsis of the available modes is shown in Table 12.

TABLE 12

Synopsis of Event Handler Modes

| Handler Mode | Description |
|---|---|
| Default Handler | A "canned" handler pre-defined in the system that performs a basic task such as changing the current screen. |
| SQScript | A local function stored in the superstructure. This handler is passed the name event object as an argument. See text for more information. |
| Client-Native Code Handler | A client-local handler written in some native language on the device. The code is passed the name of the event object. |
| Network Server | The event object is sent to a remote network location in the form of SQML. See text. |

Modifications to the Superstructure

When the handler runs, it may update sections of the superstructure using either a template expansion or a set of node updates. SimpleOS tracks these changes as they occur, so that the new state of the superstructure can be efficiently synchronized with the host operating system when the modifications are complete.

Verification and Update

Once the handler has completed, SimpleOS may verify the superstructure to ensure that it still contains valid information. This verification may include security checks, validation of data formats and object references, and other steps that help make the application environment more secure.

Once SimpleOS is satisfied with the changes, it must perform the work that is described in the new version of the superstructure. For instance, if the application has modified the labels of text fields, these text fields must be re-drawn. Often, this will involve copying data out of the superstructure and into the native programming libraries that SimpleOS uses within the host environment. This can also serve as stage where data can be verified for validity, security, and consistency.

The change list compiled during the previous phase may be used at this point to optimally make modifications. Since SimpleOS knows the sections of the superstructure that were changed, it can avoid performing activities within the host environment that are not required.

SimpleOS allows the application to insert dynamic SQScript expressions within the values of some SQML attributes and literal fields. Any attribute or literal field that contains one or more SQScript expressions may change in value over the course of the program's execution. Whenever SimpleOS renders the current SQCard, it re-evaluates all SQScript expressions found in its attributes and literals and displays the new results. It is by means of these SQScript expressions that the programmer is able to cause computed data to be displayed. For instance, let's say the application is presenting a set of check boxes to the user and wishes to display the number of checked boxes. The application could define a label for a text field that includes a SQScript expression block that computes the number of checked boxes. Whenever a change to the state of the application occurs, SimpleOS evaluates this expression block and displays the newly computed number of checked boxes. The programmer may also use this feature to alter the appearance of the SQCard by inserting SQScript expressions into the SQML attributes that control style. Because this feature corresponds so closely to the attribute value templates defined by the XSLT specification, we use the same term to describe these inserted SQScript expressions in SQML.

Programming Contexts

In one practice of the invention, SimpleOS is configured to allow in-line code in SQScript to be executed in different places. This is not a requisite of the invention, but is useful in implementing the invention. Generally speaking, there are three occasions when where programming code can be executed:

Handlers: A SimpleOS application may register handlers for particular events on various objects. When the event occurs, the code is activated.

Attribute Value Templates: Attribute value templates may appear within some attribute values and literal text fields. They appear as SQScript expressions bounded by curly braces { }.

Initializer: When SimpleOS instantiates a new object, it will run an initializer method on the object. Each of these three code contexts applies selectively to the various programming modes available in SimpleOS.

Table 13 describes which modes are available in which context. In cases where a mode is not available, an additional explanation is provided below.

TABLE 13

Availability of Modes within Code Contexts

| Mode | Initializers | Event Handlers | Attribute Value Templates |
|---|---|---|---|
| SQScript | Yes. | Yes. | Yes. |
| Network-Resident | No. (Note 1) | Yes. | No, not even via SQScript. (Note 2) |
| Client-Native | No. (Note 1) | Yes. | No, not even via SQScript. (Note 2) |
| Default Handlers | No. (Note 1) | Yes. | No, not even via SQScript. (Note 2) |

Registering for Events

Those skilled in the art will appreciate that a superstructure-based application environment must provide some means within its structural definition for an application to register handlers for events, so that when external events occur to the application and are updated by the operating system into the application's superstructure, the application has the opportunity to run an appropriate update, trigger some dynamic code, or take other action. In practice, these registrations could occur explicitly (as a set of nodes that specify "when X occurs, run code Y"), or implicitly (through evaluation where the operating system attempts to evaluate some expression in the superstructure after an event has occurred and incidentally must force the evaluation of some code or the triggering of a network event). In either case, the registration could refer to local superstructure code, client native code, code within the software container itself, or network events or communications.

Thus, in an example of a SimpleOS environment, event handlers must be registered inside the superstructure so that SimpleOS knows that an application is interested in a notification when an event occurs. Each registration must identify the criteria of the event and provide a target where the event will be delivered. The following discussion describes two basic approaches for registering handler events inside SimpleOS.

In-Line Event Registration

The in-line style of event registration is the simplest and most convenient method for registering for an event. In this style, elements within the data tree of an object contain an attribute named for a common event type, such as on Activate or on Change. When the corresponding event occurs, the value of the attribute is examined and executed.

In its simplest form, the in-line value may simply be a small SQScript expression block. In this case, the expression block will cause the current card to change to card_main. See, for example, Table 14.

TABLE 14

In-Line Event Registration with Code

```
<sqml:sq-card id="card__menu">
    . . .
    <sqml:right label="CHECK OUT" class="border"
        onActivate="{ui:card='card__main'}}" />
    . . .
</sqml-sq-card>
```

The in-line registration value may also be a local method. In the example of Tables 15 and 16, pressing the "Check Out" button will invoke the method called next on the current object. The following example demonstrates this format.

TABLE 15

In-Line Event Registration for a Method

```
<sqml:sq-card id="card__menu">
    ...
    <sqml:right label="CHECK OUT" class="border"
            onActivate="next"/>
    ...
</sqml-sq-card>
<function id="next">
    <sqml:eval expr="index=$index+1" />
    <sqml:if test="$index > $list__pizzaNames:size">
        <sqml:eval expr="$index=1" />
    </sqml:if>
</function>
```

TABLE 16

In-Line Event Registration to a Server

```
<sqml:sq-card id="card__menu">
    . . .
    <sqml:right label="CHECK OUT" class="border"
        onActivate="http://myserver.com/handleCheckout" />
    . . .
</sqml-sq-card>
```

The in-line registration may be a URL to a remote site. In this case, the current object is serialized and sent as a POST to the server shown. The server may respond to the POST with an update to the current object. The network communication model is described in detail below in the "Network Communication" section.

Finally, the in-line registration may refer to a message descriptor, as described in the section below.

Message Descriptors

Message descriptors allow for a more robust model for registering events. This mechanism is necessary since the in-line style of event registration does not provide a way to specify additional parameters for the receipt and dispatch of an event.

A message descriptor is an XML data type stored within the data tree of the appevent implicit object. SimpleOS will examine descriptors within the appevent object if no in-line message registrations apply. Each message descriptor defines the type of event, the element identifier for the entity that generates the event, and the location within the code section of the superstructure where the handler can be found. For instance, if the application wants to be notified when a button is pressed, it would define a message handler of type "on Activate" for a source id of the button "myObject # myButton." The descriptor also must specify a code target, such as "anotherObject # root. code.myButtonHandler." This target pathname specifies the element identifier where the handler for the button can be found.

In addition to a type, source and target, the message descriptor may also contain a set of context elements that describe the ids of objects to be sent in the message. For instance, suppose the button "mainScreen # myButton" acts as a submit button to calculate data filled in on a form with fields "mainScreen # firstName" and "mainScreen # lastName". It would be helpful in the handler for myButton if the values of the buttons on mainScreen were easy to access. In this case, the context for myButton's handler could be set to the object "mainScreen", which would result in a copy of the mainScreen object and all of its data tree children to be easily accessible from within root.code.myButtonHandler. In cases where the message is delivered over the network, this syntax is imperative.

The chart shown in Table 17 summarizes the parts of a message descriptor.

TABLE 17

Fields in a Message Descriptor

| Attribute | Description | Example |
|---|---|---|
| id | A unique id for the message identifier that is used to identify the message to the handler. | sampleEvent |
| Type | The type of event that will trigger this message | onActivate |

TABLE 17-continued

Fields in a Message Descriptor

| Attribute | Description | Example |
| --- | --- | --- |
| Source | The source element for the event. | myScreen#myButton |
| Target | The message handler that will receive this message. In this case, a local method. | MyScreen#myButtonHandler |
| Context | An object to include in the event descriptor. | OtherScreen |

While the exact syntax for message descriptors may be left to the implementer, the hypothetical message descriptor definition shown in Table 18 may be employed. Thus, in Table 18, the descriptor will cause the handler myScreen # handler to be run when myScreen # myButton is activated. If the target were a network entity, the object otherScreen would be send along with the event object.

TABLE 18

Example: A Basic Message Descriptor

```
<sqml:message-descriptor id="sampleEvent" type="onActivate"
    source="myScreen#myButton" target="myScreen#handler>
    <sqml:context objectId="otherscreen"/>
</sqml:message-descriptor>
```

Message descriptors are commonly used to invoke native functions as well as default handlers.

Combination with In-Line Syntax Message descriptors may be triggered from within the in-line syntax, or even by posting an event from within SQScript code. This is ideal for situations where a message must be sent over the network using the rich message descriptor functionality, but the programmer wishes to use the simplicity of the in-line syntax. For example, consider Table 19.

TABLE 19

Example: Combining In-line Registrations with Message Descriptors

```
<sqml:sq-class classId="class_main" objectId="main">
    <!-- The main card -->
    <sqml:sq-card id="card_main">
        <sqml:title label="MONOIDS" />
        <sqml:top label="ABOUT US" class="border" onActivate="#desc" />
        <sqml:frame>
            <sqml:image src="splash.gif"/>
        </sqml:frame>
    </sqml:sq-card>
    <sqml:message-descriptor id="desc" target="http://server.com/foo" >
            <sqml:context objectId="otherScreen"/>
    </sqml:message-descriptor>
</sqml>
```

Here, when the on Activate event occurs on the top button, the message descriptor desc, stored on the current object, will be activated. This message descriptor will send a message object to http://server.com/foo that will include the value of the otherScreen object. Note that in this case the source and type attributes on the message-descriptor tag are not needed, since this context is provided by the in-line event registration.

Event Objects

When an event is delivered, an event object is temporarily created and passed as an argument to the message handler. The event object contains the context of the event, which may include the time that the event occurred, the sending object, the location of the cursor, and other information.

V: SQScript Language

The SQScript language, described by way of the following examples, discussion and reference materials, is a highly useful means to implement client-side code on SimpleOS. Unlike native code, SQScript can run on any of the SimpleOS supported platforms. It provides stronger security than native-code handlers and is much easier to write. The following sections describe the SQScript language in detail.

It should be noted that the SQScript language demonstrated below is but one of many possible languages suitable for manipulating a superstructure-based application in accordance with the invention. A superstructure-driven operating system and application environment could omit some features of the language described below, or add other features, and still be within the ambit of the invention. Other languages with different syntaxes could be used; or in certain cases, an implementer could avoid using any language locally at all, and instead rely on all updates to occur over a network. For purposes of the SimpleOS examples set forth herein, the applicants have opted to use a local language.

It should also be noted that the programming language demonstrated below was designed to be syntactically similar to XSLT, a programming language used to transform tree structures. However, the execution environment whereby the application interacts with the operating system is (as will be seen below) radically different from XSLT, because the tree transformations themselves form the basis of continuous processes of maintaining the application, as opposed to a one-time translation.

Hello World Example

Figure 13:
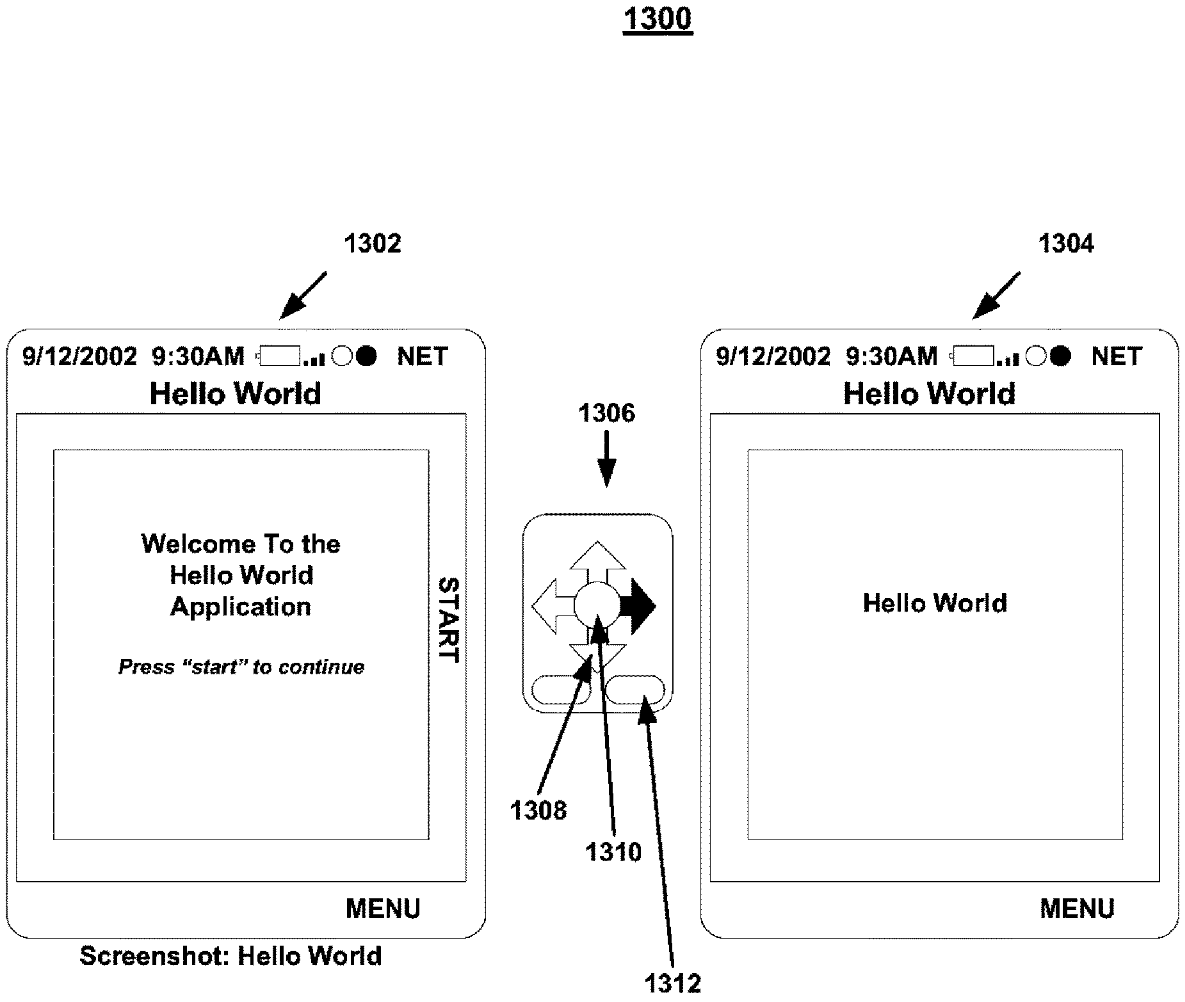
FIG. 13 is a screenshot of the Hello World example.

In connection with an introduction to SQScript, consider the following Hello World example, depicted graphically in FIG. 13. In this example, a screen 1300 is presented to the user with a single button (such as a button of the conventional 4-way controller 1306, which includes arrow keys 1308, center key 1310 and additional keys below, 1312). When the button is pressed, the message "Hello World" is displayed. Note that a simple Hello World can actually be accomplished simply by defining a screen with the text "Hello World." However, this example involves some code, so it provides an introduction to SQScript programming. In particular, possible source code for this application is shown in Table 20.

TABLE 20

Example: Hello World

```
<sqml xmlns:sqml="http:/www.sqgo.com/sqml/sqml.dtd"
            appid="com.sqgo.simpleos.demo.helloWorld"
            activate="main:card_main"
>
<sqml:sq-class classid="class_main" objectid="main">
    <!-- The main card -->
    <sqml:sq-card id="card_main">
        <sqml:title label="Hello World" />
        <sqml:right label="START" class="border"
                onActivate="{ui:card='main:card_hello'}" />
        <sqml:frame>
            <sqml:textarea>Welcome To the Hello World Application
            </sqml:textarea>
                <sqml:textarea>Press “start” to continue
            </sqml:textarea>
        </sqml:frame>
    </sqml:sq-card>
    <!-- The "hello world" card -->
    <sqml:sq-card id="card_hello">
        <sqml:title label="Hello World" />
        <sqml:frame>
            <sqml:textarea>Hello World
            </sqml:textarea>
        </sqml:frame>
    </sqml:sq-card>
</sqml:sq-class>
</sqml>
```

Note that the stylesheets for this and other application code examples have been omitted to improve the clarity of the examples. Bold sections of the code example are discussed below.

Within the initial sqml tag, notice the presence of the attribute definition activate="main:card_main." This tells SimpleOS that the initial card to show on the screen should be the entity named "main:card_main." In fact, SimpleOS will set the ui.card value to this string when the application loads. This statement presumes that somewhere within the process's superstructure, there is (or will be) an object called main with a sq-card definition called card_main.

Sure enough, in the sq-class definition, there is an attribute called objectid. This attribute indicates to SimpleOS that after the class class_main has been defined, an instance of the class will automatically be created and called main. This solves the problem earlier of having set the current card to main:card_hello.

Within the right tag, we define our one and only button. The purpose of this button is to change the current screen from card_main to card_hello. In order to do this, we have to register to receive the on Activate message on the right card button. We also must define some code so that the target of the handler will actually cause the screen to change. As previously discussed, screen changing is accomplished by changing the value of ui:card to an element identifier that points to the desired object and card within the object.

The attribute on Activate="{ui:card=' main:card_hello'}" performs both the registration and code definition action. (This is an example of an in-line event registration.) First of all, the expression ui:card='main:card_hello' is surrounded by curly braces (the ones that look like this: { }). These curly braces tell the SQScript interpreter that when the on Activate expression is read, it should invoke the expression language parser to run the expression inside the braces. The expression plus its surrounding curly braces is called an expression block.

Finally, within the text area tag found in the second card definition, we find our "Hello World" text.

The SQML Tag

The <sqml> element type is the root of all SQML documents. The <sqml> element can contain an optional <sqml:style-sheet> element, followed by zero or more <sqml:sq-class> elements. The <sqml:style-sheet> element is only allowed when the doctype attribute on the <sqml> element is set to application or fragment.

The formal XML declaration for the <sqml> element is as follows: <!ELEMENT sqml ((style-sheet?), (sq-class*))>. See Table 21.

TABLE 21

The SQML Tag Attributes

| Attribute | Purpose |
|---|---|
| xmlns | Required - defines the SQML namespace. It should be formatted as follows:<br>xmlns:sqml="http:/www.sqgo.com/sqml/sqml.dtd" |
| appid | Required - application ID. By convention uses a JAVA-like naming style.<br>Example:<br>appid="com.sqgo.simpleos.application.sample1" |
| sessionid | Required for applications with network interaction.<br>Indicates the session to which this document applies. |
| doctype | Required, possible values include:<br>application: this is a full SQML application document<br>fragment: this is a fragment (update) to an SQML application<br>message: this is a network message<br>object: this is serialized object |
| activate | Names an object ID and sq-card to be activated by the application. Note that this is an object ID and not a class ID; therefore, the class should use the auto-instantiation feature and specify the same object ID.<br>Example:<br><sqml xmlns:sqml="http:/www.sqgo.com/sqml/sqml.dtd"<br>appid="com.sqgo.simpleos.application.sample1"<br>doctype="application"<br>activate="main#card"> |

TABLE 21-continued

The SQML Tag Attributes

| Attribute | Purpose |
|---|---|

```
        <sqml:sq-class classid="main">
            <sqml:sq-card id="card">
                ... sq-card elements ...
            </sqml:sq-card>
        </sqml:sq-class>
    </sqml>
```

Expression Blocks

The most basic execution unit within SQScript is an expression block. Expression blocks can be found almost everywhere inside a class or object. They indicate code in the SimpleOS Expression Language that should be evaluated. The SimpleOS Expression Language (EXL) is actually not based in XML like most of SimpleOS. The expression language is a string-based language with a special grammar vaguely reminiscent of XPATH, the expression language of XSLT. Expressions can involve assignment, variable lookups, data tree lookups, conditional expressions, mathematical calculations, predicate logic, and a variety of other typical programming constructs. A substitution expression can be used to define the name or value of almost any attribute within the template as well as the predicate of any conditional or looping structure. The exact details of the grammar will be considered very shortly.

Expression blocks can be placed almost anywhere that the interpreter expects a string. When a string is needed (such as the value of the on Activate tag in the example above), the expression is immediately evaluated in its current context. When expressions are placed in an on Activate block, they are evaluated when the object in question receives an activate event. Expressions can also be found inside other places within the data tree, such as in the name of a label or the value of a text area. In this case, whenever SimpleOS needs to find the actual value of the string, it first will evaluate the expression and substitute the value of the expression into the place where it was found. In this case, the expression block is called a substitution expression. This behavior is also known as expression interpolation.

Figure 14:
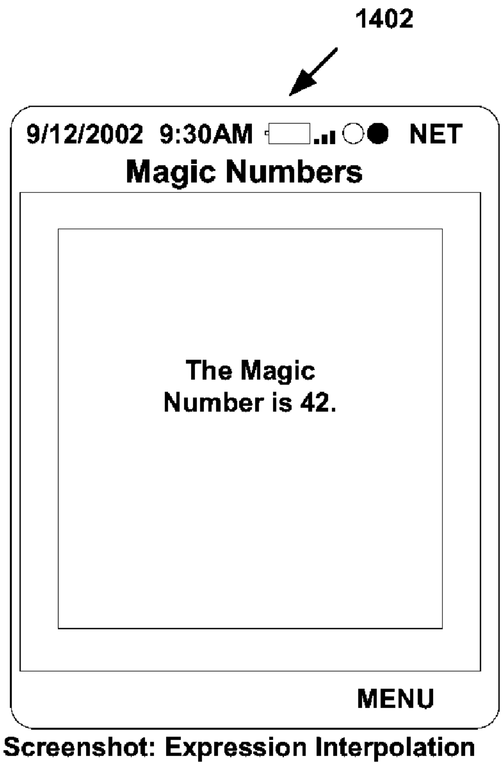
FIG. 14 is a screenshot of expression interpolation.

Consider the examples shown in Tables 22, 23 and FIG. 14. Each will result in a string "The magic number is 42." In these examples, the expression is evaluated every time the screen is redrawn.

TABLE 22

Example: Expression Interpolation in Text Elements

```
<sqml:sq-card id="card_hello">
    <sqml:title label="Magic Numbers" />
    <sqml:frame>
        <sqml:textarea>The magic number is {2+40}.
        </sqml:textarea>
    </sqml:frame>
</sqml:sq-card>
```

TABLE 23

Example: Expression Interpolation in Attributes

```
<sqml:sq-card id="card_hello">
    <sqml:title label="Magic Numbers" />
    <sqml:frame>
```

TABLE 23-continued

Example: Expression Interpolation in Attributes

```
        <sqml:label text="The magic number is {2+40}." />
    </sqml:frame>
</sqml:sq-card>
```

See FIG. 14 for visual presentation (screenshot) of the result.

Some attributes are not allowed to contain expression interpolation blocks. These include the "id" and "name" attributes, as well as within the structural tags such as sq-class.

Escaping Interpolation Characters

In order to use the {and} characters within a string without marking an expression block, you must escape them using the backslash character.

Interpolation and Assignment

If the interpolated expression is an assignment, the substituted value will be null. For instance, consider the following string: "This is a{foo=$bar} test." When evaluated, this expression will become: This is a test.

Data Types

Although all data in a SimpleOS application originates from SQML, which is entirely character data, the SQScript evaluator recognizes and handles data types other than character. SQScript supports the following data types: String: a string of characters; List: a linear list of character strings; Boolean: true or false; Numeric: an integer or floating point value; Element Identifier: a reference to an object or named element in an object, such as a SqCard or variable. Any quoted string in a SQScript expression is treated as a literal String value. Single or double quotes may be used. An unquoted string in a SQScript expression is an element identifier. When a literal Boolean value is called for, the built-in functions true() and false() provide values. (The quoted string 'true' is a String value, and an unquoted string is an element identifier.)

In this case, the string is parsed as an element or object identifier. If the element doesn't exist and the reference is followed, a runtime error will occur.

The SQScript evaluator expects the expression found in the test attribute of an if or for element to evaluate as Boolean. The evaluator never coerces a Boolean value from a non-Boolean. A Boolean may be formatted as a String, the result of which will always be "true" or "false."

Arithmetic operators expect numeric operands, and produce numeric results. When evaluating arithmetic operators, the expression evaluator coerces string operands into numeric values by scanning the strings. If any operand string does not represent a number, the special value NaN (not a number) is the result of the operation.

Introduction to Variables

Variables within SQScript can be used to temporarily store data between evaluations of single expressions. The most basic type of variable is called a scalar. A scalar can represent any single string, number, Boolean or object/element identifier. Variables have a name that is used to find the value or to assign a new value.

Variables are declared by including a variable declaration somewhere within the scope of an object. “Somewhere” is very broad. If the variable declaration occurs directly underneath a class or object, it is considered a “member variable.” However, a variable can also be declared anywhere within a function (we’ll get to that later), in which case the variable is considered to have a scope bounded by the nesting of the program block. These rules are very similar to variable scoping rules in C or JAVA.

Table 24 shows an object with a single variable.

TABLE 24

Example: An Object with a Single Variable

```
<sqml:sq-class classId="myClass" extends="theObject">
    <sqml:variable name="index">1</sqml:variable>
</sqml:sq-class>
```

Figure 15:
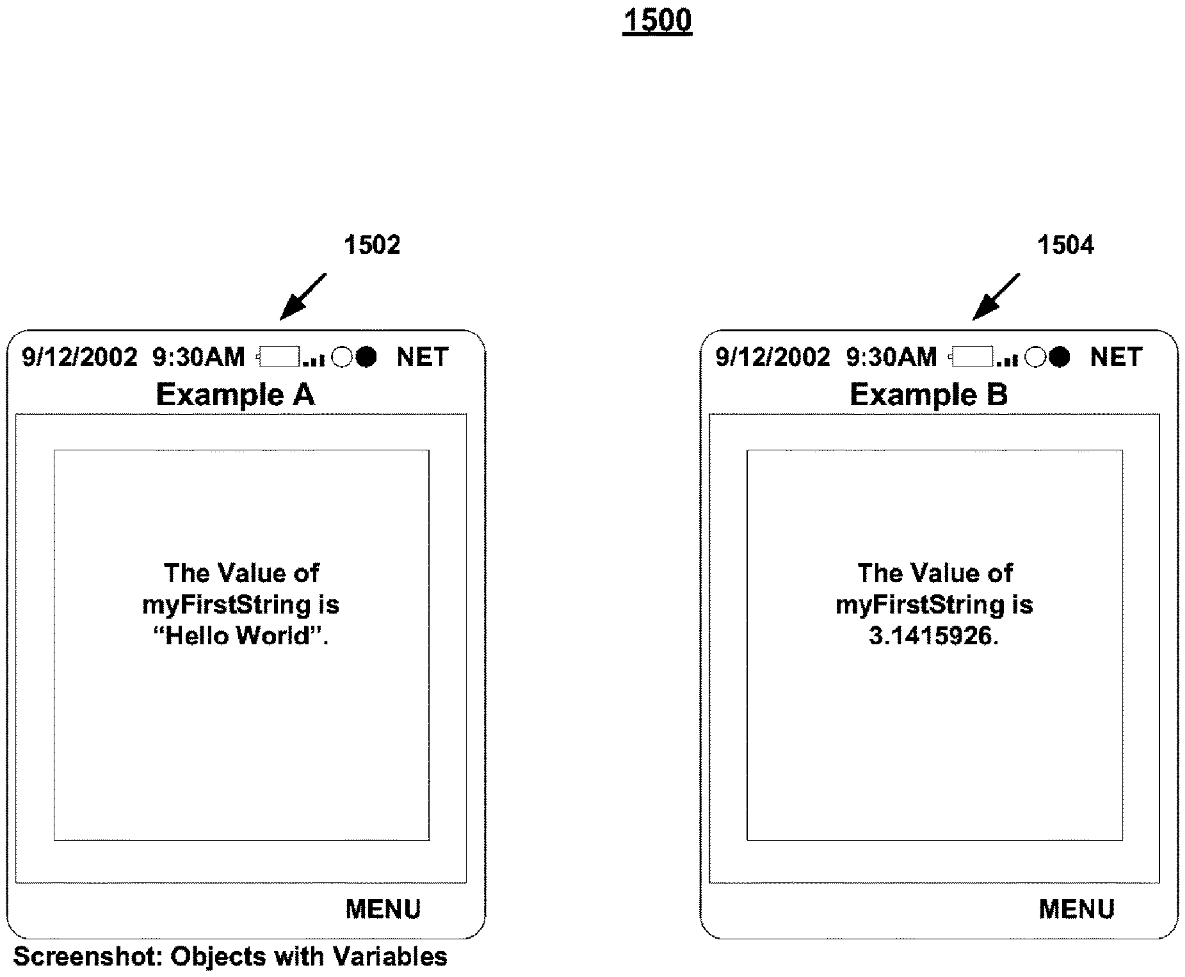
FIG. 15 is a screenshot relating to objects with variables.

In this example the variable is called index. Code inside myClass can reference this variable using a variable syntax like $index. The examples shown in Tables 25 and 26 demonstrate the use of this syntax. (As defined herein, scalars can contain both numbers and strings.) The result of these two cards, when displayed, is shown in FIG. 15 (see 1502, 1504).

TABLE 25

Example: Object with a String Variable

```
<sqml:sq-class classId="myClass" extends="theObject">
    <sqml:variable name="myString">Hello World</sqml:variable>
    <sqml:sq-card id="card_hello">
        <sqml:title label="Example A" />
        <sqml:frame>
            <sqml:textarea>
                The Value of myFirstString is "{$myString}".
            </sqml:textarea>
        </sqml:frame>
    </sqml:sq-card>
</sqml:sq-class>
```

TABLE 26

Example: Object with a Numeric Variable

```
<sqml:sq-class classId="myClass" extends="theObject">
    <sqml:variable name="myNumber">3.1415926</sqml:variable>
    <sqml:sq-card id="card_hello">
        <sqml:title label="Example B" />
        <sqml:frame>
            <sqml:textarea>
                The Value of myFirstString is "{$myNumber}".
            </sqml:textarea>
        </sqml:frame>
    </sqml:sq-card>
</sqml:sq-class>
```

Variable Assignment

The :=operator can be used to assign new values to variables. Consider the examples of Table 27, where the $counter variable is used to maintain a running tally. Each time the user presses “Increment,” the counter is incremented.

TABLE 27

Example: Variable Incrementing

```
<sqml xmlns:sqml="http:/www.sqgo.com/sqml/sqml.dtd"
        appid="com.sqgo.simpleos.demo.helloWorld"
        activate="main:card_main"
>
<sqml:sq-class classid="class_main" objectid="main">
    <sqml:variable name="counter">1</sqml:variable>
    <!-- The main card -->
    <sqml:sq-card id="card_main">
        <sqml:title label="Variable Incrementing" />
        <sqml:right label="Increment" class="border"
                onActivate="{counter := $counter + 1}" />
        <sqml:frame>
            <sqml:textarea class="bigtext">
                Press Increment to increase the value:
            </sqml:textarea>
                <sqml:textarea class="miditalictext">
                    Current Value is: {$counter}
            </sqml:textarea>
        </sqml:frame>
    </sqml:sq-card>
</sqml:sq-class>
</sqml>
```

Figure 16:
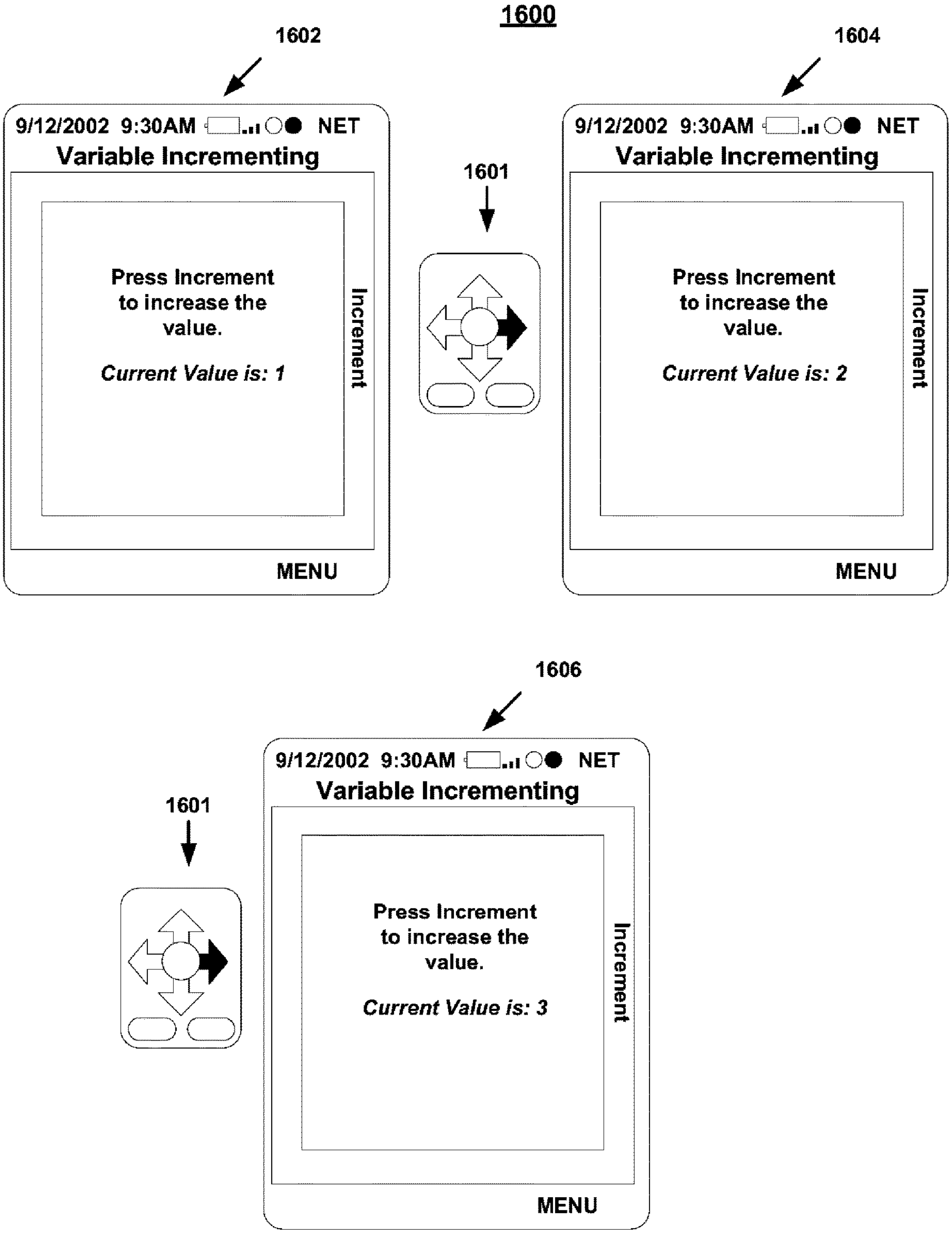
FIG. 16 is a screenshot relating to variable incrementing.

Visually, the output of this program will look something like what is shown in FIG. 16 (see 1602, 1604, 1606).

Variable Assignment Nuances

In the previous example, the incrementing expression {counter:=$counter+1} illustrates an important different between counter and $counter within the expression. The $ tag performs the SQScript equivalent of a de-reference, looking up the value of the expression instead of representing the expression itself. If the expression had merely been {counter:=counter+1}, SQScript would indicate a runtime error because counter on the left side of the expression indicates a pointer to the variable, not a number that can be added to 1.

Variable Methods and Attributes

Variables support a set of methods and attributes. Methods can be called on each variable just like a method call to an object or class, and attributes can be accessed using the usual instance variable syntax.

Globally Available Variable Attributes

All variable types support the attributes shown in Table 28.

TABLE 28

Summary Globally Available Variable Attributes

| Attribute | Purpose |
|---|---|
| access | public \| private \| protected (default: private) Access modifier - works similar to C++ and JAVA; this only has meaning for variables declared at the class level. This attribute will cause an error to be thrown if used with variable declarations in other scopes. |
| final | true \| false (default: false) If true, value(s) cannot be modified. For Node type variables, setting final to true means that attribute values cannot be modified. |
| size | Returns the number of items in the variable; for a scalar variable (<sqml:variable>) the size is always one. To get the length of the String value of a scalar variable, use the length method. |

Scalar Attributes

In one practice of the invention, the following attributes (Table 29) are supported by scalar variables.

TABLE 29

| Scalar Attributes | |
|---|---|
| Method name | Purpose |
| length | Returns the length of the String value contained in a scalar variable. If used as an lvalue, will truncate or pad the string (with spaces) to the specified length.<br>Example: truncates "ice cream" to "ice"<br><sqml:variable name="myvar>ice cream</sqml:variable><br><sqml:eval expr="myvar#length := 3"/> |
| tokenize(sep) | Splits the string into a series of tokens using the separators. This should be used as an rvalue in an assignment where the lvalue is the name of a list variable. Anything in the list prior to the string token operation is destroyed. Example:<br><sqml:variable name="mystring">every good boy deserves fudge</sqml:variable><br><sqml:list name="mylist"/><br><sqml:eval expr="mylist := $mystring#tokenize(' ')"/> |

List Methods

List variables support the following methods (Table 30):

TABLE 30

| List Methods | |
|---|---|
| Method name | Purpose |
| Remove(i) | Removes the item at position I |
| removelast | Removes the last item |
| removefirst | Removes the first item |
| Addlast | Adds an item at the end of the list |
| Addfirst | Add an item to the head of the list |
| Clear | Removes all items from the list |
| Append | Append the items in the rvalue list to the lvalue list.<br>Example: appends list2 to list1<br>list1#append($list2) |

In order to explicitly avoid name collisions between inner and instance scope variables of the same name, this can be specified as an object qualifier. A variable with the name this is automatically created as an instance member. The value of this is set to the object ID. A new value cannot be assigned, nor can any other variable with the name this be created, regardless of context; i.e., this is a reserved word.

The example of Table 31 demonstrates the use of this.

TABLE 31

Example of "this"

```
<sq-class classid="thisexample">
    <sqml:variable name="myvar"/>
    <sqml:function id="inif" type="initializer">
        <sqml:param name="myvar" type="string"/>
        <sqml:eval expr="this#myvar := $myvar"/>
    </sqml:function>
</sq-class>
```

Introduction to Lists

SimpleOS allows variables to include more than one value. In this case, the variable is called a list. A list can be declared using syntax like that shown in Table 32.

TABLE 32

Declaring List Variables

```
<sqml:list id="list_pizzaImages">
    <sqml:list-element>thincrust.gif</sqml:list-element>
    <sqml:list-element>thickcrust.gif</sqml:list-element>
```

TABLE 32-continued

Declaring List Variables

```
    <sqml:list-element>deepdish.gif</sqml:list-element>
</sqml:list>
```

The elements of the list may be accessed using array-index syntax, such as: <img src="{$1ist pizzalmages[1]}"/>. The first item is always 1, the second 2, etc. If a list expression appears within an attribute value template, the template is replaced by the elements in the list, separated by spaces. For instance: <text-label label="{$1ist pizzalmages}"/> would generate a label: thincrust.gif thickcrust.gif deepdish.gif. The number of elements in a list can be returned by using the count( ) function. For example, {count($list_pizzalmages)} evaluates to 3 There are several other built-in functions for working with lists in SQScript.

List Example

Using arrays, a simple pizza chooser application can be created. This application will let the user cycle between a list of pizzas on a card, seeing both a photo and a text description of each. Because we have not covered conditional expressions yet, there is nothing to prevent the user from cycling beyond the three pizzas we have defined. (This example will be revisited later in the section on methods.)

In the source code shown in Table 33, the system maintains a variable called "index" that tracks the number of the current pizza.

TABLE 33

Example: Pizza Ordering Version 1.0

```
<sqml:sq-class classid="class_menubase" id="main">
    <sqml:variable name="index">2</sqml:variable>
        <sqml:list name="list_pizzaNames">
            <sqml:list-element>Thin Crust Pizza</sqml:list-element>
            <sqml:list-element>Thick Crust Pizza</sqml:list-element>
            <sqml:list-element>Deep Dish Pizza</sqml:list-element>
    </sqml:list>
    <sqml:list name="list_pizzaImages">
            <sqml:list-element>thincrust.gif</sqml:list-element>
            <sqml:list-element>thickcrust.gif</sqml:list-element>
            <sqml:list-element>deepdish.gif</sqml:list-element>
    </sqml:list>
    <sqml:sq-card id="card_menu">
        <sqml:title label="Pizza Menu" />
        <sqml:top label="PREVIOUS" class="border"
                onActivate="{index=$index-1}" />
        <sqml:bottom label="NEXT" class="border"
                onActivate="{index=$index+1}" />
```

TABLE 33-continued

Example: Pizza Ordering Version 1.0

```
        <sqml:frame>
            <sqml:image src="{list_pizzaImages[$index]}" />
            <sqml:textarea>
                {list_pizzaNames[$index]}
            </sqml:textarea>
        </sqml:frame>
    </sqml:sq-card>
</sqml:sq-class>
```

Figure 17:
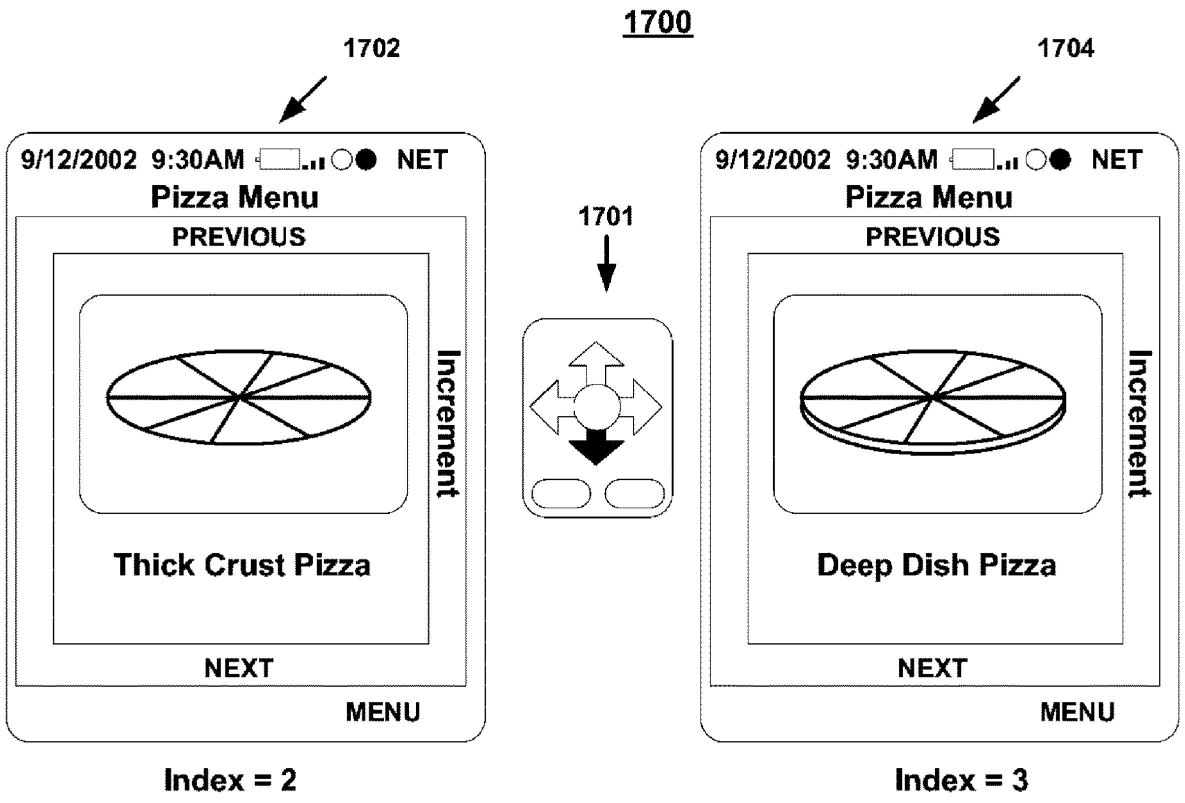
FIG. 17 is a screenshot for the pizza ordering example.

The "next" and "previous" buttons have been wired up to increment and decrement the index variable. Within the frame definition, an image and a text area extract information from two arrays list_pizzaNames and list_pizzalmages based on the current value of index. Screenshots corresponding to this example are shown in FIG. 17 (1702, 1704).

Object Lists, Maps and Vectors

Although lists, hash maps and vectors can only store strings as the primitive object types, they can in fact be used as very powerful collection classes to organize groups of objects. Since all objects have a unique ID, which is a string, creating a list, hash map or vector of object IDs is equivalent to storing references to the objects.

By the same token, IDs of XML nodes could also be stored in these collection classes, and then the IDs could be used to dynamically build Node variables to access an object's DOM structure. Be aware, however, that the XML IDs are only guaranteed to be unique within an object instance. So be careful not to mix references to different object's DOMs.

When an object is instantiated using the <sqml:new> statement, an automatic variable is created in the current scope called newobjectid. The example shown in Table 34 builds a list of objects that contain messages.

TABLE 34

Example: Building a List of Objects

```
<sqml:sq-class classid="class1">
    <sqml:message id="msg1"/>
</sqml:sq-class>
<sqml:sq-class classid="class2">
    <sqml:message id="msg2"/>
</sqml:sq-class>
<sqml:sq-class classid="class3">
    <sqml:message id="msg3"/>
</sqml:sq-class>
<sqml:sq-class id="main" objectid="main">
    <sqml:list name="objectList"/>
    <sqml:function name="init" type="initializer">
        <sqml:new classid="class1"/>
        <sqml:eval expr="objectList#addlast($newobjectid)"/>
        <sqml:new classid="class2"/>
        <sqml:eval expr="objectList#addlast($newobjectid)"/>
        <sqml:new classid="class3"/>
        <sqml:eval expr="objectList#addlast($newobjectid)"/>
    </sqml:function>
</sqml:sq-class>
```

Implicit Tree Variables

Certain elements within the tree data of an object also create implicit variables. Most GUI elements use this approach to provide a way to extract their current value. For instance, a text field declaration automatically creates a variable with its id: <sqml:text-field id="usemame" label="Enter your name" value="foo"/> The current contents of the text field can be extracted by referring to $username.

Consider the code example shown in Table 35, which creates a text field and a text label. When the "GO" button is pressed, the value of the text field is copied into the current value.

TABLE 35

Example: Text Field Extraction

```
<sqml xmlns:sqml="http:/www.sqgo.com/sqml/sqml.dtd"
            appid="com.sqgo.simpleos.demo.textFieldExample"
            activate="main:card_main"
>
<sqml:sq-class classid="class_main" objectid="main">
    <sqml:variable name="currentValue"></sqml:variable>
    <sqml:sq-card id="card_main">
        <sqml:title label="Text Field Example" />
        <sqml:right label="GO" class="border"
                onActivate="{currentValue := $username}" />
        <sqml:frame>
            <sqml:textarea>Enter Text</sqml:textarea>
                <sqml:text-field id="username" label="Your Text"
                    value="" />
                <sqml:textarea>Current Value is: {$currentValue}
            </sqml:textarea>
        </sqml:frame>
    </sqml:sq-card>
</sqml:sq-class>
</sqml>
```

Figure 18:
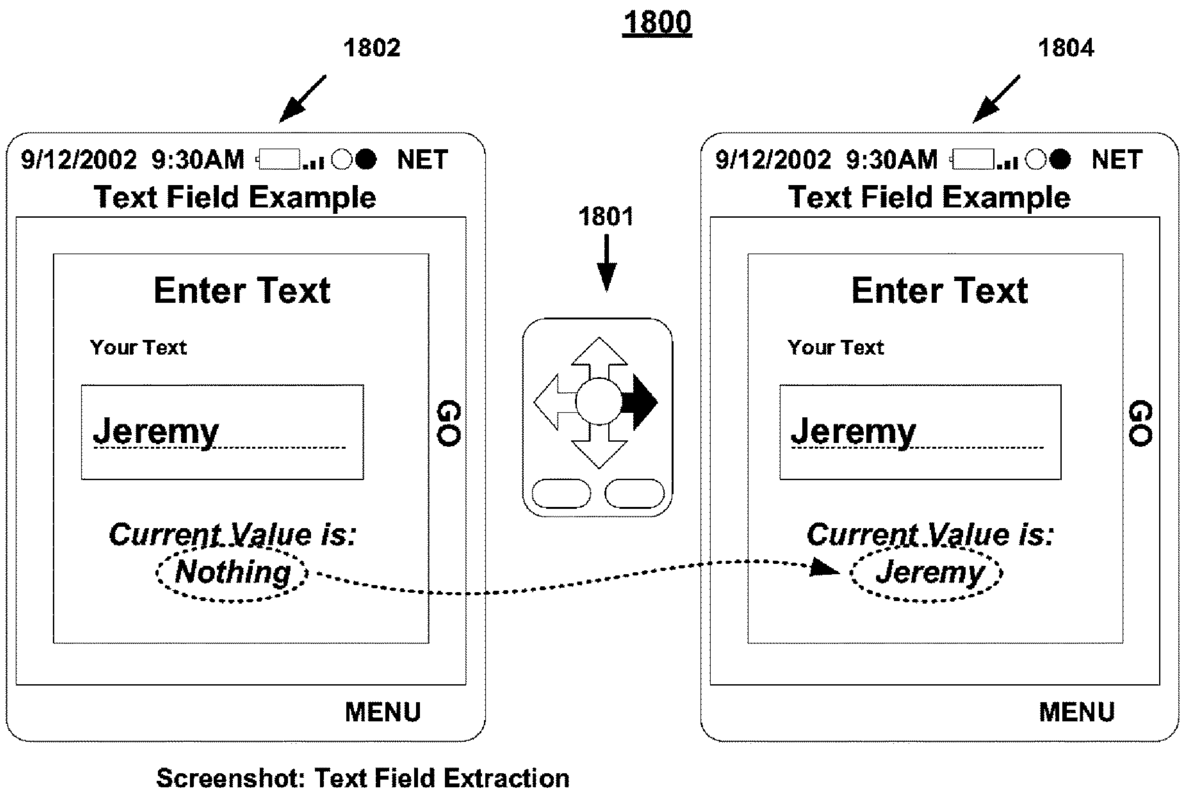
FIG. 18 is a screenshot for text field extraction.

This example will look something like that shown in the screenshot of FIG. 18 (1802, 1804), when executed. The user has already entered the string "Jeremy" into the text field.

Extended Expressions

Just like C and JAVA, SQScript expressions can contain basic mathematical operation. This may include arithmetic as well as mathematical functions. Function use the syntax function( ) where a variable or set of variables is included within the parenthesis separated by commas.

Some examples of valid expressions with and without functions are shown in Table 36.

TABLE 36

Examples of Mathematical Expressions

```
{ foo := 12/16 }
{ foo := 12/(16+23+19+$bar) }
{ foo := cos( $bar) }
```

Instance Variables

If a list or scalar variable is declared underneath the class or object definition, the variable becomes an instance variable. This allows it to be accessed from other objects using the standard element identifier syntax. In the example shown in Table 37, the object main2 loads the values of main: usemame and main:var.

TABLE 37

Example: Instance Variables

```
<sqml:sq-class classid="class_main" objectid="main">
    <sqml:sq-card id="main">
        <sqml:titlelabel="TEST" />
        <sqml:frame>
            <sqml:text-field id="userName" label="Type Your Name"
                value="Jeremy Gilbert" />
        </sqml:frame>
    </sqml:sq-card>
    <sqml:variable name="myScalar">This is a scalar</sqml:variable>
</sqml:sq-class>
```

TABLE 37-continued

Example: Instance Variables

```
<sqml:sq-class classid="subclass" objectid="main2">
    <sqml:sq-card id="main2">
        <sqml:title label="TEST TWO" />
        <sqml:top label="ABOUT US" class="border"
onActivate="{ui:card='main#card__about'}" />
        <sqml:frame>
            <sqml:text-label id="userName" label="Your Name Is"
                value="{$main:userName} and {$main:var}" />
        </sqml:frame>
    </sqml:sq-card>
</sqml:sq-class>
```

Methods

SQScript methods are almost identical to methods in other object-oriented languages. Each method runs inside the variable binding context of the object it was invoked upon. That means that local variables and data within the object's data tree are locally accessible to the code of the method. Methods can be invoked within any SQScript expression, including from other methods.

Defining Methods

Methods may be defined using the sqml:function tag. Referring now to Table 38, the example object main of class class_menubase defines a method called previous that decreases the value of the variable index by 1.

TABLE 38

Example: Method Definition

```
<sqml:sq-class classid="class__menubase" id="main">
    <sqml:variable name="index">2</sqml:variable>
    <function id="previous">
        <sqml:eval expr="{index := $index−1}" />
    </function>
</sqml:sq-class>
```

The Method Body

Within the body of the method, statements can be included in an ordered list. These statements may include conditional statements, expressions, loops, and other basic programming structures.

When a method is invoked, the statement elements underneath the definition are evaluated one-by-one. When the last statement is evaluated, the method terminates.

The most common type of statement within a method body is an eval statement. The eval statement element takes a single attribute expr that contains a SQScript expression. The curly braces are required here and every other time a SQScript expression is included somewhere within the superstructure.

The example of Table 39 demonstrates multiple expressions chained together. At the conclusion of the method, the value of $test will be 1111.

TABLE 39

Example: Evaluation Tags in a Method

```
<sqml:sq-class classid="base__class" id="main">
    <sqml:variable name="test">1</sqml:variable>
    <function id="doStuff">
        <sqml:eval expr="{test=$test+10}" />
        <sqml:eval expr="{test=$test+100}" />
        <sqml:eval expr="{test=$test+1000}" />
    </function>
</sqml:sq-class>
```

Invoking Methods

Methods may be invoked from within any SQScript expression. The syntax for method invocation is the name of the method followed arguments bracketed within a set of parentheses. Even in cases where there are no arguments, the parentheses are needed to denote a method invocation to the parser.

In the example of Table 40, the method doStuff invokes a second method called helpMe.

TABLE 40

Example: Method Invocation

```
<sqml:sq-class classid="base__class" id="main">
    <sqml:variable name="test">1</sqml:variable>
    <function id="doStuff">
        <sqml:eval expr="{test=$test+10}" />
        <sqml:eval expr="{:helpMe( )}" />
    </function>
    <function id="helpMe">
        <sqml:eval expr="{test=$test+100}" />
        <sqml:eval expr="{test=$test+1000}" />
    </function></sqml:sq-class>
</sqml:sq-class>
```

In addition, methods may be called using a variety of formats, shown in Table 41.

TABLE 41

Method Invocation Examples

| | |
|---|---|
| main:helpMe( ) | Indicates a call to method helpMe on main |
| :helpMe( ) | Calls method helpMe on the current object |
| helpMe( ) | Calls method helpMe on the current object |

Variables Scope

Scalar and list variables may be declared inside methods. These variables are not visible outside of the method under any circumstances, and are only available to code within the method. If a variable within a method (or a block) has the same name as a variable outside of the block or a method, the variable will obscure the definition further away from the currently executing code.

When the code shown in Table 42 runs, the inner copy of test is incremented, not the outer copy of test. However, it is still possible to reach outer instances of variables by using element syntax. The code shown in Table 43 increments both instances of $test.

TABLE 42

Variable Masking

```
<sqml:variable name="test">0</sqml:variable>
    <function id="doStuff">
        <sqml:variable name="test">0</sqml:variable>
        <sqml:eval expr="{test := $test + 10}" />
    </function>
```

TABLE 43

Variable Masking with Element Identifiers

```
<sqml:sq-class classid="base_class" id="main">
  <sqml:variable name="test">0</sqml:variable>
  <function id="doStuff">
    <sqml:variable name="test">0</sqml:variable>
    <sqml:eval expr="{test := $test + 10}" />
    <sqml:eval expr="{main:test := $main:test + 10}" />
```

TABLE 43-continued

| Variable Masking with Element Identifiers |
|---|

```
    </function>
  </sqml:sq-class>
```

Declaration Order

The order of the variable declarations is not critical. The portions of code shown in Table 44 are equivalent and both valid.

TABLE 44

| Examples of Declaration Order |
|---|

```
<function id="doStuff">
        <sqml:variable name="test">0</sqml:variable>
        <sqml:eval expr="{test=$test+10}" />
    </function>
    <function id="doStuff">
        <sqml:eval expr="{test=$test+10}" />
        <sqml:variable name="test">0</sqml:variable>
    </function>
```

This results from the fact that variable declarations are not statements and are not parsed at the time that the statements are evaluated. Before a line of code inside a block is ever interpreted, the variables inside are collected together to provide a context object for the evaluator. The context object does not care where the definition occurs, only where it is within the block structure.

Blocks and Variable Scope

Most looping and conditional statements create new variable context where it is possible to mask variable names. Within a method, variables will bind to their closest block. Consider the example shown in Table 45. Here, the assignment {$index:=1} within the if block will only update the inner index variable.

TABLE 45

| Blocks and Variable Scope |
|---|

```
<function id="next">
<sqml:variable name="index">0</sqml:variable>             # Not updated
    <sqml:eval expr="{index := $index+1}" />
    <sqml:if test="{$index > 5}">
            <sqml:variablename="index">0</sqml:variable>     # Updated
        <sqml:eval expr="{$index := 1}" />
    </sqml:if>
</function>
```

Conditional Statements

One of the most basic control structures is the if block. The if block only evaluates expressions inside of the block if the test attribute evaluates to true. The if block begins by running the code within the test expression. If the result is true, the evaluator is allowed to continue into the block. Otherwise, the block is skipped. Conditional statements only work inside methods.

In the example shown in Table 46, the variable numItems is checked. If the value is greater than 100, the variable $message is updated.

TABLE 46

| Example: If Block |
|---|

```
    <sqml:variable name="numItems">0</sqml:variable>
<function id="checkLabel">
```

TABLE 46-continued

| Example: If Block |
|---|

```
    <sqml:if test="{$numItems > 100}">
        <sqml:eval expr="{message := 'You have too many items' }" />
    </sqml:if>
</function>
```

Loops

SQScript can also support looping structures.

Pizza Ordering Revisited

Figure 19:
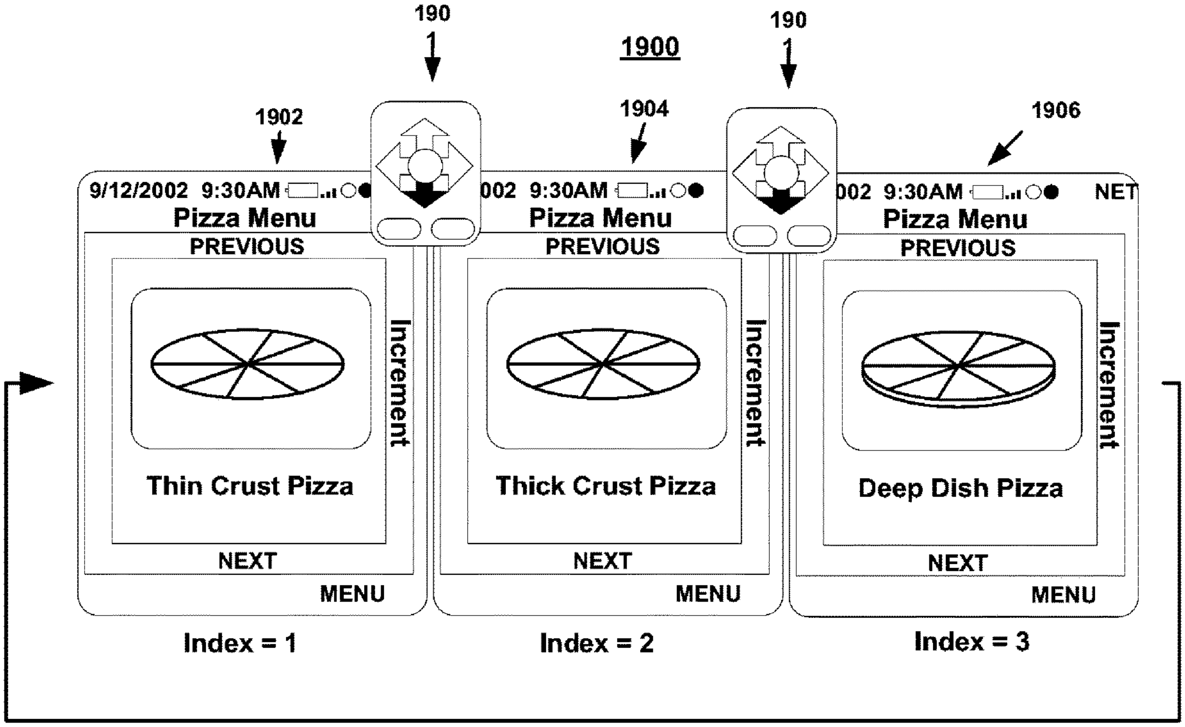
FIG. 19 is a screenshot showing further detail of a pizza ordering example.

The example shown in the screenshots of FIG. 19 (1902, 1904, 1906) demonstrates a number of concepts. The application allows the user to cycle through a set of three pizza selections. However, unlike the previous pizza ordering example, this version maintains a check to ensure that if the user goes past the last item in the list, the selector will wrap back to the first item.

The example of code shown in Table 47 operates by defining two methods, next and previous, that increment or decrement a counter with the current pizza name. They also contain a check to reset the value if needed.

TABLE 47

| Example: Pizza Ordering Revisited |
|---|

```
<sqml:sq-class classid="class__menubase" id="main">
    <sqml:variable name="index">2</sqml:variable>
    <sqml:list name="list__pizzaNames">
        <sqml:list-element>thin crust pizza</sqml:list-element>
        <sqml:list-element>thick crust pizza</sqml:list-element>
        <sqml:list-element>deep dish pizza</sqml:list-element>
    </sqml:list>
    <sqml:list name="list__pizzaImages">
        <sqml:list-element>thincrust.gif</sqml:list-element>
        <sqml:list-element>thickcrust.gif</sqml:list-element>
```

TABLE 47-continued

| Example: Pizza Ordering Revisited |
|---|

```
        <sqml:list-element>deepdish.gif</sqml:list-element>
    </sqml:list>
    <sqml:sq-card id="card__menu">
        <sqml:title label="PizzaMenu" />
        <sqml:top label="PREVIOUS" class="border"
                onActivate="{previous( )}" />
        <sqml:bottom label="NEXT" class="border"
                onActivate="{next( )}" />
        <sqml:frame>
            <sqml:image src="{list__pizzaImages[$index]}" />
            <sqml:textarea>
                {list__pizzaNames[$index]}
            </sqml:textarea>
        </sqml:frame>
    </sqml:sq-card>
    <sqml:variable name="index">1</sqml:variable>
```

TABLE 47-continued

| Example: Pizza Ordering Revisited |
|---|

```
    <function id="next">
        <sqml:eval expr="index := $index+1" />
        <sqml:if test="$index > $list_pizzaNames:size">
            <sqml:eval expr="$index := 1" />
        </sqml:if>
    </function>
    <function id="previous">
        <sqml:eval expr="index := $index-1" />
        <sqml:if test="$index = 0">
            <sqml:eval expr="{index := $list_pizzaNames:size}" />
        </sqml:if>
    </function>
</sqml:sq-class>
```

Inheritance

SQScript supports the object-oriented programming concept of inheritance between classes. Each object that has been instantiated in the system belongs to a class. When methods and variable lookups occur on an object, the definition for the lookup is found by searching the inheritance tree starting at the object. First the class is searched, then the super-classes in order.

When an object is cloned from another object, the new object assumes the class of the original.

Inheritance does not serve any typing ability. Classes exist as organizational means for grouping methods and data members.

Creating Objects

Object manipulation is an important aspect of the SQScript language, since objects serve as the basic grouping for data within the superstructure. When the process is first loaded, there are no instances of any objects except the implicit objects. Each class is loaded into memory, and one of them is used to create the initial object. A programmer must declare at least one class within the SQML source to have an objectID. This causes an instance of the class to be automatically generated at runtime.

After the SimpleOS program starts, the developer may create additional object instances. Objects are created from templates, which can be either another object or a class. If the template for a new object is an existing object, the new object can become a carbon copy of the old object. The new object will assume the same class affiliation as the old object. If the template for a new object is a class, all of the data values within the class are copied over into the new object.

No two objects in the process's superstructure may have the same instance name. If a new object is created with a pre-existing instance name, the old object is completely replaced by the new object. In some cases, a programmer may wish to create a temporary object and want to ensure that the name does not conflict with a previously created object. A special programming primitive allows the programmer to create a new name for an object that is guaranteed to be unique.

Syntax

The basic object operation is "instantiate." This operation takes an objectid attribute that describes the new instance name for an object. The source attribute can be used to specify either the class or object id that forms the template for the new object. For example, and without limitation, code for instantiating an object may be provided as: <function id="makeObject"><sqml:instantiate objectid="options" source="class_options"/></function>.

Initializers

When an object is first instantiated, a method on it called initialize is called. This gives the object an opportunity to perform any initial configuration.

VI. Superstructure Operations

Object Transformations

SimpleOS provides an advanced means for object manipulation called object transformation. Object transformation is similar to the normal process of object instantiation, however an additional processing pass is taken before the object is created. A transformation is a complex expression organized as a dynamic template that maps old data values onto new data values. The template contains embedded expressions that allow nodes to be reorganized, repeated, manipulated, and altered.

During an object transformation, a template (represented as a tree) is loaded from the superstructure. This template describes a functional mapping between an existing object and a new object. When SimpleOS evaluates an SQScript template during an object transformation, various instructions within the template cause substitutions within this template. Substitutions can include finding other data within the tree, looping and indexing, conditional expressions and other common programming structures. Once the template has been filled out, the resulting value becomes the definition for the new object.

Partial Transformations

For efficiency, SimpleOS also allows a transformation to express a "clipped" tree instead of the complete definition of a new object. In the clipped tree model, the result of a template transformation is a partial list of updates that are selectively folded back into the object. A clipped tree is not a sub-tree. It faithfully follows the root-to-node structure and naming of the elements within the object. However, the clipped tree can be sparse—it does not have to include unaffected siblings or sub-trees. Every node in the clipped tree must have an expressed path to the root, but only the nodes that must be updated, changed, or deleted need to be in the clipped tree itself.

One advantage of partial transformations is the ability to track the state when the clipped tree is applied to the object. The folding process tallies all of state changes as the tree is updated. This provides rich information that SimpleOS uses to create a minimal set of work required to perform changes to the environment. This list of changes can be used for optimal GUI updating and for applying rules about how the user interface migrates from one state to another through animation, etc.

Messaging

Messaging is a special type of instantiation of a class over a network. The term messaging, as used in this concept, is entirely unrelated to Message Queues or event messages used by SimpleOS. In this context, messaging refers only to network communications. The target of a message can be a device or a server. Therefore, it is necessary for all implementations of SimpleOS and SimpleServer to provide the SQScript environment.

A message is an SQML document containing one or more SQClass templates. The type attribute for the <sqml> element is message. SimpleOS generates the required appid and sessionid attributes. In addition, SimpleOS will also provide a certification digest that is not documented here for security reasons.

Table 48 shows an example of a message.

TABLE 48

| Example: Body of a Message |
|---|

```
<sqml xmlns:sqml="http:/www.sqgo.com/sqml/sqml.dtd"
            appid="com.sqgo.simpleos.application.sample1"
            sessionid="8A7B6C5D4E3F8A7B6C5D4E3F8A7B6C5D"
            doctype="message">
    <sqml:sq-class classid="class_main">
        <sqml:message id="msg">
            Some random text data
        </sqml:message>
    </sqml:sq-class>
</sqml>
```

A number of factors are to be considered with regard to messages:

The objects in the message are instantiated on the target, not the source.

All objects are automatically instantiated for all classes defined in the message body and any initializer functions are executed.

Other functions within the instantiated objects may be invoked by the target scripting environment.

Object IDs are automatically assigned by the target system—any values supplied for the <sqml:sq-class> or <sqml:new> objectid attribute are ignored. The reason this is necessary is that the source (which emits the SQML) cannot be aware of the object namespace that exists on the target.

The message is actually serialized from the application's internal DOM structures into the text representation of SQML prior to sending over the network. The transport protocol is assumed to be a request/response type of protocol like HTTP/HTTPS. The response may be a simple acknowledgment, or it may be another SQML formatted message, depending on the needs of the application.

It is recommended that messaging occur over a secure connection whenever possible, and that the connection be protected by a digital certificate of verifiable origin.

Intrinsic Methods

In the JAVA programming languages, all objects are ultimately inherited from the base class called Object. The Object class carries with it certain methods that are therefore available to all JAVA objects. It is not necessary for any class to specifically name Object as a superclass—it is implied in the language.

In SimpleOS, objects also inherit from an implied base class, although this class does not have a name. Methods from this class are available to any class defined in SQScript. The intrinsic methods are shown in Table 49.

TABLE 49

Summary of Intrinsic Methods

| Method name | Purpose |
|---|---|
| getobjectid | Returns the object ID associated with this object instance. |
| getclassid | Returns the class ID associated with this object instance. |
| getsuperid | Returns the class ID of the super class, if any. |
| getinterfaces | Returns a list of interfaces implemented by this object. Should be used as an rvalue, with a list variable as the lvalue. Any items existing in the list prior to the call will be destroyed. |

TABLE 49-continued

Summary of Intrinsic Methods

| Method name | Purpose |
|---|---|
| save | Serialize this object to its XML representation |
| load | Restore this object from its serialized form; returns the new object ID. |

Object Serialization

Object serialization in SimpleOS is designed to rely upon XML. Ultimately, all SimpleOS objects will be serializable in XML form, although this feature is not implemented in the reference implementation and may not be for several releases.

Ideally, serialized applications, and even processes, could be moved from device to device without interrupting operation.

Two intrinsic methods are provided for object serialization: 1. save—automatically creates message objects within the DOM that carry all internal object data, and then writes the DOM as XML text. 2. load—reads serialized XML text and restores the internal data structures.

A special version of the <sqml> element provides the wrapper for serialized objects. Multiple objects can be saved in one SQML stream. The example of Table 50 shows a serial data stream representing objects and classes inside a message.

TABLE 50

| Example: Serialized Data |
|---|

```
<sqml xmlns:sqml="http:/www.sqgo.com/sqml/sqml.dtd"
            appid="com.sqgo.simpleos.application.sample1"
            sessionid="8A7B6C5D4E3F8A7B6C5D4E3F8A7B6C5D"
            doctype="object">
    <sqml:sq-class classid="class1">
        <sqml:message id="sqgocontext_123A4F9">
            ... Actual data not shown ...
        </sqml:message>
    </sqml:sq-class>
</sqml>
```

VII: Network Communication and Remote Execution

The following discussion describes ways in which SimpleOS can be used to support network communication and remote execution. Again, it is intended to illustrate and provide examples of implementation of the broader concepts of the invention, particularly as they relate to superstructure-based application environments. Accordingly, while the following discussion is based on SimpleOS and related examples, it will be understood that the principles illustrated can be implemented in a wide range of different configurations, all within the ambit of the present invention.

SimpleOS provides a novel model for network communication between the client and server if an application calls for such interaction. The developer is free to write server-side logic in any XML-enabled server programming language including JAVA, C++, PERL, TCL, SHELL and many others. Using an innovative methodology, small pieces of the application superstructure itself are shifted back and forth between the device and the server, allowing virtually any operation on the device to be performed by the server. This complete flexibility allows the programmer to adopt any request/response paradigm he chooses. Because of the abstraction offered by the application superstructure, the developer has continuous flexibility to locate application logic either on the device or on a remote server.

Simple Quick GO transcends the existing client server and HTTP-based computing architectures. In client/server the primary exchange is data in some private or public form. In HTTP, the exchange is HTML and form information that conforms to HTTP. However, SimpleOS exchanges actual pieces of the application, large or small. Messages from the server incrementally update the application superstructure through the same folding process used by object transformations.

When a running application needs to communicate with a server, pre-selected objects from the process's superstructure are automatically sent to the remote site along with the event object. The remote server's code has access to any data that it needs since the same application superstructure available on the device has been transferred over the network. If the server needs to produce some change on the device, it can send a minimal set of changes back to the device along the same communication channel. These changes are applied to objects in the superstructure in the same way that code running on the device can update the superstructure using the transformation model. This entire process works automatically since it is hooked into the transformation engine used for object transformations.

In the remote execution model, messages normally delivered to the client's code are shipped to a remote server. In client-side operation, user events typically cause a message descriptor to be identified and filled out to produce a message object, which is handled as an argument to a template-based transformation. In the remote model, this message object is serialized into SQML (or any suitable, equivalent transport mechanism) that is sent to the target using any of the supported protocols. The server reconstitutes the device's message object from the SQML and performs its processing. Because SimpleOS includes any arbitrary copy of objects inside the application's superstructure, the server has access to all of the information it needs to process a request.

After processing a request, most applications typically call for an update of the application to confirm the action or refresh a display. SimpleOS handles the return update by allowing the server to construct a result-tree object that minimally describes the necessary changes to any object within the superstructure. This result-tree object is the same data structure produced via template evaluation on the device. The server converts this response into SQML and sends it back to the device where it is un-marshaled and applied to the superstructure. Because of the parity between the client and remote execution model, any activity possible in client code is also possible on the server.

Server Components

In one practice of the invention, to assist with secure remote application processing, Simple Quick GO will provide a J2EE-compliant container that performs the work of translating messages from devices into a common form and then transmits a response back from program code. The present implementation, available first on the APACHE/TOMCAT platform, should work on any J2EE-certified application server platform. Developers can write JSP files or JAVA classes that can receive messages and perform updates on applications running under SimpleOS.

In one practice of the invention, the SimpleQuickGO Server platform maintains a state-full session bean for each active SimpleOS application that has started a networking session. Every time a SimpleOS client application sends a message to the server, the software locates the individual session bean associated with the application. This session bean receives all communication from the client and delegates messages to application-specific code. By extending Simple Quick GO's session bean interface, the developer can build any type of server-side functionality. The server platform is also responsible for securing the communication. (See Security section.)

In a further practice of the invention, the application server maintains a set of JSP utilities and tag libraries to simplify the creation of SQML-based responses to the device. These utilities help parse messages from the device and construct the correct responses.

The application server provides an extensive set of services to aid in the provisioning of applications. The server can maintain a registration of known programs and known terminals, and can field provisioning requests from devices that wish to load a new program. The server then will help choose and merge the stylesheets that apply to the particular device and create the provisioned application object. In some cases, media assets (such as sounds, images and animations) require additional translation, for instance an image may need to be resized on the server before it is sent to the device.

Other Options

The SimpleOS network communication model can also work without the J2EE server component. Since the message transfer format is entirely XML-based, any programming language capable of receiving XML over the network and emitting XML in response should be able to communicate with a SimpleOS application.

Updating Application Segments and Resources

SimpleOS applications can be dynamically updated. Portions of the application may be added, removed, or replaced. However, changes are made in the application object, so they do not become apparent until a new process is activated.

The mechanism for modifying an application involves sending a particular type of SQML document to the device, known as a fragment. A fragment contains portions of the application that will be changed. If the element structure defined by the fragment is new, it is added to the application. If the element structure already exists, the old element structure is first deleted and then replaced with the new structure supplied in the fragment. If the element structure in the fragment is empty, then the corresponding element structure is removed from the application.

A fragment may consist of one or more sq-class definitions, and/or a style sheet. Individual items within classes or style sheets cannot be updated. Developers should be careful not to create fragments that damage the integrity of the application's structure. While some checks are made (for example, not allowing referenced superclasses to be deleted), complete verification by SimpleOS is impractical.

Table 51 shows a fragment that would add or update a simple class in an existing application.

TABLE 51

Using Fragments to Update an Application

```
<sqml xmlns:sqml="http:/www.sqgo.com/sqml/sqml.dtd"
            appid="com.sqgo.simpleos.application.sample1"
            doctype="fragment">
    <sqml:sq-class classid="class1">
        <sqml:list name="mylist"/>
        <function name="init" type="initializer">
            <sqml:eval expr="mylist#addlast('abc')"/>
            <sqml:eval expr="mylist#addlast('it is easy as')"/>
            <sqml:eval expr="mylist#addlast('123')"/>
        </function>
    </sqml:sq-class>
</sqml>
```

Client/Server Example

Fragments can be used as the basis of an automatic style of communication between an application and a remote server. The following example demonstrates how the client device and the server might work in a fictitious example called NewsSubscribe. This application queries a user for a name and email address and then submits the data to a remote server. The application is very simple, and all of the communication in this example is automatic. Aside from the initial setup described below, no additional set-up is required.

The following is merely a hypothetical example, in which the grammar utilized does not necessarily correspond to that described above (thereby illustrating that various grammars can be utilized in accordance with the invention). Note also that the following example does not show the object-level grouping described above. The example does, however, demonstrate a method of using fragments to accomplish the desired result. The reader should also note the method of using objects to implement this function, as described above in the discussions regarding messaging. Other examples are, of course, possible and consistent with the invention. In this example, the following nodes describe the application (see Table 52):

TABLE 52

Nodes

| Node Name | Description | Attributes |
|---|---|---|
| news.gui | The GUI handler, set to use screen1 as the current screen. | currentScreen=screen1 |
| news.gui.screen1.fullName | The GUI label to receive the full name | type=textfield value="" prompt="Full Name:" |
| news.gui.screen1.email | The GUI label to receive the email address | type=textfield value="" prompt="Email Address:" |
| news.gui.screen1.submit | The GUI button to submit the data | type=submit prompt="Submit" |
| news.mdesc.submitDesc | The message descriptor | Source=news.gui.screen1.submit Type=onActivate Target=http://myserver.com/sys Context=news.gui.screen1 |
| news.gui.screen2.thankYou | A GUI label on a "thank you" screen | |

The interaction could occur as follows:

1) The user downloads or starts up the Subscribe SimpleOS application;

2) The application loads and presents a screen to the user with a prompt for a full name and email address;

3) The user enters this information and presses "submit";

4) The system consults news.mdesc.submitDesc and forms a new message object:

```
<sqml>
<message id="news.temp1.message" caller=" news.mdesc.submitDesc">
    <context path="news.gui">
        <screen id="screen1">
            <textfield id="fullName" value="Jeremy Gilbert"/>
            <textfield id="email" value="jeremy@sqgo.com"/>
            <button id="submit"/>
        </screen>
    </context>
</message>
</sqml>
```

5) The system checks for an existing connection to http://myserver.com/sys. Finding none, it establishes an HTTP connection to the server and provides an handshake message to the server such as: <sqml><network-control seq=0 type="http" action="begin" terminalid="A23BE3FEC23223A"/></sqml>;

6) The remote server sets up a new session handler for the "news" application, and returns the following message: <sqml><network-control seq=1 type="http" action="begin-connect" terminalid="A23BE3FEC23223A" sessionid="B44023957FA992E4EE" application="news"/></sqml>;

7) Now the application sends the message object it formed earlier, with network control information.

```
<sqml>
    <network-control seq=2 type="http" action="handleEvent"
        terminalid="A23BE3FEC23223A"
        sessionid="B44023957FA992E4EE"
        application="news" />
    <message id="news.temp1.message" caller=" news.mdesc.submitDesc">
        <context path="news.gui">
            <screen id="screen1">
                <textfield id="fullName"
                    value="Jeremy Gilbert"/>
                <textfield id="email" value="jeremy@sqgo.com"/>
                <button id="submit"/>
            </screen>
        </context>
    </message>
</sqml>
```

8) The server passes a parsed XML DOM object to the remote NewsSubscribe code. This code adds the name and email address into a database. At this point, the server can send any update back to the device it wants. It could download additional parts of the application if it wanted to, reconfigure the user interface in any manner, etc. However, in this case, we just want to change the current screen attribute from screen1 (the submit screen) to screen2 (the thank you screen.) The server will create a result tree that performs this modification. The entire network message will look like this. The boldface item shows the desired change.

```
<sqml>
    <network-control seq=3 type="http" action="update"
        terminalid="A23BE3FEC23223A"
        sessionid="B44023957FA992E4EE"
        application="news" />
    <application id="news">
        <gui id="gui" currentScreen="screen2"/>
    </application>
</sqml>
```

The client receives this clipped tree and folds it back into the superstructure. The screen changes from screen1 to screen2 and the user is shown a "thank you" message.

It will be understood that the implementer is free to develop his or her own methods of securely transmitting clipped tree fragments back and forth across the network. In other network update models discussed herein, instead of exchanging fragments, the two communications partners could exchange entire objects stored within the superstructure. In this case, sending an object from one to another instantiates that object in the receiving superstructure, replacing any previous definition of that object.

VIII: Security

The following sections survey various technology aspects of SimpleOS including security, stylesheets, and embedded systems.

Security Features

Runtime Security

Several fundamental design aspects of the SimpleOS container ensure that it is inherently resistant to almost all of the runtime security issues that plague modem operating systems such as WINDOWS. There are two prongs to this advantageous design—the enclosed functionality and the presence of an intermediate form. These two advantages give SimpleOS a level of security similar to that of other enclosed languages like pure HTML, JAVA applets and FLASH.

Enclosed Environment

Enclosed execution models, such as SimpleOS, HTML, Flash, and JAVA applets, are inherently secure because they allow the programmer to do almost nothing outside of a well-defined container. In HTML without JAVASCRIPT, the only ability is to present a page and cause images to be downloaded. JAVA applets cannot access the local file system, interact with other processes or systems, issue spurious network connections or open unwanted windows. Although there are exceptions in the case of FLASH, even with this technology it is relatively true that the only capabilities allowed are restricted network communication and the guarded ability to make animations and multimedia presentations.

SimpleOS follows in the tradition of programming languages that discard general features in return for greater security. Within a SimpleOS application, the only manipulations possible are those within the application's superstructure. This is confined to managing a user interface with pre-defined controls, playing sounds and animations and performing certain authorized telephony and network communication operations. Tree manipulation is the extent of the ability of a SimpleOS application. An analogy would be a web page that contains nothing but HTML and the ability to only change the HTML. In this scenario, it is virtually impossible to perform a bad operation. The worse that could happen in a situation like this is that the application runs away in an infinite loop. The worst that can happen in a situation like this is that the application runs away in an infinite loop.

Unlike a general-purpose language such as VISUAL BASIC, C, C++ or J2SE, there simply isn't the means to express inside the language any operation outside of its specification. If SimpleOS does not explicitly provide for an operation to occur, it is impossible for the application to find a way to do it since the application relies entirely on the superstructure and SimpleOS to perform all of its work. This is not true in C or C++, which can run code directly on the processor and access thousands of API toolkits that can perform various operations. Because languages like C/C++ and VISUAL BASIC operate in environments that are meant to give the programmer general-purpose functionality, it is very easy to find holes in the tens of thousands of features inside the environment. SimpleOS, not being a general-purpose environment, does not suffer from the proliferation of toolkits and their concomitant security risks. Incidentally, SimpleOS does allow Turing-equivalent general computation—it simply restricts access to the environment from the components capable of computation.

C and C++ also suffer from the difficulty of being processor native, which means that they have full access to main memory, registers and other aspects of a system close to the hardware. Operating systems must specifically cordon off C or C++ application from unwanted activity, and many security holes appear because the cordon is not as tight as it should be. These languages must be confined by a negative security model that relies on restraining activities. Interpreted environments such as SimpleOS rely on a positive security model where only the operations that have been considered by the designer are allowed inside the language.

C/C++ Application toolkits present a high security risk because there are so many of them and they frequently pass data from caller to caller in a low-level binary format. SimpleOS does not provide any API toolkits at all, and does not suffer from this risk in the same way as a binary runtime environment.

SimpleOS also provides a security advantage in that it does not allow any low-level processor operations to occur. The only direct work possible from within a SimpleOS application is the rearrangement of trees.

Intermediate Form

The second major security aspect of the SimpleOS design lies within its intermediate application data structures. In SimpleOS, there is no direct correlation between program code and anything from the host environment. This provides a level of security that would normally be found only in static languages such as non-JAVASCRIPT enabled HTML. SimpleOS is unique among almost any other dynamic language in the strength of this separation.

Even in a language as well protected as JAVA, emulated virtual machine instructions are eventually translated to corresponding native operations. This translation exposes a potential risk that bad data generated within the container might be copied without protection into systems outside of the container. This can expose weakness in the API toolkits of the host environment to malicious code within a container. This type of problem is difficult to contain since the translation typically occurs in a wide variety of places within the emulator.

The key to SimpleOS's data separation between program code and guarded API calls lies in the structure of the SimpleOS execution model. Within SimpleOS, an application's only possible operations are tree transformations. The immediate result of any executed code within SimpleOS is never more than a modification to the application's superstructure. Only after the code has completed does SimpleOS engage in a synchronization task, where changes made are carefully extracted and API calls issued the host operating system. During this pass, SimpleOS has the complete freedom to examine and restrict the application before the host operating system is ever invoked to perform an update. This extra pass provides a unique security advantage over other languages.

Once again, a SimpleOS application only has control over an intermediate form, and cannot touch the underlying interface that allows communication with the user and other devices. SimpleOS always makes the actual manipulations within the host operating system on behalf of the SimpleOS application.

The intermediate form found between the application's code and the host operating system is entirely based on an XML Document Object Model. There is very little possibility for rogue data to be added to this model since all data types are explicitly marked. A united set of programming interfaces governs the extrication of data during the rendering process. Because all arguments are extracted from a single common model, it is easy to provide a central clearinghouse within the implementation to check data before it is used in the platform-native sections of the SimpleOS code. HTML also benefits from this strong separation, and that is why 100% pure HTML rarely has been known to provide a security fault. When such faults occur, they are easy to identify and repair. Just like SimpleOS, HTML never produces an immediate list of instructions in a host environment when it is loaded. Instead, an intermediate form is produced first. This intermediate form is examined and used by a rendering engine to produce a final form. Any implementation of software is subject to development defects that could expose a security weakness. An effective approach for dealing with security issues is to address them by design, and the SimpleOS design methodology uses the very best defenses against programmatic error. By providing functionality containment and an intermediate form, SimpleOS is one of the most secure programming environments.

Incorporation of Additional Security Features

The present invention also allows for a number of additional features to implement security, which are useful, among other applications, in addressing the security concerns of an operating system run on wireless devices. There are several classes of security threats and means to address them, as shown in Table 53.

TABLE 53

Summary of Security Threats and Responses

| Threat Type | Description | Security Approach |
|---|---|---|
| Interception of sensitive data | Intruder obtains sensitive information such as credit cards, personal information, accounts numbers, etc. | If the communication medium used does not support encryption, SimpleOS will use a security library to provide RSA encryption. |
| Man-in-the-middle Attack | Intruder causes a client's information be redirected through a compromised system that attempts to modify or insert unwanted code over the network. | Messages to the device must be signed with an MD5 digest that is verified before the content is used. |

TABLE 53-continued

| Summary of Security Threats and Responses | | |
|---|---|---|
| Threat Type | Description | Security Approach |
| Buffer overflow attempts to overwrite sections of SimpleOS code | Intruder runs code that uses string arrays that exceed an internal buffer, causing code sections to be overwritten. | Not possible (or at least, extremely unlikely) for JAVA based architectures. In non-JAVA architecture, the only buffer over-runs possible are in XML data, so a central place to verify buffer checking can be found in the code. This will reduce the risk of buffer-overflows. |
| Fatal programmatic errors | Intruder runs code that attempts to divide by zero or perform some other functional impossibility. | Tight checking of the expression evaluation code. Using existing, well-reviewed code for the expression language (for instance, longstanding commercial implementations of XPATH) will reduce risk considerably. |
| Infinite Loops, Stack Overflows | Intruder runs code with looping constructs that do not terminate or runs an unbounded recursive function. | Limited ability within expression language to create unbounded loops. Because all data structures are part of an XML parse tree, an excessive number of repetitions of data structures will cause application errors within the XML implementation. |
| Unwanted device interaction | Intruder runs devices that dial unwanted phone numbers, erase address books, etc. | Certificate model will prevent access to anything outside SimpleOS without an authorized certificate. |
| Unexpected API interaction | Intruder writes code to manipulate the API in such a way that SimpleOS crashes or causes unwanted behavior | Extremely unlikely because the only action possible by the programmer is to modify a tree. (See discussion of intermediate form below.) |
| Unwanted native code plug-ins | Intruder writes a native code plug in that performs unwanted behavior. | A certificate system will protect any dynamically linked native code plug-ins. |
| Viruses | Intruder writes self-replicating code. | A certificate will be needed to access other applications besides the one provisioned on the device. Consequently, the ability for one program to infect another is impossible unless a rogue certificate is acquired. In addition, since SimpleOS will always prompt the user to allow device-to-device communication, the spread from one device to another is unlikely. |
| Rogue Certificate | Intruder illegally acquires a code signing certificate and uses it to distribute code that performs unwanted behavior | Eventually a certificate revocation system can be implemented within SimpleOS to provide an additional level of verification for a certificate |
| Trojan Horses | Intruder writes an application that appears to perform one task, but is secretly performing another. | Applications are limited in the activities they can perform outside of the SimpleOS container, but if a mobile operator wants to be particularly careful, they can prevent SimpleOS from installing any non-authorized programs. |
| "Spyware" | An application sends back private data to a central server without the user's knowledge. | If desired, network communication can be configured to require a special authorization certificate. |

Hash Signing

In one practice of the invention, to prevent security attacks where a rogue server provides unwanted data to an application, all network communication can be secured with a cryptographic MD5 hash. This hash is based on a shared private key that is exchanged when the application is first provisioned. All messages exchanged between the device and the server must be signed by this hash, and any message exchanged between applications must contain the application's hash.

MD5 is known as a cryptographic digest. When the algorithm is run over a message, the function produces a short signature. Even the smallest difference between two nearly identical messages will cause a vast difference in the value of the digest. The difference is impossible to predict in advance without resorting to lengthy combinatorial code-breaking, so the hash signature does an excellent job of assuring that a message contains its original content.

At application provisioning time, the server and the client set up a private key shared between them consisting of several hundred bytes of random numbers. Before a message is exchanged, the sender computes the MD5 hash of the concatenation of this key and the message. It sends the resulting hash code and the message together. The receiver adds the private key to the received message and checks to ensure that the code is the same. In this manner, the MD5 signature provides a reasonable guarantee that the message has not been tampered with and that it came from a source that knows the private key.

Encryption

Most transmission protocols used by wireless carriers maintain some sort of pre-existing encryption mechanism. Because SimpleOS will use the communication means available to it from the host operating system, this will cover protecting the data from unwanted interception.

In cases where the host does not provide security, Simple Quick GO has investigated several very lightweight implementations of SSL (Secure Socket's Layer) available in C and JAVA. Such an implementation will be used to secure data transmission.

Certificates

In one practice of the invention, depending on the needs of the mobile operator who deploys SimpleOS, applications can be restricted in their operation unless they were provisioned with a cryptographic certificate. In such a scenario, each application provisioning server would be required to provide a class-3 digital certificate, signed by Simple Quick GO in order to secure and encrypt the transfer of an application to a device. Furthermore, the application may be limited to certain functions based on the type of certificate they are provisioned with.

Functions that can be optionally limited for a particular install base include:

- Network access
- Access to phone and telephony features such as the address book and initiating a phone call
- Access to other applications deployed in SimpleOS
- Ability to use local area network communication (BlueTooth, 802.11B)
- Ability to load and use dynamic code
- Ability to install and run an application
- The ability to do any of the previous without explicit user confirmation Certificate technology has been used successfully by JAVA applets and MICROSOFT ACTIVEX technologies to limit the ability of unwanted code to run on a device. A detailed description of digital certificate technology is beyond the scope of this document, but a brief description follows. A central authority responsible for an installed based of SimpleOS deployments maintains a certificate server and an issuing office. This central authority (CA) might be a carrier, mobile operator, device manufacturer or Simple Quick GO itself. Developers approach the CA asking for a particular certificate (such as a certificate to perform telephony.) The CA will issue this certificate to the developing organization, which uses the certificate to cryptographically sign each application. This signature is recognized by the SimpleOS container and verified before performing a restricted activity.

To promote the widespread expansion of the SimpleOS container, an overly restrictive policy may not be recommended. Only the most dangerous operations such as installing an application or adding dynamic code might require certificates. It is expected that mildly risky activities would require a simple confirmation from the user before they are performed. In the case of an action requiring a certificate, user confirmation will not be required.

Certificates are used to maintain a chain of responsibility. If code that has a valid certificate is found to contain a virus or other dangerous code, the owner of that certificate can be traced. Since the certificates are hard to forge, it allows an operator to have cryptographic certainty that only authorized developers are performing dangerous operations on a device. Applications can sometimes be provisioned in a peer-to-peer arrangement instead of from the server. In this case, the certificate is transferred along with the application inside the resource stream that provisions the application.

IX. Stylesheets

While stylesheets are not necessary to a basic superstructure-based application environment, their use is of great utility to producing a highly functional implementation of the invention. Accordingly, one embodiment of SimpleOS employs a style-sheet mechanism for the definition of colors, fonts and other presentation attributes of user interface elements. This allows the presentation of the GUI to be separate from the description of the GUI components. This same approach has been successfully used in other areas of web technology, notably HTML.

A stylesheet groups sets of formatting properties such as fonts, colors and layout into a style classes. Each element in the GUI is associated with a style class, which provides that element with its presentation attributes. (A default style class is associated with any GUI element that does not have an explicit class.)

The example of Table 54 shows a very basic SQML application that uses a default stylesheet to establish parameters for a set of frame buttons. Each frame button will inherit from the class since it is marked "default".

TABLE 54

Simple Stylesheet Example

```
<?xml version="1.0" encoding="UTF-8"?>
<!DOCTYPE sqml SYSTEM "sqml.dtd">
<sqml appid="com.sqgo.simpleos.application.launcher">
<sq-style-sheet>
```

TABLE 54-continued

Simple Stylesheet Example

```
<class default="true">
<palette>
<colordef name="blue" rgb="#4444ff"/>
</palette>
<bgcolor color="blue"/>
</class>
</sq-style-sheet>
...
<sq-card id="card01">
<top label="TOP" id="top"/>
<left label="LEFT" id="left"/>
<right label="RIGHT" id="right"/>
<bottom label="BOTTOM" id="bottom"/>
<frame id="frame01">
</frame>
</sq-card>
...
</sqml>
```

SimpleOS stylesheet classes exist in an inheritance hierarchy, which allows one class to extend another. This allows a developer to quickly modify the look and feel of an application. For instance, the developer could define a base stylesheet for a set of applications, and create sub-classes of that stylesheet for each particular application. This would allow an attribute, say the frame color, for all of the applications to be automatically the same. If the developer wishes to change the color of a particular application, he can modify the sub-class of that application's stylesheet and still maintain other properties mapped from a master sheet. The same pattern applies to screens within an application or controls on a screen.

The mapping of each component to its ultimate style is actually performed at provisioning time. The provisioning server creates a master map of all of the styles in use by an application and emits a set of condensed, non-inheriting style classes as part of the application. This expansion conserves the amount of processing that must be done by the deployed application on a recurring basis. This optimization is only effective if the application's code remains constant through the life of the application. Since our model does allow additional application code to be sent during the evolution of the process, the SimpleOS container will also contain logic to update stylesheets that use inheritance.

Table 55 shows an example of a more complex stylesheet.

TABLE 55

A Complex Stylesheet

```
<sqml:stylesheet>
<sqml:class id="base">
    <sqml:palette>
        <sqml:colordef name="white" rgb="#ffff00"/>
        <sqml:colordef name="black" rgb="#ffff00"/>
        <sqml:colordef name="red" rgb="#cc0000"/>
        <sqml:colordef name="blue" rgb="#4444ff"/>
        <sqml:colordef name="yellow" rgb="#ffff00"/>
    </sqml:palette>
</sqml:class>
<sqml:class super="base" default="true">
    <sqml:bgcolor color="white"/>
    <sqml:font typeface="Helvetica" typesize="12" typecolor="black"/>
</sqml:class>
<sqml:class super="base" id="border">
    <sqml:bgcolor color="blue"/>
    <sqml:font typeface="Helvetica" typesize="16" typecolor="white" typestyle="bold" />
</sqml:class>
</sqml:stylesheet>
```

As noted above, stylesheets provide the mechanism for managing screen layouts on different devices. One of the properties that can be contained in a style is an area indicator that will give the exact width, height and location information for a particular GUI element.

X. Additional Features

Embedded Applications

SimpleOS is designed to allow a fully enabled implementation of the container to communicate with embedded devices. For this purpose, embedded devices may include TV set top boxes, vending machines, home appliances, car systems and other portal devices. There are a variety of adaptations to the system that apply to embedded communication that are discussed in the sections below.

Simple Embedded Protocols

Some embedded situations call for sending and receiving well-defined codes between the device and a remote embedded system. These codes may be transmitted using infrared, radio frequencies or a serial connection. Typically this type of communication uses a fixed vocabulary of signals. SimpleOS can accommodate this type of interaction in several ways. One option is to provide a toolkit accessible using a limited native interface from within SQScript. In this situation, Simple Quick GO, or some other author, would provide a SQML interface to the communication pathway required. Incoming messages to the SimpleOS-enabled device would be directed to the message queue of the application and delivered via a message descriptor. Outgoing messages would be posted by filling in a tree-object as a request and posting it to the operating system using a primitive within SQScript. If the pathway ends up being very common to a class of users, Simple Quick GO may even add support for it directly into the operating system.

Code sets to control a remote device might include:

A vocabulary of IR codes to control a television;

A command set for an internal automotive control network;

Radio frequency mappings for a remote-controlled car; and

Diagnostic codes available from the OBC of a car engine

Network Protocols

In more advanced embedded applications, the two devices in question (the SimpleOS-enabled device and the remote device) form a network based on some existing protocol. These scenarios might include PPP over IR, TCP/IP over WiFi, or TCP/IP over BLUETOOTH. In the case that the communication path is packet-based, a native plug-in may be created just as described in the previous section. In this case, the data packets that are sent and received are channeled to an application using code added into the operating system.

In the case where a streaming protocol is available, the approach is much less complex. In this case, SimpleOS can communicate directly with the device using HTTP or HTTPS. This has proven to be very effective in embedded devices since a TCP/IP stack and web server can usually be implemented in less than 4K of program code. In this situation, messages can be passed to the web server using the same network communication model used for server-side communication. If the embedded device can stream enough data, it is even possible that it can provision a new application to SimpleOS. In this case, the application would have to have been completely pre-provisioned for the specific device type, and the end application bundle signed and certified. The application would simply appear to the embedded system as a stream that can be shipped over to SimpleOS.

Vending Machine Example

Using a simple wireless network and a streaming protocol could allow for some very powerful results. Imagine a vending machine that allows a cell phone to connect to it to receive a menu and verify payment. The exchange may operate as follows:

1) The user approaches the vending machine and enters the wireless network managed by the vending machine's computer
2) During the polling of the new network, the launcher application running inside SimpleOS discovers that there is a provisioning source available on the local network. A message is displayed to the user: "You are near a vending machine that can be controlled from your cell phone. Would you like to connect?"
3) SimpleOS sends a message to the vending machine with its device characteristics. The vending machine already has a set of pre-provisioned, signed applications available to control it, and it checks to see if the cell phones device type is listed among the pre-provisioned images it has.
    a. If the vending machine does have the correct image, it streams it over to the cell-phone and provisions the controller application
    b. If the vending machine does not have the correct image, it sends a URL to a provisioning server to the launcher application. The launcher application can then download the correct software.
4) The launcher application, having provisioned a new application, asks the user: "You have just provisioned a new application. Would you like to run it now?"
5) The application loads, and presents its user interface.
6) The user chooses an action such as "vend" inside the application
7) The target of the message descriptor includes a variable that causes the message to be marshaled as SQML and deployed to the vending machine over the wireless network.
8) A simple HTTP engine on the vending machine parses apart the message and performs the action.

SimpleOS to SimpleOS

Two SimpleOS devices can easily connect to each other and accomplish a variety of communication models. The simplest is when one SimpleOS instance connects to another for peer-to-peer provisioning. If the two devices have different device type signatures, this may require the receiving instance to connect to a remote location to receive a device-customized version of the application. Otherwise, the provisioning will work securely because the certificate has been embedded in the resource stream, guaranteeing to the receiver that the application has not been tampered with.

Two SimpleOS instances capable of exchanging messages can place items in each other's queues. This is made possible by the fact that all application event messages are expressible as SQML. If an application running on one device knows the address of another device, it can formulate a SQML message using the standard remote messaging model and deliver that message into the queue of the receiving application. This model allows for several compelling uses of the technology. For instance, a TV set might itself run an instance of SimpleOS that has linked into it commands to control the low level systems inside the TV. Any other SimpleOS device that can connect to the SimpleOS system inside the TV can post messages to the TV without any additional development work. The two operating systems speak the same language; so one of them can serve as the adapter to a particular piece of hardware on behalf of another device.

Benefits and Features

The SimpleOS design presents a radically new way of organizing a computer program, coupled with an innovative graphical user interface design. Applications are freed from the need to understand how to manipulate their outside environment. Instead, they update organized descriptions of their current state. The operating system does the work to determine the specifics of how to implement the request. By doing the heavy lifting for user interface and application logic, and creating a single development language, the SimpleOS model offers easier development of widely deployable applications. Also, the powerful network features within SimpleOS greatly reduce the amount of work to make an application network aware.

All of these factors become particularly important when considering the limited abilities of most mobile operating systems such as J2ME and BREW, and the fact that code written in one environment is almost useless on the other.

Streaming

Given the superstructure-based application environment of the invention, a system could be readily implemented (see FIG. 2) that would "stream" updates to the superstructure as a broadcast to multiple SimpleOS devices at once. Such a system could utilize either (1) a means of ensuring that each device was in a consistent, known state at the time of the transmission and that the transmission remains whole and complete; or (2) transmitting complete segments (each all or nothing) of application update.

Figure 2:
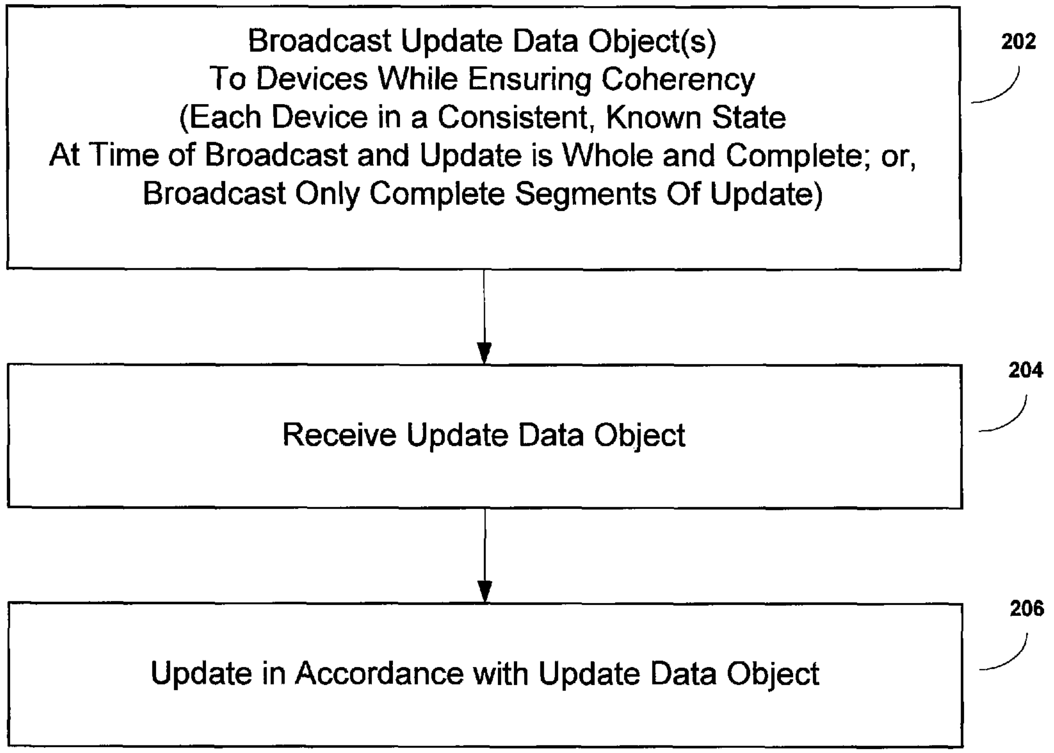

As shown in FIG. 2, a method in accord with this aspect of the invention includes broadcasting update data objects to devices, while ensuring coherency (202); receiving, in the devices, the update data object(s) (204) and updating in accordance with the update data object (206). Note that the updates could include updates to applications, data, or both.

Consider, for example, the example of a ballpark filled with baseball fans, many seeking dynamically updated information about scores from other games, or pitcher/hitter statistics (how has this pitcher fared against the next batter in the past?). Using the streaming update feature, updates could be broadcast to thousands of SimpleOS-running cellphones or other handheld devices at once, using either of the two noted techniques (either a synchronization/coherency-insuring technique, or the transmissions of all-or-nothing segments of application update, so that users could receive real-time updates of an application displaying hitter/pitcher statistics and other information. If particular fans do not have the necessary application on their handheld device, they could be queried as to whether they'd like to download the application (instantiation as a form of "update") and the methods described herein could be used to instantiate the application, and subsequent updates, into the handheld device.

These transmissions could use a data broadcasting method that could minimize the need for individual point-to-point data transfers between the update server and each client. The invention thus enables update streaming without the requirement of sending a multiplicity of different messages on a per-client basis for each update.

In each case, the update would be incorporated into the superstructure using the superstructure modification/update techniques described in the earlier sections of this document. Because of the superstructure-based application environment of the invention, the updates could be efficiently transmitted and processed across a wide range of different handheld devices within the stadium, regardless of the native operating system of the various processors involved.

Streaming in this manner provides a number of advantages, including:

(1) less per-client state is required on the information server;

(2) the technique can exploit the network efficiencies of known or new multicast/broadcast technologies, and reduce network traffic;

(3) it reduces the need for retransmission of failed packets (the next broadcast would overwrite them);

(4) it allows device transmitters to remain in "receive only" mode instead of having to send back confirmation; and (5) there is no need to maintain records of precisely which devices are still receiving information, so devices are more free to leave and re-join the network without interruption to the communication protocol or the user experience.

Equalization

Mobile applications are typically divided into three areas: User Interface Code: The look, feel and presentation of the application, Application Logic: The specific behaviors or features of the application, Communication Logic: The parts of the application that communicate to the outside world to receive or send information. Depending on the platform, typical application development can focus greater than 80% of the attention on user interface logic and communication. Many mobile operating environments are particularly constricted, and require highly specialized programmers to work very carefully to create easy-to-use interfaces and manage communication. This is unfortunate since most of the core aspect of the application is not present in either of these areas. Worse, the work done to solve these problems on one platform can almost never be reused when porting to a different platform. Together, these issues increase testing and development time (and therefore, development cost). Given that the market for wireless applications is still in its infancy, this acts as a huge disincentive for developers.

Figure 20:
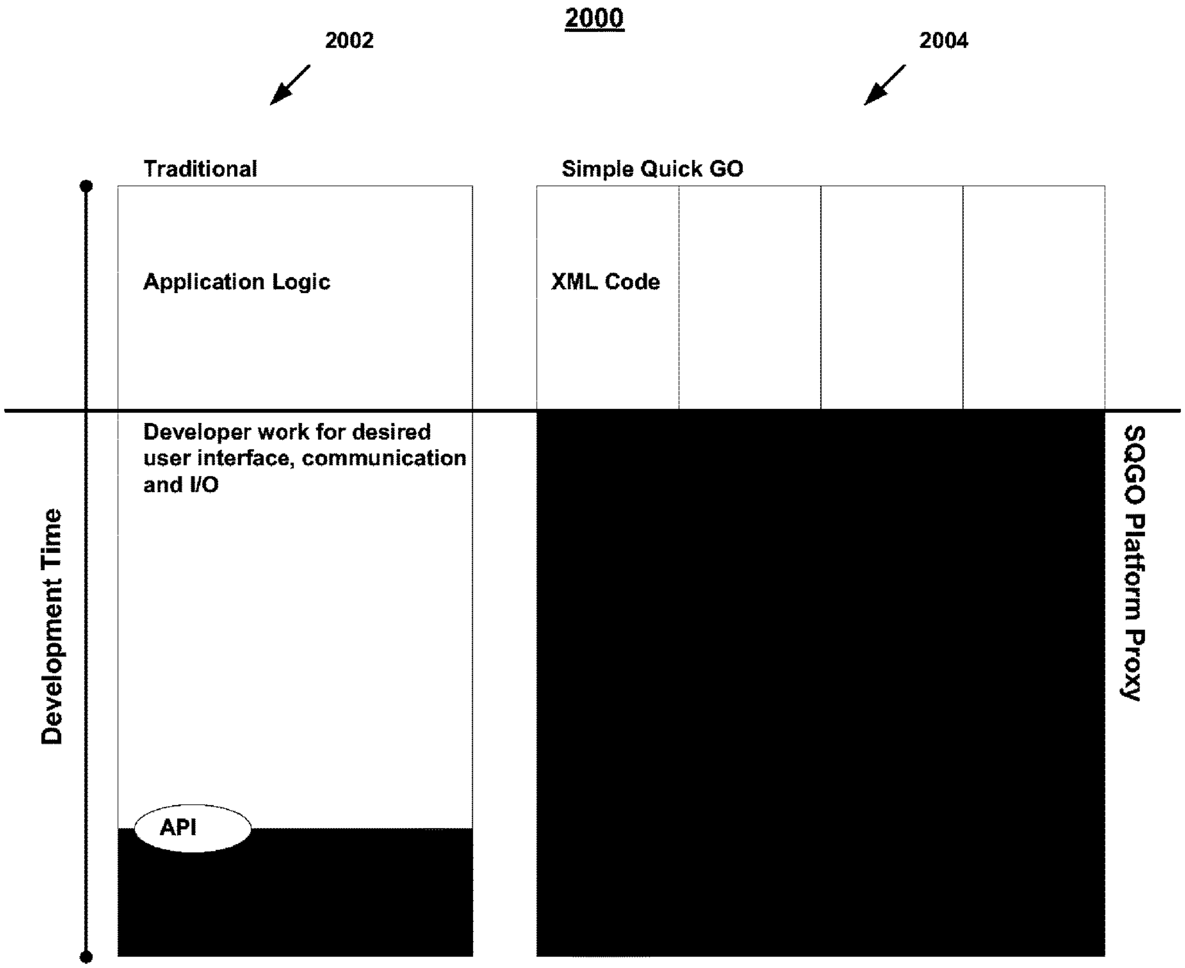
FIG. 20 illustrates metaphors in client computing.

The left-hand side of FIG. 20 shows the traditional application model (2002) that would commonly be applied to a mobile platform such as QUALCOMM'S BREW (Binary Runtime Environment for Wireless.). BREW supports a very small subset of features for communication, data management and graphical presentation. These features are presented to the application programmer through a programming interface that requires procedure calls to set up and maintain hardware resources. The application developer typically must perform additional work to tailor the raw capabilities granted by the host environment into the specific look and feel, communications model and data representation required for the application. On top of this initial effort, the programmer adds the specific logic or functionality that the application requires. Most existing platforms for application development generally follow this model.

The work done to shape an application's services on a particular software environment typically cannot be re-used between environments due to dissimilarities between different platforms. While the top-level application logic can occasionally be reused between toolsets, this only applies to platforms based on the same language such as C or JAVA.

In contrast, a SimpleOS product implemented in accordance with the invention (2004) sits on top of each target operating system providing the user interface, communication and data organization features. SimpleOS, controlled entirely by an application's XML structure, insulates the developer from the specific details of the platform.

This model extends well-beyond the "write-once, run anywhere" model of JAVA. Because programs can be described in a lightweight form of XML that can run on a variety of hosts, SimpleOS makes it easy to deploy applications anywhere.

Networking Architectures

SimpleOS provides the ability for server-side processing to occur just as easily as it can on the device. The cornerstone of this feature is that the networking protocol can ship over arbitrary sections of the application's superstructure over the network by converting it into SQML. In essence, SimpleOS is sending application snippets instead of documents or data when it communicates with the server.

Figure 21:
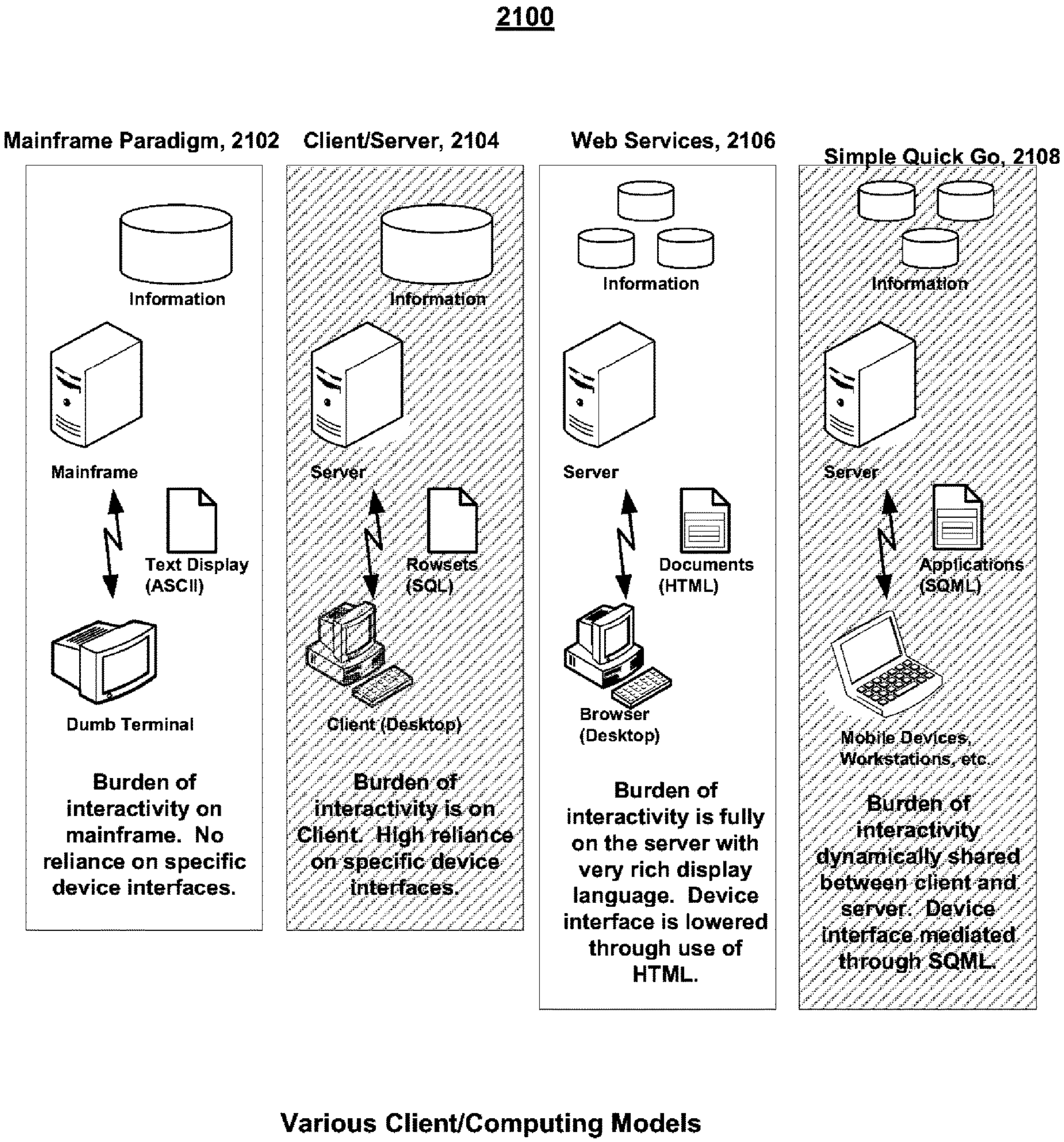
FIG. 21 depicts examples of various client/computing models.

This networking paradigm is the natural evolution of user interface-to-server architectures. Originally, mainframe-computing systems relied on a text-based user interface and communicated through specific screen elements. Client/Server architectures supported greater user interface logic local to the device, but were still constrained by communication and desktop-specific programming rules. The web services model uses only one client browser, but all application logic must reside on the remote server. SimpleOS provides for presentation and application logic to transparently reside on either the client or server, providing a leap forward in application design. See 2108 of FIG. 21, contrasted with 2102, 2104, and 2106.

Table 56 illustrates the differences in communication and data paradigms.

TABLE 56

Comparison of Remote Computing Paradigms

| Architecture | Mainframe | Client/Server | WWW (including WAP) | Simple Quick Go |
|---|---|---|---|---|
| Central Communication Paradigm | Text Terminals | Row sets and Actions | Documents | Applications |
| Transport Atoms | ASCII | SQL | HTML | SQML |
| Reliance on communication | Extreme - without network, client is dead | High - Client is usually useless without server | High-Medium - Browser can view documents offline, but interactivity is impossible | Low-Medium - Applications have the option to spread interactivity between client and server, and applications can be standalone |
| Device Specific Programming | None. Programmers just display ASCII | Clients must be written to native platforms | HTML/WML is general, but functional versatility is limited and tied to the server. | None. SQML offers maximum functional versatility and client-device independence. |
| Location of application logic | Server | Server | Server | Client and Server in any proportion |
| Location of data | Server | Server | Server | Client or Server as needed |
| Description of user interface handling | Server | Server | Server | Client or Server as needed |

Yet another powerful advantage of the SimpleOS network model is that an application's code can be updated on the fly if so desired by the carrier or the developer.

Platform Comparisons

The following sections compare SimpleOS to several existing technologies to help illustrate the differences in the technology. SimpleOS vs. JAVA SimpleOS and JAVA share many common goals. Both operating systems are designed to run as virtual containers over host operating systems like WINDOWS or LINUX. Both operating systems allow for write-once, run-anywhere. Both provide a consistent platform-independent abstraction between their running applications and the native operating system. Both are also highly network-aware, object-oriented and have support for XML.

The major difference between SimpleOS and JAVA is that JAVA does not support the novel execution model of SimpleOS described herein, which frees the programmer from concerns about how a particular description of an application should be implemented, and allows a purely descriptive development model. In SimpleOS, the application need only describe changes. In contrast, within JAVA, the application must also perform the changes. XML support within SimpleOS is automatic—any running application can communicate in XML as easily as it communicates with itself. In contrast, JAVA requires marshalling and un-marshalling of XML data into private data structures. SimpleOS supports an intermediate form of application state that provides an additional level of security beyond the insulation provided by the JavaVM. In addition, SimpleOS's network model allows for a seamless sharing of applications and data between devices, because superstructure may be accessed and transferred. In a JAVA environment, this same effect would require explicit transfers of data and the programmer would need to identify when those transfers would be required, and write code specifically to handle them. It is expected that SimpleOS code sizes would much smaller, because the application need not be concerned with support for a graphical user interface library. Also, SimpleOS is designed to embed the entirety of the state assumptions between the application and the environment into the superstructure. The same is not true for JAVA, which stores extensive private data within its class libraries, and even within the device-native portion of the virtual machine. A frozen JAVA program can not consistently be restarted outside of its JAVA container. The introduction sections above, which describe other properties of the invention, discuss other differences between opcode-based execution environments and SimpleOS.

SimpleOS vs. HTML

It may initially appear that HTML and SimpleOS have nothing in common, but the truth is that they share common roots. Both of them rely on a complex data structure that is entirely descriptive; SimpleOS has the superstructure, and HTML has the DOM. However, HTML describes documents, where as SimpleOS's SQML describes applications. A SimpleOS application can be completely client-side and does need to communicate with a remote server in order to be interactive.

At a technology level, both HTML and SimpleOS rely on an intermediate form to gain security, device-independence and stability. However, the HTML intermediate form is relatively fixed once it is downloaded into a web browser, whereas the SimpleOS intermediate form (the superstructure) may change freely over time and is designed to allow such changes to occur as a natural part of its execution. The entire operating "contract" and shared state assumptions between a SBAE engine and its application code is explicitly expressed within the grammar and content of the superstructure. SimpleOS does not consider the current running application to simply be an XML grammar changing over time after it has been seeded onto a browser, but instead, a rich, dynamic collection of state variables, structured data and program code that can easily be marshaled back into a self-consistent package and transferred to another device. Values within the superstructure may refer directly to expressions that evaluate within the context of the data being read. Additionally, the update mechanism used by SimpleOS works by directly delivering events into the superstructure itself. The superstructure is then free to modify itself in any way possible, as long as all modifications are captured within the superstructure itself. Finally, the design of SimpleOS allows for an application's events and data to be handled seamlessly over a network, in part because the activation of event handlers and the data required to process them has been generalized. These differences, and others, arise as a result of the inherently different design foundation between HTML/DHTML, (optimized for documents), and SimpleOS (optimized for applications).

SimpleOS vs. XSLT

SimpleOS and XSLT share some characteristics in that they both use template languages to effect change within trees. SimpleOS may even use XSLT in some of its early implementations because so much work has already been accomplished within XSLT in the area of tree manipulation. However, XSLT is almost entirely about producing final form grammars for incoming data. Typically an XSLT processor receives data in one form of XML, and then transforms that data into a different XML grammar. In SimpleOS, the transformation always occurs within the same grammar (SQML). The output of the grammar does not leave the system, but instead it gets reapplied to the original document. In this respect, SimpleOS's transformation model can be a closed loop where as XSLT is almost always an open loop.

It is to be understood that the invention described herein is amenable to a wide range of variations, modifications and alternative constructions and implementations. It should therefore also be understood that there is no intention to limit the invention to the specific implementations described above. On the contrary, the invention is intended to cover all modifications, alternative implementations and equivalents falling within the scope and spirit of the invention as defined by the claims appended below.

Glossary of Terms Used in this Document

API: Application programmer interface. The means for a traditional application to change its outside environment and communicates with the operating system.

Class: A template that can be used to instantiate objects.

Clipped Tree: A form of a result tree that minimally describes a set of changes to an existing tree.

Data Member: A variable declared directly underneath an object or class.

Data Tree: The "data" section of an object, which can be an arbitrary SQML tree.

Dynamic Section: A portion of the superstructure that has shared meaning between the operating system and the application. When external events occur, the operating system updates dynamic sections inside the superstructure and notifies the application. When the application wishes to change its environment, it updates the dynamic sections of the superstructure and the change is observed by the operating system.

Element Identifier Syntax for referring to an individual element within an object.

Event Handler Code that handles an event.

Event Target: The location of code that is executed when an event occurs.

Host Operating System: The native operating system of a device, such as WINDOWS, JAVA or BREW. SimpleOS is written as an application or library for a particular host operating system.

Initializer: A method within an object that is executed when the object is instantiated.

Interpolated Expressions: An expression found in a string that is evaluated and replaced with the value of the expression.

Object: An instantiated object containing a data tree, methods and data members.

Result Tree: The output of a transformation-based SimpleOS message handler, which represents all or part of a new tree that must be applied to the superstructure.

SimpleOS Container: An application that implements SimpleOS and provides a protected area for SimpleOS applications to run.

SimpleOS: A lightweight operating system from Simple Quick GO that runs on a variety of environments such as WINDOWS, BREW, J2ME, and J2SE, etc.

SQML: An XML-based markup language used to describe applications and portions of applications for SimpleOS.

SQScript: A language written in SQML that can be used to express the application logic of a SimpleOS executable. The language is optimized for tree operations against the process's superstructure.

Stylesheet: A mapping between a display "class" and a set of low-level attributes such as font, color and text size.

Superstructure: A central tree-like data structured maintained by each running SimpleOS process that contains all of the state, code, data and registrations for the entire application.

What is claimed is:

1. A computer program product requested and received from a provisioning system of a first party by a mobile computing device, the computer program product comprising a non-transitory computer-readable storage medium having computer-readable instructions stored thereon, the mobile computing device having a first party device-native operating system, at least one wireless network interface, a display device unit arranged to display a user interface, at least one user interface for displaying information and receiving at least one user selection, the computer program product comprising an application bundle, the application bundle comprising:

a. computer program code comprising at least one of compiled code or interpretable code, b. a computer code library comprising at least one component used to adapt an abstraction layer to said same device-native mobile operating system, c. a computer code library comprising at least one component used to receive data representative of device-native events from said same device-native mobile operating system, d. a computer code library comprising at least one component used to generate modification data objects that correspond to the received data representative of device-native events, e. a computer code library comprising at least one component used to process the generated modification data objects to generate a change list of one or more modification data objects, f. a computer code library comprising at least one component used to translate the change list of one or more modification data objects into instructions for execution by said same device-native mobile operating system, and g. a computer code library comprising at least one component used to send the instructions to said same device-native mobile operating system for execution;

which when executed by at least one processor of said mobile computing device causes the mobile computing device to perform operations comprising:

a. instantiating on the mobile device, an abstraction layer comprising:

i. the computer program code comprising at least one of compiled code or interpretable code, ii. the computer code library comprising the at least one component used to adapt the abstraction layer to said same device-native mobile operating system, iii. the computer code library comprising the at least one component used to receive data representative of device-native events from said same device-native mobile operating system, iv. the computer code library comprising the at least one component used to generate modification data objects that correspond to the received data representative of device-native events, v. the computer code library comprising the at least one component used to process the generated modification data objects to generate a change list comprising one or more modification data objects, vi. the computer code library comprising the at least one component used to translate the change list of one or more modification data objects into instructions for processing by said same device-native mobile operating system, and vii. the computer code library comprising the at least one component used to send the instructions from the abstraction layer to said same device-native mobile operating system;

b. receiving, by said same device-native mobile operating system, an application event;

c. receiving, by the abstraction layer from the device-native mobile operating system, data representative of the application event;

d. generating, by the abstraction layer, the at least one modification data object corresponding to the received data representative of the application event;

e. processing, by the abstraction layer, the at least one modification data object to generate a change list comprising one or more modification data objects;

f. translating, by the abstraction layer, the change list of one or more modification data objects into instructions for execution by said same device-native mobile operating system;

g. sending, the instructions for execution to said same device-native mobile operating system;

h. receiving, by said same device-native mobile operating system, the instructions for execution; and i. executing, by said same device-native mobile operating system, the instructions to update the application.

2. The computer program product of claim 1, wherein said modification data object comprises one or more of:

a. scripting language code, b. an event handler, c. a method, d. a function, e. a variable, f. a graphical user interface definition, g. a uniform resource locator, or h. a message descriptor.

3. The computer program product of claim 2, wherein the application bundle further comprises:

a. a scripting language engine, b. a computer code library comprising at least one component used to serialize data for communicating between at least one local or remote abstraction layer component, c. a computer code library comprising at least one component used to queue and dequeue data for processing by the abstraction layer, d. a computer code library comprising at least one component used for tree operations, and e. at least one user interface configuration file.

4. The computer program product of claim 3, wherein the instantiation of the abstraction layer step further includes:

a. the scripting language engine, b. the computer code library comprising the at least one component used to serialize data for communicating between at least one local or remote abstraction layer component, c. the computer code library comprising the at least one component used to queue and dequeue data for processing by the abstraction layer, d. the computer code library comprising the at least one component used for tree operations, the at least one component using the at least one user interface configuration file to populate at least one tree structure.

5. The computer program product of claim 4, wherein one or more components of the abstraction layer run on separate threads.

6. The computer program product of claim 4, wherein data sent by one abstraction layer component is serialized and said serialized data is sent to another abstraction layer component separate from the sending component.

7. The computer program product of claim 4, wherein said device network interface is used to communicate with a server remote from said mobile device and wherein said communications comprise receiving serialized data from at least one abstraction layer component instantiated and executed on said remote server.

8. The computer program product of claim 4, wherein one or more components of said abstraction layer are used to queue data and one or more components of said abstraction layer are used to dequeue data.

9. The computer program product of claim 4, wherein generating the change list of modification data objects further includes steps comprising:

a. applying, by the computer code library comprising at least one component used for tree operations, the modification data object to at least one node of the second tree structure;

b. evaluating, by the computer code library comprising at least one component used for tree operations, at least one node of the second tree structure against at least one node of the first tree structure to generate the change list of modification data objects.

10. The computer program product of claim 9, wherein the tree structures are organized as an inheritance hierarchy of class objects.

11. The computer program product of claim 9, wherein at least one node of said second tree structure is functionally mapped to at least one node of said first tree structure using unique identifiers.

12. The computer program product of claim 4, wherein at least one abstraction layer component uses the scripting language engine to interpret scripting language instructions.

13. The computer program product of claim 1, wherein the components of two or more computer code libraries comprising the application bundle are incorporated in the same computer code library.

14. The computer program product of claim 1, wherein the mobile computing device is a wireless mobile phone.

15. The computer program product of claim 1, wherein the generated modification data objects include device-native code.

16. A method for using a mobile software application on a mobile computing device, the mobile computing device comprising at least one wireless network interface, at least one computer processor for executing computer code stored on mobile device non-transitory computer readable storage, at least one display for displaying at least one user interface, and at least one user interface for displaying information and receiving at least one user selection, said computer code comprising a device-native mobile operating system of a first party and said mobile software application, the mobile software application comprising an application bundle comprising:

a. computer program code comprising at least one of compiled code or interpretable code, b. a computer code library comprising at least one component used to adapt an abstraction layer to said same device-native mobile operating system, c. a computer code library comprising at least one component used to receive data representative of device-native events from said same device-native mobile operating system, d. a computer code library comprising at least one component used to generate modification data objects that correspond to the received data representative of device-native events, e. a computer code library comprising at least one component used to process the generated modification data objects to generate a change list of one or more modification data objects, f. a computer code library comprising at least one component used to translate the change list of one or more modification data objects into instructions for execution by said same device-native mobile operating system, and g. a computer code library comprising at least one component used to send the instructions to said same device-native mobile operating system for execution;

the method comprising the operations of:

a. instantiating on the mobile device, an abstraction layer comprising:

i. the computer program code comprising at least one of compiled code or interpretable code, ii. the computer code library comprising the at least one component used to adapt the abstraction layer to said same device-native mobile operating system, iii. the computer code library comprising the at least one component used to receive data representative of device-native events from said same device-native mobile operating system, iv. the computer code library comprising the at least one component used to generate modification data objects that correspond to the received data representative of device-native events, v. the computer code library comprising the at least one component used to process modification data objects to generate a change list comprising one or more modification data objects, and the computer code library comprising the at least one component used to translate the change list of one or more modification data objects into instructions for processing by said same device-native mobile operating system, and vii. the computer code library comprising the at least one component used to send the instructions to said same device-native mobile operating system for execution;

b. receiving, by said same device-native mobile operating system, an application event;

c. receiving, by the abstraction layer from the device-native mobile operating system, data representative of the application event;

d. generating, by the abstraction layer, at least one modification data object corresponding to data representative of the application event;

e. processing, by the abstraction layer, the at least one modification data object, to generate a change list comprising one or more modification data objects;

f. translating, by the abstraction layer, the change list of one or more modification data objects into instructions for execution by said same device-native mobile operating system;

g. sending, the instructions for execution to said same device-native mobile operating system;

h. receiving, by said same device-native mobile operating system, the instructions for execution; and i. executing, by said same device-native mobile operating system, the instructions to update the application.

17. The method of claim 16, wherein said modification data object comprises one or more of:

a. scripting language code, b. an event handler, c. a method, d. a function, e. a variable, f. a graphical user interface definition, g. a uniform resource locator, or h. a message descriptor.

18. The method of claim 17, wherein the application bundle further comprises:

a. a scripting language engine, b. a computer code library comprising at least one component used to serialize data for communicating between at least one local or remote abstraction layer component, c. a computer code library comprising at least one component used to queue and dequeue data for processing by a abstraction layer, d. a computer code library comprising at least one component used for tree operations, and e. at least one user interface configuration file.

19. The method of claim 16, wherein the instantiation step further includes in the abstraction layer:

a. the scripting language engine, b. the computer code library comprising the at least one component used to serialize data for communicating between at least one local or remote abstraction layer component, c. the computer code library comprising the at least one component used to queue and dequeue data for processing by the abstraction layer, d. the computer code library comprising the at least one component used for tree operations, the at least one component using the at least one user interface configuration file to populate at least one tree structure.

20. The method of claim 19, wherein one or more components of the abstraction layer run on separate threads.

21. The method of claim 19, wherein data sent by one abstraction layer component is serialized and said serialized data is sent to another abstraction layer component separate from the sending component.

22. The method of claim 19, wherein said device network interface is used to communicate with a server remote from said mobile device and wherein said communications comprise receiving serialized data from at least one abstraction layer component instantiated and executed on said remote server.

23. The method of claim 19, wherein one or more components of said abstraction layer are used to queue data and one or more components of said abstraction layer are used to dequeue data.

24. The method of claim 19, wherein generating the change list of modification data objects further includes steps comprising:

a. applying, by the computer code library comprising at least one component used for tree operations, the modification data object to at least one node of the second tree structure;

b. evaluating, by the computer code library comprising at least one component used for tree operations, at least one node of the second tree structure against at least one node of the first tree structure to generate the change list of modification data objects.

25. The method of claim 24, wherein the tree structures are organized as an inheritance hierarchy of class objects.

26. The method of claim 24, wherein at least one node of said second tree structure is functionally mapped to at least one node of said first tree structure using unique identifiers.

27. The method of claim 19, wherein at least one abstraction layer component uses the scripting language engine to interpret scripting language instructions.

28. The method of claim 16, wherein the components of two or more computer code libraries comprising the application bundle are incorporated in the same computer code library.

29. The method of claim 16, wherein the mobile computing device is a wireless mobile phone.

30. The method of claim 16, wherein the generated modification data objects include device-native code.

* * * * *